US007376425B2

(12) United States Patent
Laroia et al.

(10) Patent No.: US 7,376,425 B2
(45) Date of Patent: May 20, 2008

(54) BASE STATION BASED METHODS AND APPARATUS FOR SUPPORTING BREAK BEFORE MAKE HANDOFFS IN A MULTI-CARRIER SYSTEM

(75) Inventors: Rajiv Laroia, Basking Ridge, NJ (US); Junyi Li, Somerset, NJ (US); Frank A. Lane, Asbury, NJ (US)

(73) Assignee: Qualcomm Incorporated, San Diego, CA (US)

( * ) Notice: Subject to any disclaimer, the term of this patent is extended or adjusted under 35 U.S.C. 154(b) by 47 days.

(21) Appl. No.: 11/283,676

(22) Filed: Nov. 21, 2005

(65) Prior Publication Data

US 2006/0073836 A1    Apr. 6, 2006

Related U.S. Application Data

(63) Continuation of application No. 10/964,945, filed on Oct. 14, 2004, now Pat. No. 7,047,009.

(60) Provisional application No. 60/527,475, filed on Dec. 5, 2003.

(51) Int. Cl.
*H04Q 7/20* (2006.01)
*H04Q 7/00* (2006.01)

(52) U.S. Cl. ............... 455/437; 455/436; 455/442; 455/435.1; 455/432.1; 370/331; 370/330; 370/332

(58) Field of Classification Search .......... 455/437, 455/436, 442, 435.1, 439, 522, 435.2, 432.1; 370/331, 330, 328, 329, 332
See application file for complete search history.

(56) References Cited

U.S. PATENT DOCUMENTS 4,833,701 A    5/1989  Comroe et al.

(Continued)

FOREIGN PATENT DOCUMENTS

WO    WO/95/12297    5/1995

(Continued)

OTHER PUBLICATIONS

C Perkins, Editor "IP Mobility Support", Network Working Group, pp. 1-79 (Oct. 1996).

(Continued)

*Primary Examiner*—George Eng
*Assistant Examiner*—Huy Phan
(74) *Attorney, Agent, or Firm*—Kam T. Tam; Abdollah Katbab; Thoms R. Rouse

(57) ABSTRACT

A mobile communications device initiates a handoff from its current base station (BS) sector network attachment point to a new BS sector. The mobile sends a handoff request over its current wireless link to the current BS sector, which forwards the request to the new BS sector, e.g., via a network link. The new BS sector processes the request assigning dedicated resources, e.g., an identifier and dedicated uplink segments information identifying the allocated resources is conveyed from the new BS sector via the current BS sector to the mobile. The mobile determines the time of the allocated dedicated segments based upon a received beacon signal from the new BS sector with known timing relationships to dedicated segments. The mobile breaks the original wireless link just prior to the time of the first assigned dedicated segment. The mobile communicates information on the assigned dedicated segments to perform registration operations, e.g., timing synchronization and power control, establishing a new wireless link.

19 Claims, 16 Drawing Sheets

U.S. PATENT DOCUMENTS

| | | | |
|---|---|---|---|
| 5,200,952 | A | 4/1993 | Bernstein et al. |
| 5,229,992 | A | 7/1993 | Jurkevich et al. |
| 5,247,516 | A | 9/1993 | Bernstein et al. |
| 5,251,209 | A | 10/1993 | Jurkevich et al. |
| 5,267,261 | A | 11/1993 | Bkajebet, II et al. |
| 5,404,355 | A | 4/1995 | Raith |
| 5,491,835 | A | 2/1996 | Sasuta et al. |
| 5,572,528 | A | 11/1996 | Shuen |
| 5,697,055 | A | 12/1997 | Gilhousen et al. |
| 5,848,063 | A | 12/1998 | Weaver, Jr. et al. |
| 5,991,289 | A | 11/1999 | Huang et al. |
| 6,075,989 | A | 6/2000 | Moore et al. |
| 6,078,570 | A * | 6/2000 | Czaja et al. ............ 370/331 |
| 6,078,571 | A | 6/2000 | Hall |
| 6,144,671 | A | 11/2000 | Perinpanathan et al. |
| 6,161,008 | A | 12/2000 | Lee et al. |
| 6,195,705 | B1 | 2/2001 | Leung |
| 6,246,673 | B1 | 6/2001 | Tiedemann, Jr. et al. |
| 6,256,300 | B1 | 7/2001 | Ahmed et al. |
| 6,308,267 | B1 | 10/2001 | Gremmelmaier |
| 6,366,561 | B1 | 4/2002 | Bender |
| 6,400,722 | B1 | 6/2002 | Chuah et al. |
| 6,445,922 | B1 | 9/2002 | Hiller et al. |
| 6,446,127 | B1 | 9/2002 | Schuster et al. |
| 6,466,964 | B1 | 10/2002 | Leung et al. |
| 6,542,744 | B1 | 4/2003 | Lin |
| 6,611,547 | B1 | 8/2003 | Rauhala |
| 6,763,007 | B1 | 7/2004 | La Porta et al. |
| 6,810,254 | B2 | 10/2004 | Tiedemann et al. |
| 6,862,446 | B2 | 3/2005 | O'Neill et al. |
| 7,136,648 | B2 * | 11/2006 | Chen et al. ............ 455/442 |
| 2001/0036164 | A1 | 11/2001 | Kakemizu et al. |
| 2001/0041571 | A1 | 11/2001 | Yuan et al. |
| 2001/0046223 | A1 | 11/2001 | Malki et al. |
| 2002/0015396 | A1 | 2/2002 | Jung |
| 2002/0018456 | A1 | 2/2002 | Kakemizu et al. |
| 2002/0019228 | A1 | 2/2002 | McKenna et al. |
| 2002/0026527 | A1 | 2/2002 | Das et al. |
| 2002/0045451 | A1 | 4/2002 | Hwang et al. |
| 2002/0068565 | A1 | 6/2002 | Purnadi et al. |
| 2002/0136226 | A1 | 9/2002 | Christoffel et al. |
| 2002/0191593 | A1 | 12/2002 | O'Neill et al. |
| 2003/0012179 | A1 | 1/2003 | Yano et al. |
| 2003/0137961 | A1 | 7/2003 | Tsirtsis et al. |
| 2003/0176188 | A1 | 9/2003 | O'Neill |
| 2003/0214922 | A1 | 11/2003 | Shahrier |
| 2003/0228868 | A1 | 12/2003 | Turanyi et al. |
| 2004/0018841 | A1 | 1/2004 | Trossen |
| 2004/0233871 | A1 | 11/2004 | Seki |
| 2005/0063349 | A1 | 3/2005 | Logalbo et al. |
| 2005/0083888 | A1 | 4/2005 | Smee et al. |

FOREIGN PATENT DOCUMENTS

| | | |
|---|---|---|
| WO | WO/98/47302 | 10/1998 |

OTHER PUBLICATIONS

Li, Yalun "Protocol Architecture for Universal Personal Computing" IEEE Journal of Selected Areas in Communications 15(8): 1467-1476 (1997).

J. Moy, Editor "OSPF Version 2", Network Working Group, pp. 1-244 (Apr. 1998).

Valko, Andras "Cellular IP: A New Approach to Internet Host Mobility" Computer Communications Review 29(1): 50-65 (1999).

TIA/EIZ/IS-707A.8 "Data Service Options for Spread Spectrum Systems: Radio Link Protocol Type 2", pp. 1-1:4:2 (Mar. 1999).

IETF, Network Working Group, Request for Comments: 2205, Resource Reservation Protocol (RSVP)—Version Functional Specification, pp. 1-105 (Sep. 1997).

IETF, Network Working Group, Request for Comments: 2206, RSVP Management Informatin Base Using SMIv2, pp. 1-60 (Sep. 1997).

IETF, Network Working Group, Request for Comments: 2207, RSVP Extension for IPSEC Data Flows, pp. 1-14 (Sep. 1997).

IETF, Network Working Group, Request for Comments: 2210, The Use of RSVP with IETF Integrated Services, pp. 1-31 (Sep. 1997).

IETF, Network Working Group, Request for Comments: 2208, Resource Reservation Protocol (RSVP) Version 1 Applicability Statement Some Guidelines on Deployment, pp. 1-6 (Sep. 1997).

IETF, Network Working Group, Request for Comments: 2209, Resource Reservation Protocol (RSVP)—Version 1 Message Processing Rules, pp. 1-24 (Sep. 1997).

Andras G. Valko, "Cellular IP—A New Approach to Internet Host Mobility," ACM Computer Communication Review, vol. 29, No. 1, pp. 50-65, Jan. 1999.

Karagiannis, Mobile IP, State of the Art Report, pp. 1-63, Jul. 1999.

Elin Wedlund et al., "Mobility Support Using SIP", Proc. Of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

"Source Specific Multicast (SSM) Explicit Multicast (Xcast)" pp. 1-27 (Copyright 2001 by ETRI).

IETF Network Working Group, Request for Comments: 2961, RSVP Refresh Overhead Reduction Extensions, pp. 1-32 (Apr. 2001).

Marshall, W., et al., Integration of Resource Management and SIP, IETF Internet Draft, draft-ietf-sip-manyfolks-resource-02.txt, Aug. 2001, pp. 1-28.

Andrew T. Campbell et al., "IP Micro-Mobility Protocols", ACM SIGMOBILE Mobile Computer and Communication Review (MC2R), vol. 4, No. 4, pp. 34-54, Oct. 2001.

S. Zhou et al., "A Location Management Scheme for Support Mobility In Wireless IP Networks Using Session Initiation Protocol (SIP)", 1531-2216/01 IEEE, Oct. 2001, pp. 486-491.

Bos, L., et al., A Framework for End-to-End Perceived Quality of Service Negotiation, IETF Internet Draft, draft-bos-mmusic-sdpqos-framework-00.txt, Nov. 2001, pp. 1-22.

Papalilo, D., et al., Extending SIP for QoS Support www.coritel.it/publications/IP_download/papalilo-salsano-veltri.pdf, Dec. 8, 2001, pp. 1-6.

Camarillo, P., et al., Integration of Resource Management and SIP, IETF Internet Draft, draft-ietf-sip-manyfolks-resource-04.ps, Feb. 25, 2002 pp. 1-18.

Ho, Integration AAA with Mobile IPv4, Internet Draft, pp. 1-59, Apr. 2002.

"SIP: Session Initiation Protocol", IEFT Network Wording Group, Request for Comments: 3261, (Jun. 2002), pp. 1-29.

IETF, Network Working Group, Request for Comments: 3261 "SIP: Session Initiation Protocol", pp. 1-269 (printed as pp. 1-252) (Jun. 2002).

NetworkWorking Group, IPv6 Prefix Delegation Using ICMPv6, pp. 1-33, Apr. 2004.

IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.

Network Working Group, "IP Mobility Support for IPv4", C. Perkins, Ed., Nokia Research Center, Jan. 2002, downloaded from http://www.ietf.org on Dec. 29, 2004, pp. 1-92.

* cited by examiner

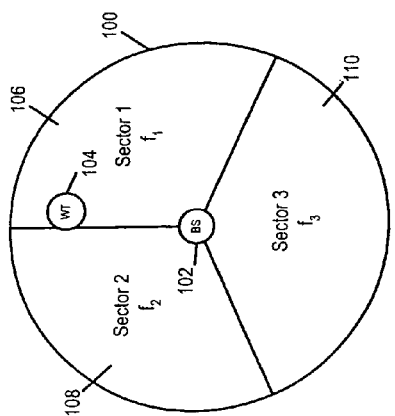
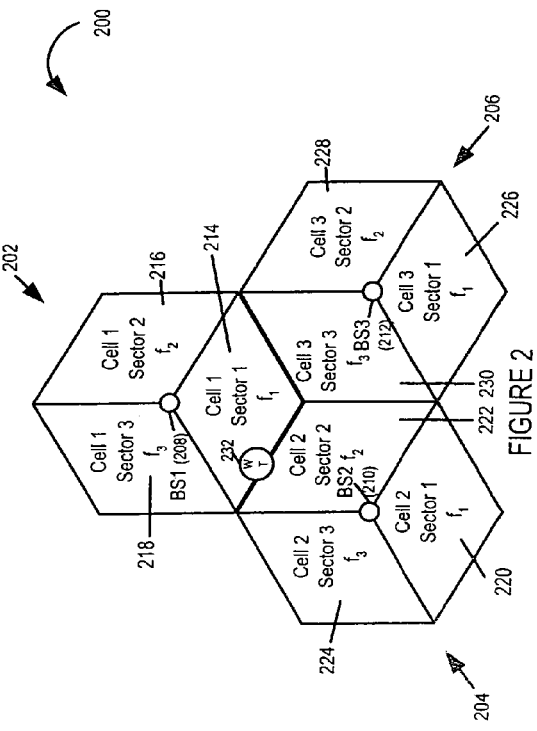

BASE STATION BASED METHODS AND APPARATUS FOR SUPPORTING BREAK BEFORE MAKE HANDOFFS IN A MULTI-CARRIER SYSTEM

RELATED APPLICATIONS

The present application is a continuation of U.S. patent application Ser. No. 10/964,945 filed Oct. 14, 2004, now U.S. Pat. No. 7,047,009, which issued on May 16, 2006, which claims the benefit of U.S. Provisional Patent Application Ser. No. 60/527,475 field Dec. 5, 2003 which is hereby expressly incorporated by reference.

FIELD OF THE INVENTION

The present invention relates to multi-carrier communications systems and, more particularly, to method and apparatus for performing inter-sector and/or inter-cell handoffs in such systems.

BACKGROUND

Cells may include one or more sectors. A cell without multiple sectors is a single sector cell, i.e., it includes a single sector. Signals are normally transmitted by a sector transmitter using a carrier frequency and the corresponding bandwidth, e.g., one or more tones surrounding the carrier frequency. Different cells and/or sectors of a cell often use different frequency bands centered around a carrier frequency used by the sector or cell. The carrier frequency of adjacent cells and/or sectors are often different. To receive signals corresponding to a carrier frequency, a wireless terminal normally has to adjust its receiver, e.g., receiver filters, to correspond to the frequency band associated with the carrier frequency to be used. Switching a receiver between carrier frequencies may take time. Thus, in receivers with a single filter chain, transitioning between different carriers may cause the receiver to encounter intervals during which information can not be received due to the switching process.

Wireless terminals, e.g., mobile nodes, communicating with a base station on a given carrier frequency and moving through a multi-carrier system need to decide when to make a handoff and transition to a new carrier frequency e.g., corresponding to a new cell and/or sector. As discussed above, an adjacent sector and/or cell may use a different carrier frequency, and as a sector or cell boundary is crossed, a wireless terminal will normally have to identify and switch to the new carrier frequency.

Typically a mobile node includes a single receiver chain and listens to one carrier frequency band at a given time due to constraints in the hardware and cost associated with the receiver. This is because, for cost reasons, multiple parallel receiver filter chains are often too expensive to be practical. In some known systems a mobile node waits until communications are lost or significantly degraded on the operating carrier band being used before switching to another carrier. In some systems, a wireless terminal periodically switches its receiver to a different carrier band to check for signal presence and/or strength. Unfortunately, while switched to search for another carrier, the receiver can not receive signals from the carrier that is currently in use. The known methods of determining what carriers are available to switch to and when to switch to a new carrier may result in interrupted communications, gaps during the hand-off process, and/or wasted resources in monitoring and determining the appropriate carrier frequency band.

In addition to the problem of determining which carriers/frequency bands are available and should be used at any given time, handoffs between sectors and/or cells using different carriers present problems associated with adjusting receiver and/or transmitter circuitry to switch between carrier frequencies. Problems associated with switching between carrier frequencies occur when a switch between carriers occurs whether or not a change in location occurs and are generally encountered when handoffs occur between carrier frequencies. For cost reasons, it is often desirable to implement a communications device with a single receiver and transmitter.

When switching between carrier frequencies, an analog filter used by the receiver and an analog filter used by the transmitter normally has to be changed to match the new frequency band. This normally involves adjusting the filter as a function of the carrier frequency of the new sector or cell. The transitional period required to implement this filter change, in the case of a device with a single receiver/transmitter results in an interval during which the communications device is unable to receive and/or transmit information to a base station.

In systems where each cell/sector uses the same frequency, e.g., in systems with a frequency reuse rate of 1, handoffs between sectors and/or cells do not require such filter switching operations since the frequency band used in each of the sectors/cells is the same. In such systems "make before break" handoffs are relatively easy to implement. In a make before break handoff the communications device directly communicates with the new sector and/or cell before breaking, e.g., terminating, the connection with the old base station. Given that the carrier frequencies are the same before and after handoff in such systems, there is normally no need to alter the filters in the receiver and/or transmitter circuitry making the time required to switch between the two sectors and/or cells relatively minor.

Regardless of whether a handoff operation involves a change in carrier frequency or not, in many systems when handing off from one base station or sector to another before a mobile device is permitted to transmit user data, e.g., application layer data such as voice, text, etc., the mobile node performs timing and/or power control synchronization operations. Registration in the sector or cell being entered is normally also required before transmission of user data to the new base station or sector is permitted. Such signal level synchronization operations can be important to prevent transmission by the mobile device entering the cell and/or sector interfering with the transmissions from other mobile devices already in the cell/sector being entered. In some systems, a particular period of time is set aside on a periodic basis for use by mobile devices entering the system to transmit signals used to register and/or perform initial timing and/or power control synchronization operations. During such periods of time, devices entering the cell/sector can contact the base station to perform timing and/or power control synchronization operations without interfering with devices already in the system, e.g., because registered devices know not to transmit signals during this particular period of time. Signaling during this dedicated period of time is often contention based, e.g., one or more new devices may attempt to register using the same communications resource, e.g., set of tones. In such cases, signals may collide and the registration by the devices attempting to use the same set of tones may fail requiring them to retry during a later dedicated registration period, e.g., using another set of tones. As part of the registration process, physical layer signaling issues are resolved such as physical signal timing used to control symbol transmission and/or transmission power control is achieved, e.g., based on control signals received from the new base station. In addition, one or more device identifiers used to identify the device while in the new cell may be assigned to the device seeking to register in the new cell/sector. Once synchronization and ID assignment issues are resolved in regard to the new cell/sector, higher level signaling, e.g., IP packet transmission and reception may begin to occur between the mobile device entering the new sector and/or cell and the base station in that sector/cell.

In the case where the frequency bands of the old and new sector and/or cell are the same, it is often possible to maintain communications with the old base station while simultaneously communicating in the same frequency band with new base station to perform the above discussed registration operations, e.g., timing control, power control and cell/sector ID specific assignment operations. This is possible since the frequency of the filter used in the receiver and/or transmitter need not be changed when communicating with base stations in cases where the old and new carrier frequencies are the same. Thus, in systems where the old and new frequency bands are the same a mobile device can complete physical layer signaling operations which need to be completed before IP packets can be received/transmitted in the new cell while still being able to receive IP packets from the old base station. Once the physical layer, e.g., timing synchronization, etc., with the new base station, and other registration operations are completed in the new sector/cell a signal may be sent to trigger re-routing of IP packets to the mobile device by way of the new sector/cell and to stop the routing of packets intended for the mobile to the old sector/cell. In this way, in various known systems, the connection with the old cell is broken after a connection, sufficient to communicate IP packets, with a new cell or sector, is established.

While using a single carrier which is the same in each sector and cell of a system simplifies handoff operations, it has drawbacks due to the relatively high degree of interference at sector and cell boundaries. At such boundaries, given signal fading, mobile nodes may experience signal conditions considerably worse than 0 dB for extended periods of time.

When different sets of frequencies are used in adjoining sectors/cells, e.g., a frequency reuse pattern greater than 1 is employed, signal conditions at sector and cell boundaries are usually considerably better than in cases where there is full reuse of all frequencies. Thus, signal interference at cell/sector boundaries provides a reason to avoid a frequency reuse scheme of 1 despite the handoff benefits it provides.

Delays associated with adjusting a transmitter and/or receiver's filter to operate at a new frequency band makes switching receiver and transmitter circuitry between an old and a new carrier frequency at a rate that is quick enough to support the above discussed make before break handoff procedure difficult to implement. Accordingly, in handoffs between sectors and/or cells using different frequency bands, a break before make handoff operation is often used where radio signaling with the old base station is terminated before it is established with a new base station. Unfortunately, this normally leaves the mobile device unable to receive IP packets not only during the duration that it is switching its filter circuitry to the new carrier frequency but for the additional time period it needs to register with the new cell/sector and to perform the required timing and/or power synchronization operation(s) and any IP packet redirection operations that may be needed.

The need to wait, in some systems, for a periodically occurring time period during which registrations are permitted to occur within a sector or cell, combined with the uncertainty that resources will be available in the cell or sector for the mobile device to register during a particular registration period, can lead to both unpredictable and sometimes excessive delays before a mobile device can receive IP packets in a new cell or sector after terminating a connection with an old base station.

In view of the above discussion, it should be apparent that there is a need for methods and apparatus for reducing the amount of time required to complete a handoff in a system which uses different frequency bands. It is desirable that at least one or more methods be provided which avoid the need for a mobile device to terminate a connection with a current base station and/or cell before it can commence communication with a new base station or cell in regard to handoff related matters, e.g., registration signaling, assignment of airlink related resources such as local identifier assignments, etc. It is also desirable, that in at least some embodiments, that a mobile device be able to expect with a reasonably high degree of certainty the communications resources needed to complete a registration process will be available at or near the time it terminates communication with a previous base station.

SUMMARY OF THE INVENTION

The present invention is directed to methods and apparatus for switching between communications links implemented using different carrier frequencies, e.g., has part of a handoff between sectors and/or cells or as part of an intra-sector handoff between two different carrier frequencies used in a sector. The methods of the present invention are particularly well suited for use where the system supports the use of different frequencies for communications purposes, e.g., in different sectors, cells or within a sector.

In a system using the invention, base station transmitters in different sectors and/or cells periodically transmit a high power signal, sometimes called a beacon signal, into the frequency band used in the neighboring sector or cell. Beacon signals are signals which include one or more narrow (in terms of frequency) signal components, e.g., signal tones, which are transmitted at relatively high power compared to other signals such as user data signals. In some embodiments beacon signals each include one or more signal components where each signal component corresponds to a different tone. A beacon signal component in some embodiments includes a per tone signal energy which is 10, 20, 30 or more times the average per tone signal energy of signal tones used to transmit user data and/or non-beacon control signals.

Multiple beacons, e.g., multiple high power tones can be transmitted at the same time although in many embodiments at most a single beacon signal is transmitted by a transmitter in any given transmission time period, e.g., symbol transmission period. The single beacon signal may include a single high power signal tone or, in some embodiments, a few high power tones.

In accordance with the present invention handoff operations are initiated by a wireless terminal, e.g., a mobile communications device, via a current base station sector with which the mobile device has a wireless communication connection, e.g., a first communications link implemented using a first carrier frequency. The mobile device communicates via the first communications link and the current base station sector its desire to complete a handoff to a different base station, sector, or carrier within the sector in which the mobile device is located. The new communications link will be established using a new carrier frequency which will often be different from the first carrier frequency. The base station sector with which the new communications link is to be established, referred to as the new base station sector, assigns to the mobile device, via the current base station sector and the first communications link, one or more airlink related resources to be used upon entry into the new base station sector or upon switching to the new carrier frequency within the current sector when the new base station sector is the same as the current base station sector. The airlink related resources may be one or more device identifiers (such as MAC state identifiers, e.g., ON state identifier, ACTIVE state identifier) which are to be used when communicating in the new base station sector using the new carrier frequency. As part of the handoff process the new base station sector may dedicate and thereby reserve physical signaling resources, associated with the new carrier frequency, for use by the mobile device initiating the handoff operation, e.g., dedicated communications bandwidth such as, e.g., a set of tones, to be used to complete the registration process upon entry into the cell using the new carrier frequency. The dedicated set of tones may be used, e.g., for power control and/or timing control operations upon entry into the new base station sector. Such dedicated resources may be allocated within a periodically occurring access or registration time period. The new base station sector communicates, in some embodiments, information identifying the particular registration period in which the mobile was allocated the dedicated resources. This information is used, in various embodiments, to determine when the current communications link with the current base station sector should be terminated and a new communications link using the new carrier should be established with the new base station sector, so that the disruption of services due to the termination of the first communications link can be minimized.

After making a decision to initiate a handoff operation, the mobile node and/or current base station sector sends an IP routing update message to a mobility agent, e.g., Mobile IP home agent, used to redirect IP packets intended for the mobile device to the base station sector being used to attach the mobile device to the network. The IP routing message causes the mobility agent to begin redirecting IP packets intended for the mobile device to the new base station sector to which the handoff is to be completed. In some embodiments, the transmission of the IP routing update message is sent after receiving a device identifier to be used in the new base station sector and/or dedicated resources to be used in the new base station sector, e.g., to complete a registration process. This ensures that the new base station sector has resources available to service the mobile device seeking to complete the handoff to the new base station sector.

In the above described manner, a mobile node can initiate a handoff to a new base station, sector or carrier within a sector involving a change to a different carrier frequency via its existing communications link. In this manner, the need to tune to the new carrier frequency to begin the establishment of a connection using the new carrier frequency can be avoided and the mobile node can receive resource assignments corresponding to the new base station, sector and/or carrier frequency without having to first switch to the new carrier frequency. Resources assigned by the new base station or sector may include, e.g., a sector specific and/or sector carrier specific device identifier to be used when communicating in the new sector and/or using the new carrier frequency. Dedicated communication segments for establishing the communication signaling, e.g., power, timing control, and/or registration signaling, may also be assigned by the new basestation and/or sector with the assignment being communicated over the first communications link to the mobile node before establishing signaling over the new communications link using the new carrier frequency.

In accordance with one feature of the invention, in some embodiments an IP routing message is normally sent after initiation of a handoff to a new basestation, sector or carrier frequency within a sector but prior to the point where the mobile node has completed registration, power control and/or timing control over the communications link being established with the new basestation, sector or carrier frequency. In such a case, the IP routing update process will normally be initiated to redirect IP packets to the cell, sector or circuitry within a sector corresponding to the new carrier frequency before the mobile node is able to transmit user data over the new communications link being established. Thus, in many cases, the IP routing message is normally sent prior to completion of the handoff, e.g., prior to termination of the current communications link in favor of the communications link being established as part of the handoff process. In such implementations, IP routing update delays will at least partially overlap the period during which the mobile node is likely to unable to communicate with either the old or new base station sector as a result of the process of changing receiver and/or transmitter circuitry, e.g., filter circuitry, to correspond to the new carrier frequency to be used when communicating with the new communications link being established as part of the handoff process.

In the case of single sector cells, handoffs between old and new base stations correspond to handoffs between base stations of different cells due to the one to one relationship between cells and base station sectors. However, in the case of multi-sector cell implementations, intra-cell inter-sector handoffs are possible with the old and new sectors being in the same cell. In some embodiments, in intra-cell inter-sector handoffs, timing synchronization is maintained between the base station sectors, and the timing synchronization steps, normally performed, in a handoff process are omitted. In such cases, a handoff to a new sector of the same cell can be completed without a timing synchronization operation being performed. Thus, upon entering the new sector, following termination of the old communications link, the mobile device can begin transmitting user data prior to receiving a timing synchronization signal from the base station or performing a timing synchronization operation. This is because timing synchronization between sectors of the cell is maintained in some embodiments and relying on the timing synchronization initially achieved in one sector of a cell is not likely to cause interference problems in the other synchronized sector of the same cell. Skipping an initial timing synchronization step, which is normally required upon entry into a new cell, when implementing an intra-cell handoff, reduces delays associated with implementing intra-cell handoffs as opposed to inter-cell handoffs.

While the method and apparatus of the present invention still involve breaking radio communication over an existing communications link implemented using a first carrier frequency, prior to establishing radio communication using a second, e.g., different, carrier frequency, the signaling exchanged prior to this operation by way of the existing communications link which uses the first carrier frequency allows the mobile device to obtain some of the benefits of a make before break handoff, e.g., ID assignments and airlink resource allocations, prior to actually breaking communication over an existing link thereby reducing the latency and uncertainty associated with many make before break handoff operations.

Thus, the methods and apparatus of the present invention represent an improvement over older break before make handoff methods in which a mobile device would first break an existing link before being able to receive resource assignments, etc. in regard to a new communications link being implemented using a different carrier frequency.

Numerous additional features and benefits of the methods and apparatus of the present invention are discussed in the detailed description which follows.

BRIEF DESCRIPTION OF THE FIGURES

FIG. 1 is a drawing of an exemplary three sector cell including a sectorized base station and a wireless terminal situated on a sector boundary, said base station and wireless terminal implemented in accordance with the present invention.

FIG. 2 is a drawing of an exemplary multi-cell multi-sector wireless communications system including three sectorized base stations and a wireless terminal situated on a cell boundary, said communications system implemented in accordance with present invention.

DETAILED DESCRIPTION OF THE INVENTION

Figure 3:
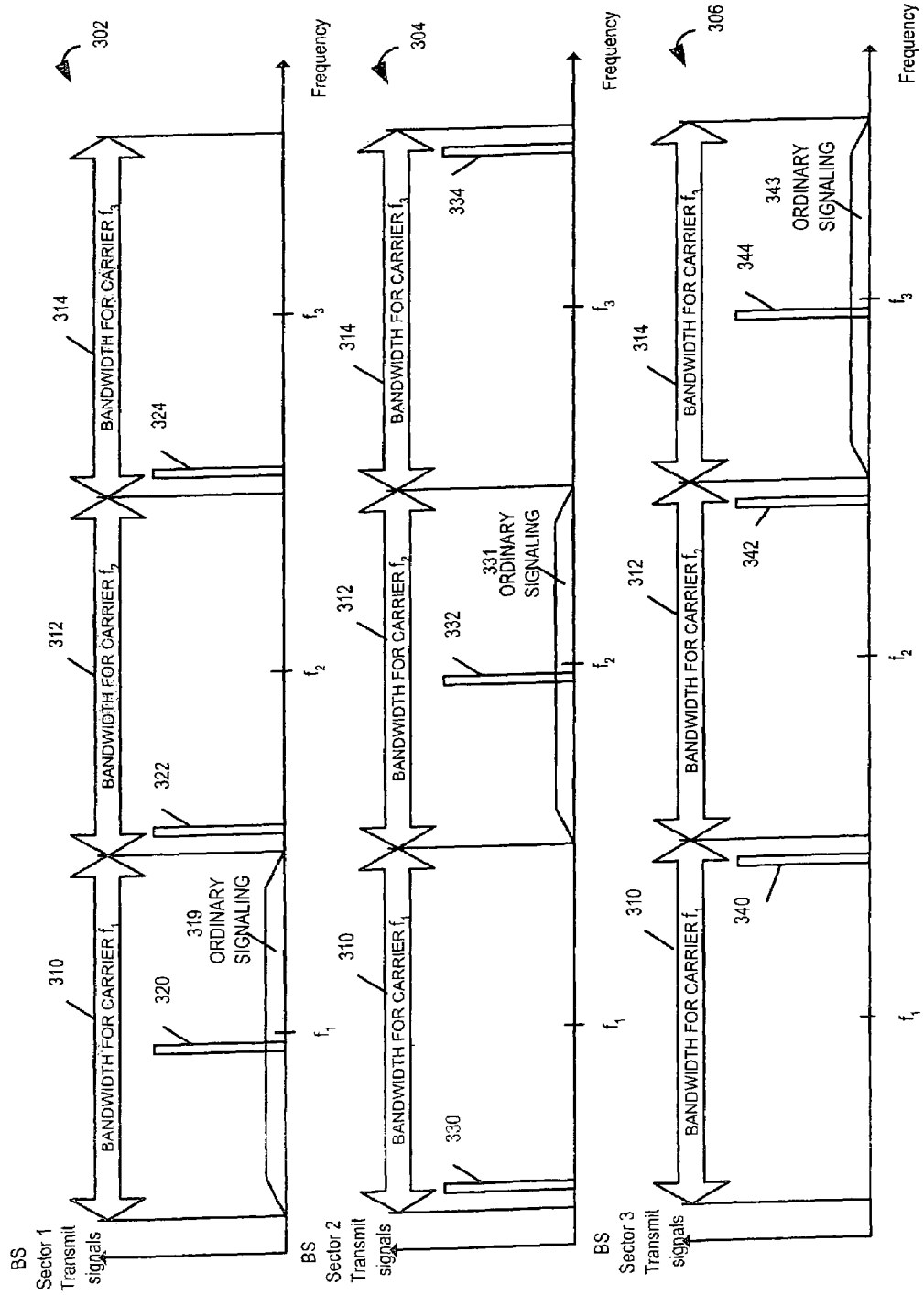
FIG. 3 is a drawing showing exemplary downlink signaling from each sector of an exemplary three sector base station, in accordance with one exemplary embodiment of the present invention.

The present invention is directed to methods and apparatus for implementing handoffs involving a change in carrier frequencies. The handoffs may be between different cells, e.g., intercell handoffs, between sectors within a cell, e.g., intra-cell inter-sector handoffs or handoffs between different carriers within a sector, e.g., intra-sector inter-carrier handoffs. Inter-cell handoffs and intra-cell inter-sector handoffs often involve change of carriers.

The handoffs implemented in accordance with the present invention generally involve terminating a first communications link before completing the handoff and successful establishment of a second communications link, e.g., using a different carrier frequency. While discussed in the context of handoffs involving a change in carrier frequencies, some aspects of the present invention can be used to implement handoffs where the new and the old carrier frequencies used are the same but the point of network attachment changes. For example, in the case of cells with timing synchronized sectors which use the same carrier frequency in multiple sectors, a handoff from one sector of the cell to another sector can be implemented without the need to perform timing synchronization in the new sector before transmitting user data since the timing synchronization remains valid even though the mobile node changes the sector in the cell through which it attaches to the network via a wireless connection.

In the exemplary system each cell includes a base station which transmits different signals into each sector of the cell. Cells may include one or more sectors. In many embodiments a single carrier frequency is used in each sector of a cell. However, in some embodiments, multiple carrier frequencies are used in each sector. In such embodiments, intra-sector, inter-carrier handoffs are possible with a mobile device switching from using the transmitter/receiver or other signal processing circuitry associated with one carrier frequency to the transmitter/receiver or other signal processing circuitry associated with another carrier frequency.

A separate antenna and/or transmitter may be provided for each sector of a cell. In some but not all embodiments, symbol timing and carrier frequency are synchronized across sectors of the cell. In addition, the framing structure is also synchronized across sectors of the cell so that the slots or superslots of the signals in one sector start at a fixed time offset from where those of another sector start, and the fixed time offset can be zero in some embodiments. However, symbol timing or carrier frequency is normally not synchronized across cells. The base station, in accordance with various embodiments of the invention, transmits multiple beacon signals, e.g., at different times, from each sector of a cell. One or more beacon signals are normally transmitted within the frequency band or bands, e.g., in the case of multiple carriers in a sector, used by each sector to communicate information to wireless terminals within the sector. Beacon signals are narrow band signals transmitted using relatively high power, e.g., a power level higher than the average power level used to transmit user data. In many cases the beacon signals are several times higher than the average user data power level. Such beacon signals can be used to convey information, e.g., a sector identifier, slope which is a cell identifier, and/or information about the carrier frequency/frequency band used in the sector transmitting the beacon.

In some embodiments of the present invention, the base station uses a sector transmitter to periodically transmit a beacon signal at a predetermined frequency within the frequency band used by an adjacent sector or cell. As a result, multiple sectors may transmit beacon signals into the same frequency band, e.g., at different times. In this manner, a receiver in one sector can identify the presence and the signal strength of neighboring sectors and obtain information about the sector without having to change to a different frequency band being used in the neighboring sector. To make it easy to distinguish the sector which is the source of a beacon signal within a particular frequency band, each sector transmits a beacon at a different predetermined frequency within any given frequency band used by a sector. Carrier frequency information can be associated with a beacon in addition to sector information. The predetermined frequency with a given frequency band may vary according to a pre-selected sequence over time. The sequence repeats at some point, e.g., after a fixed number of superslots.

The strength of the beacon signals received from adjacent sectors and/or cells, or from the same sector but corresponding to a different carrier frequency, may be compared to the strength of the beacon signal corresponding to the sector and carrier frequency with which the mobile has a communication link to determine when a handoff should be performed. In accordance with the invention, the monitoring and evaluation of beacon signals from adjacent sectors/cells, or different carriers of the same sector, allows the wireless terminal to, in many cases, implement a relatively seamless hand-off while avoiding a relatively lengthy disruption or interruption in service that may occur in systems where switching to a different carrier is required to determine the carrier frequency to be used following a handoff.

In one exemplary OFDM (Orthogonal Frequency Division Multiplexed) embodiment, a beacon signal is implemented as a relatively high powered signal that is transmitted on a single tone, e.g., frequency, or a few tones. The power used to transmit the beacon signal is often more than twice the highest power signal tone used to communicate data or pilot signals in the sector. When a beacon signal is transmitted in the exemplary OFDM embodiment, most of the transmission power is concentrated on one or a small number of tones, e.g., a single tone which comprises the beacon signal. Many or most of the tones which are not used for the beacon signal may, and often are, left unused. Thus, when transmitting a beacon signal into the frequency band used by an adjacent sector, most or all of tones used in the frequency band of the sector transmitting the beacon signal may go unused by the sector's transmitter.

FIG. 1 shows an exemplary 3 sector cell 100 corresponding to a base station (BS) 102 implemented in accordance with one exemplary embodiment of the present invention. Base station 102 is a sectorized base station. The base station (BS) 102 transmits ordinary signals into sector 1 106 using carrier frequency $f_1$. The BS 102 transmits ordinary signals into sector 2 108 using carrier frequency $f_2$, and ordinary signals into sector 3 110 using carrier frequency $f_3$. A wireless terminal (WT) 104, implemented in accordance with the present invention, is shown on the boundary area between sector 1 106 and sector 2 108. Handoffs of WT 104 may be performed between different base station sectors of the same cell in accordance with the methods of the present invention.

FIG. 2 shows three exemplary cells (Cell 1 202, Cell 2 204, Cell 3 206) in an exemplary wireless communications system 200 in accordance with the present invention. Each cell includes a base station and 3 sectors, each of the three sectors uses a different carrier frequency ($f_1$, $f_2$, $f_3$) and corresponding frequency band for ordinary communications with wireless terminals within the particular sector. The same three carrier frequencies $f_1$, $f_2$, $f_3$, and bandwidth associated with each carrier is reused in each of the cells. Cell 1 202 includes base station 1 (BS1) 208 and 3 sectors (sector 1 214, sector 2 216, sector 3 218) using carrier frequencies ($f_1$, $f_2$, $f_3$), respectively. Cell 2 204 includes base station 2 (BS2) 210 and 3 sectors (sector 1 220, sector 2 222, sector 3 224) using carrier frequencies ($f_1$, $f_2$, $f_3$), respectively. Cell 3 206 includes base station 3 (BS3) 212 and 3 sectors (sector 1 226, sector 2 228, sector 3 230) using carrier frequencies ($f_1$, $f_2$, $f_3$), respectively. FIG. 2 also includes an exemplary wireless terminal (WT) 232, implemented in accordance with the present invention. The WT is situated on the boundary between sector 1 214 of cell 1 202 and sector 2 222 of cell 2 204. Handoffs of WT 232 may be performed between different base station sectors of different cells or between different base station sectors of the same cell in accordance with the methods of the present invention.

The total frequency band of the FIG. 2 example is subdivided into 3 frequency bands (slots) situated contiguously and is identical in each sector. In general, the total frequency band need not be identical in each sector, and the frequency bands (slots) may be disjoint and need not be identical in each sector. In some embodiments, the BSs 208, 210, 212 transmit beacon signals. A beacon signal, in various embodiments, is implemented as one or more narrowband high power broadcast signals. In some embodiments, the beacon signal transmission in each sector, when scheduled, may alternate between the 3 frequency ranges (bands) over time. In other embodiments, the base station shall in each sector be able to transmit beacon signals in more than one of the carrier frequency bandwidth ranges (bands) with beacons being transmitted in multiple frequency bands from sector transmitter simultaneously.

FIG. 3 shows three graphs 302, 304, 306 indicating exemplary base station sector transmission signaling vs frequency. The exemplary signaling may be transmitted in a cell such as the exemplary cell 100 shown in FIG. 1 or in any of the exemplary cells (202, 204, 206) shown in FIG. 2.

The top graph 302 of FIG. 3, shows signaling from base station sector 1. The graph 302 is a composite of signals which may be transmitted at different times, e.g., during different symbol transmission periods. First frequency band 310 which is centered around carrier frequency $f_1$ is used for transmitting signals and information to wireless terminals in sector 1 as indicated by the label ordinary signaling 319. Periodically, e.g., when not transmitting data, e.g., ordinary signals, the transmitter in sector 1 transmits a beacon signal S1F1 (Sector 1 carrier Frequency 1) 320 within the first frequency band. This frequency may be a fixed offset from the first carrier frequency and can be used by the wireless terminals to identify and synchronize with the carrier frequency being used in the first sector. To provide information to WTs in neighboring sectors where carrier $f_2$ is used, periodically, the first sector transmitter transmits a beacon signal S1F2 322 at a predetermined frequency within the second frequency band 312 corresponding to the second carrier frequency $f_2$. This signal can be detected by WTs in the adjacent sector without those terminals having to adjust their receiver frequency to another band, e.g., the first frequency band 310 used in sector 1. In addition, to provide information to WTs in neighboring sectors where carrier $f_3$ is used, periodically, the first sector transmitter transmits a beacon signal S1F3 324 at a predetermined frequency within the third frequency band 314 corresponding to the third carrier frequency $f_3$. This signal can be detected by WTs in adjacent sectors where the third frequency band is used without those terminals having to adjust their receiver frequency to another band, e.g., the first frequency band 310 used in sector 1.

The middle graph 304 of FIG. 3, shows signaling from base station sector 2. The graph 304 is a composite of signals which may be transmitted at different times, e.g., during different symbol transmission periods. Second frequency band 312 which is centered around carrier frequency $f_2$ is used for transmitting signals and information to wireless terminals in sector 2 as indicated by the label ordinary signaling 331. Periodically, e.g., when not transmitting data, e.g., ordinary signals, the transmitter in sector 2 transmits a beacon signal S2F2 (Sector 2 carrier Frequency 2) 332 within the second frequency band 312. This frequency may be a fixed offset from the second carrier frequency and can be used by the wireless terminals in sector 2 to identify and synchronize with the carrier frequency being used in the second sector. To provide information to WTs in neighboring sectors where carrier $f_1$ is used, periodically, the second sector transmitter transmits a beacon signal S2F1 330 at a predetermined frequency within the first frequency band 310 corresponding to the first carrier frequency $f_1$. This signal can be detected by WTs in the adjacent sector which uses the first carrier frequency without those terminals having to adjust their receiver frequency to another band, e.g., the second frequency band 312 used in sector 2. In addition, to provide information to WTs in neighboring sectors where carrier $f_3$ is used, periodically, the second sector transmitter transmits a beacon signal S2F3 334 at a predetermined frequency within the third frequency band 314 corresponding to the third carrier frequency $f_3$. This signal can be detected by WTs in adjacent sectors where the third frequency band is used without those terminals having to adjust their receiver frequency to another band, e.g., the second frequency band 312 used in sector 2.

The bottom graph 306 of FIG. 3, shows signaling from base station sector 3. The graph 306 is a composite of signals which may be transmitted at different times, e.g., during different symbol transmission periods. Third frequency band 314 which is centered around carrier frequency $f_3$ is used for transmitting signals and information to wireless terminals in sector 3 as indicated by the label ordinary signaling 343. Periodically, e.g., when not transmitting data, e.g., ordinary signals, the transmitter in sector 3 transmits a beacon signal S3F3 (Sector 3 carrier Frequency 3) 344 within the third frequency band. The frequency of this beacon signal may be a fixed offset from the third carrier frequency and can be used by the wireless terminals in sector 3 to identify and synchronize with the carrier frequency being used in the third sector. To provide information to WTs in neighboring sectors where carrier $f_1$ is used, periodically, the third sector transmitter transmits a beacon signal S3F1 340 at a predetermined frequency within the first frequency band 310 corresponding to the first carrier frequency $f_1$. This signal can be detected by WTs in the adjacent sector which uses the first carrier frequency without those terminals having to adjust their receiver frequency to another band, e.g., the third frequency band 314 used in sector 3. In addition, to provide information to WTs in neighboring sectors where carrier $f_2$ is used, periodically, the third sector transmitter transmits a beacon signal S3F2 342 at a predetermined frequency within the second frequency band 312 corresponding to the second carrier frequency $f_2$. This signal can be detected by WTs in adjacent sectors where the second frequency band is used without those terminals having to adjust their receiver frequency to another band, e.g., the third frequency band 314 used in sector 3.

Each beacon signal can uniquely identify the carrier associated with the sector from which the beacon signal originated and can, in various embodiments, also provide additional information. In FIG. 3, the nine exemplary beacon signals shown are at different frequencies. Thus, it is possible to match a frequency of a beacon signal to a set of known beacon frequencies to determine which sector transmitter was the source of a particular detected beacon signal.

In accordance with the invention, a wireless terminal, e.g., mobile node, may receive the beacon signals from its own and different, e.g., adjacent, sector base station transmitters. The beacon signals are received within the same frequency band that the wireless terminal uses for ordinary signaling, e.g., data and/or control signaling. Beacon signal strength (e.g., power) measurements are made in addition to frequency measurements. Comparisons of the strength of different received beacon signals from different base station sector transmitters are used by the WT to decide when to make a handoff to a different base station sector. The beacon signal comparison also indicates to the wireless terminal which carrier frequency that the wireless terminal should use for ordinary signaling following the hand-off. In some embodiments, this carrier frequency is determined to be the carrier frequency used for ordinary signaling by the base station sector transmitter which transmitted the stronger of the received beacon signals.

Consider for example, the wireless terminal 104 shown in FIG. 1, which is operating in sector 1, and is therefore using carrier frequency $f_1$ and its associated bandwidth 310 for ordinary signaling, e.g., receiving and sending information to the base station. However, it is also monitoring for beacon signals within the frequency band 310 corresponding to carrier frequency $f_1$. Refer to the left portion of FIG. 3, showing the signaling transmitted by the BS in each of the three sectors in the first frequency band 310 corresponding to carrier $f_1$. The wireless terminal 104 compares the received strength of the beacon signal 320 from sector 1, with the received strength of adjacent sector beacon signals 330 and 340 which are also detected within the first frequency band 310. As the wireless terminal nears the boundary separating sector 1 and sector 2, the reception strength of beacon signal S2F1 330 within the first frequency band transmitted by the BS sector 2, increases in strength relative to the received signal strength from the sector 1 beacon signal S1F1 320. At some point, based upon this comparison of received beacon signal strengths and criteria within the wireless terminal, the wireless terminal may initiate a handoff to carrier frequency $f_2$, the frequency used for ordinary signaling in sector 2. The wireless terminal knows to switch to carrier frequency $f_2$ and not carrier frequency $f_3$ e.g., based upon the position in the frequency domain of the stronger received beacon signal.

Signaling from each sector of the same cell may be timing synchronized with respect to one another. Therefore, in intra-cell inter-sector and/or intra-cell inter-sector handoff operations, some operations associated with timing synchronization which are normally performed upon entering a cell or sector before user data can be transmitted need not be performed, in accordance with the invention before user data such as voice or text can be transmitted to the receiver corresponding to the new sector or carrier frequency.

The same or a similar method of the invention, described with respect to handoffs at sector boundaries, is also used with respect to handoffs at cell boundaries as in the case of the wireless terminal 232 shown in FIG. 2 situated on a cell boundary. In such a case, the handoff is from the sector of one cell to the sector of another cell. In regard to cells, the location of the beacon may also be used to convey cell information, e.g., a slope value used as a cell identifier in some embodiments. Different cells, sectors, and carriers within a sector may use different predetermined frequencies for beacon signals. Predetermined periodic changes in beacon signal frequency over time may be used to communicate slope information in some embodiments. In one embodiment, the changes in the beacon signal are changes in the beacon location via a hopping pattern on the tones which may indicate a slope corresponding to a cell.

Figure 4:
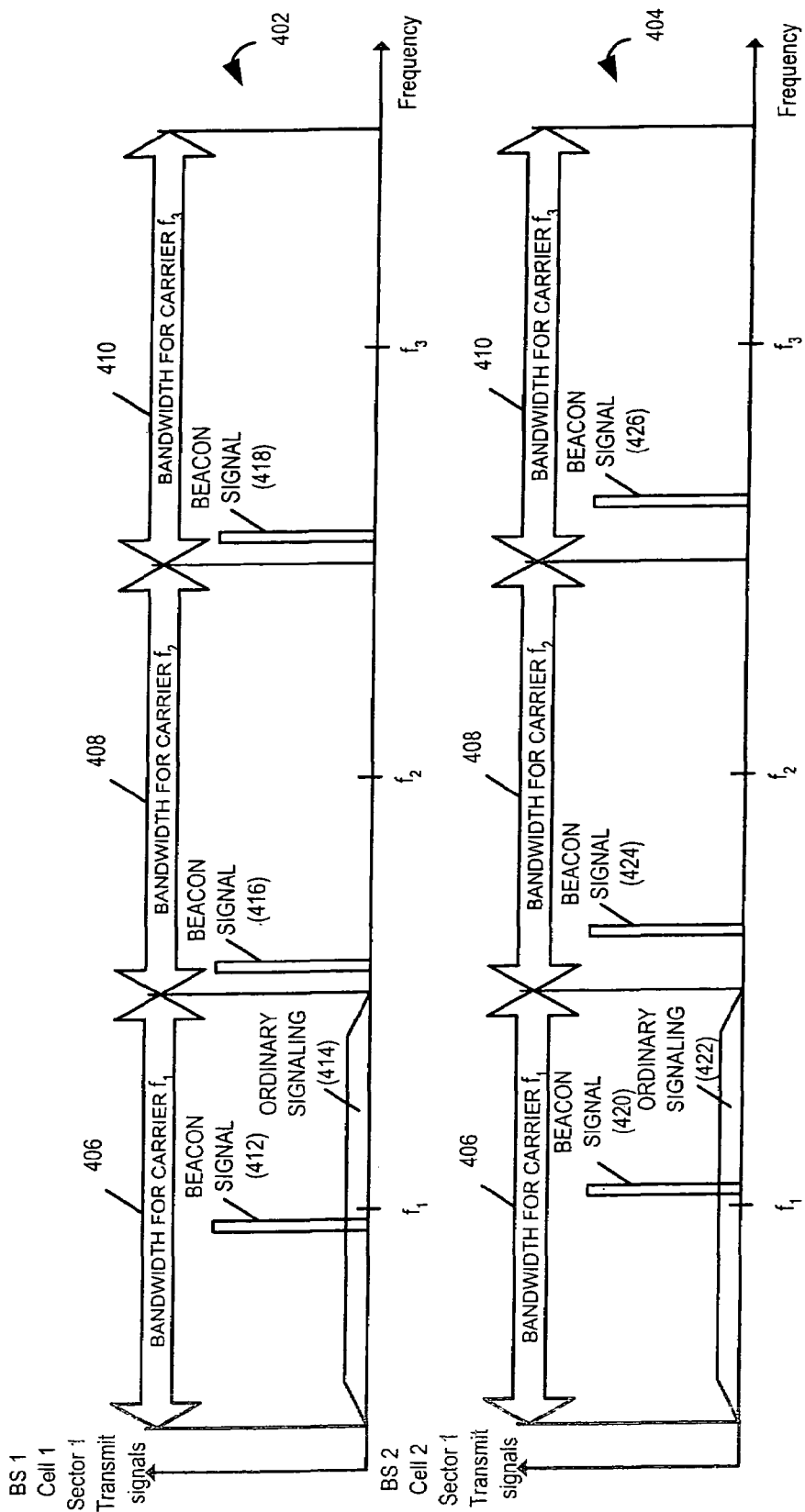
FIG. 4 is a drawing showing exemplary downlink signaling from two sectors of the same type designation from different adjacent cells in accordance with the present invention.

FIG. 4 shows an example where two different adjacent cells have a slight variation in beacon frequency location designations in the same sector, exemplary sector 1, to provide beacon signal identification to a sector and cell level. For example, drawing 402 may correspond to signals transmitted from BS1 208 sector 1 214 of cell 1 202 transmitter of FIG. 2, while drawing 404 may correspond to signals transmitted from BS2 210 sector 1 220 of cell 2 204 of FIG. 2. Drawing 402 includes a bandwidth associated with carrier frequency $f_1$ 406, a bandwidth associated with carrier frequency $f_2$ 408, and a bandwidth associated with carrier frequency $f_3$ 410. Within bandwidth for carrier $f_1$ 406, the BS 1 sector 1 transmitter transmits a beacon signal 412 and ordinary signaling 414, e.g., user data and control signals. Within bandwidth for carrier $f_2$ 408, the BS 1 sector 1 transmitter transmits a beacon signal 416. Within bandwidth for carrier $f_3$ 410, the BS 1 sector 1 transmitter transmits a beacon signal 418. The various signals 412, 414, 416, and 418 may be transmitted at different times, e.g., with the ordinary signaling 414 being transmitted most of the time, and a beacon signal, from the set of beacon signals including 412, 416, 418, being transmitted occasionally in a predetermined sequence on a periodic basis in place of the ordinary signaling 414. Drawing 404 includes a bandwidth associated with carrier frequency $f_1$ 406, a bandwidth associated with carrier frequency $f_2$ 408, and a bandwidth associated with carrier frequency $f_3$ 410. Within bandwidth for carrier $f_1$ 406, the BS 2 sector 1 transmitter transmits a beacon signal 420 and ordinary signaling 422, e.g., user data and control signals. Within bandwidth for carrier $f_2$ 408, the BS 2 sector 1 transmitter transmits a beacon signal 424. Within bandwidth for carrier $f_3$ 410, the BS 2 sector 1 transmitter transmits a beacon signal 426. The various signals 420, 422, 424, and 426 may be transmitted at different times, e.g., with the ordinary signaling 422 being transmitted most of the time, and a beacon signal, from the set of beacon signals including 420, 424, 426, being transmitted occasionally in a predetermined sequence on a periodic basis in place of the ordinary signaling 422. Beacon signals 412 and 420 within the same band 406 are at different frequency locations allowing a wireless terminal receiving the beacon signal to distinguish between the two cells. Beacon signals 416 and 424 within the same band 408 are at different frequency locations allowing a wireless terminal receiving the beacon signal to distinguish between the two cells. Beacon signals 418 and 426 within the same band 410 are at different frequency locations allowing a wireless terminal receiving the beacon signal to distinguish between the two cells.

Cells need not be, and generally are not, timing synchronized with respect to one another. Therefore, in inter-cell handoff operations, the wireless terminal is normally required to perform timing synchronization operations before transmitting user data so that symbols, e.g., symbols carrying user data, that are transmitted by the mobile are a synchronized manner at the BS with symbols transmitted by other mobiles. Beacon signals or other broadcast signals may be used in achieving coarse timing synchronization and minimizing break time during handoff operations in accordance with the present invention.

Figure 5:
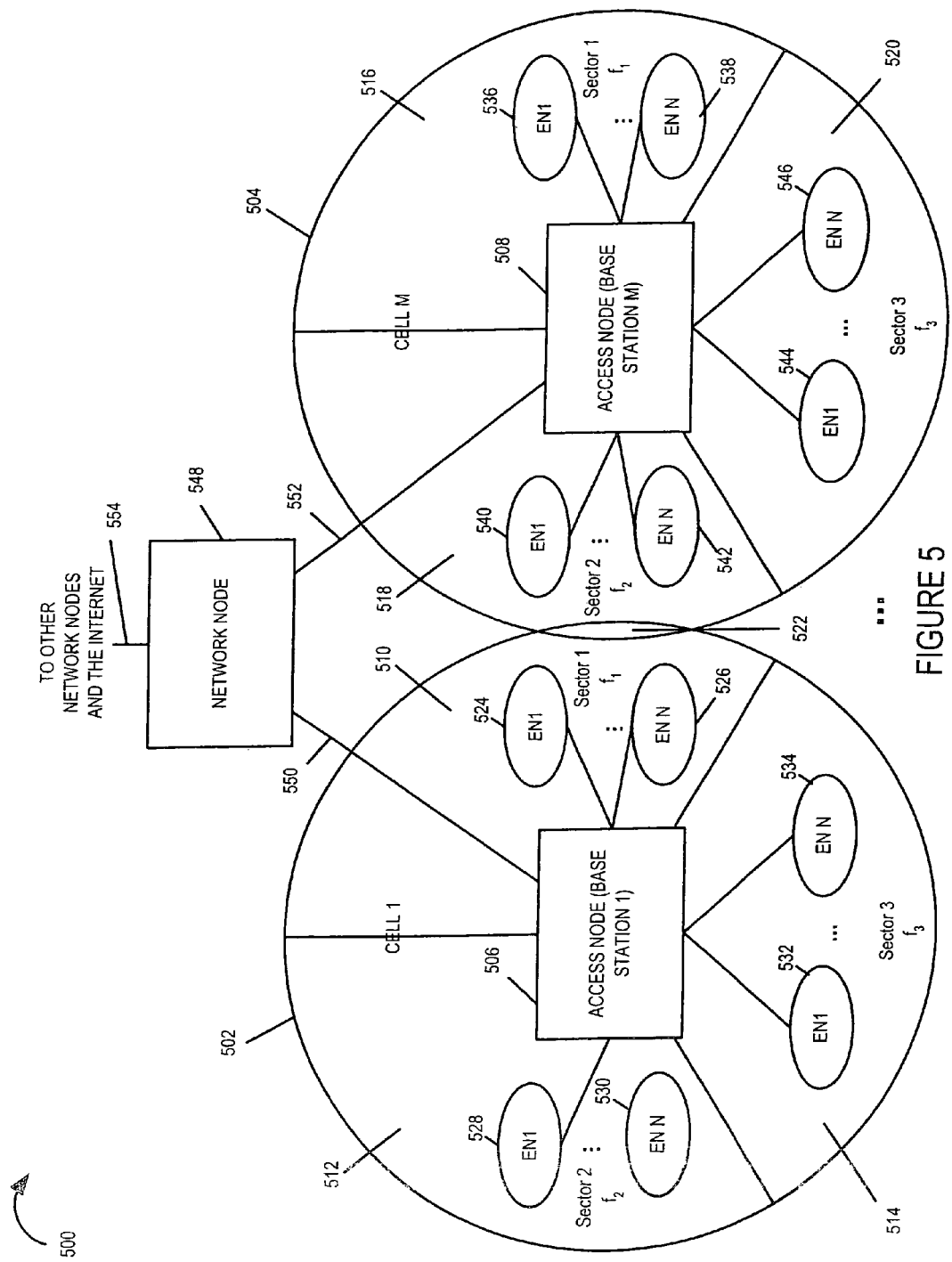
FIG. 5 is a drawing of an exemplary communications system implemented in accordance with the present invention and using methods of the present invention.

FIG. 5 shows an exemplary communications system 500 implemented in accordance with the present invention which utilizes the methods of the present invention. The exemplary system includes a plurality of cells (cell 1 502, cell M 504). Each cell represents the wireless coverage area for an access node, e.g., a base station. Cell 1 502 corresponds to base station 1 506 and cell M 504 corresponds to base station M 508. Each cell is subdivided into a plurality of sectors. The exemplary system shows a 3 sector embodiment; however, in accordance with the invention, cells with less or more than 3 sectors are also possible. The exemplary system uses a different carrier frequency in each of the sectors of a cell. In other embodiments, frequencies may be reused by sectors within a cell, e.g., reused by those sectors that are not adjacent. Alternatively, in some embodiments multiple carriers are used in each section with different power levels being used for a particular carrier in adjacent sectors which uses the same carrier frequencies. In the illustrated example of FIG. 5 sector 1 uses carrier frequency $f_1$; sector 2 uses carrier frequency $f_2$; sector 3 uses carrier frequency $f_3$. The same carrier frequencies are used in the same sectors e.g., sectors 1, 2, and 3, of other cells of the exemplary system.

In some embodiments, the carrier frequencies used in different cells of the system may vary slightly. In still other embodiments, the carrier frequencies used in different cells may be substantially different. Cell 1 502 includes sector 1 510, sector 2 512, and sector 3 514. Cell M 504 includes sector 1 516, sector 2 518, and sector 3 520. An exemplary boundary region 522 is shown where cell 1 sector 1 510 overlaps with cell M sector 2 518, in which inter-cell handoff operations are likely to occur, in accordance with the methods of the present invention. Handoff operations may also occur in boundary areas between the different sectors of the same cell, in accordance with the methods of the present invention.

The exemplary system of FIG. 5 also includes a plurality of end nodes EN1, EN N, e.g., wireless terminals such as mobile nodes, in each of the sectors of each cell. The wireless terminals are coupled to the base stations via wireless links. If the end nodes are mobile devices, they may move throughout sectors and cells of the system. The end nodes may initiate and perform handoff operations from one base station sector attachment point to another base station sector attachment point, in accordance with the methods of the present invention. Mobile devices are sometimes referred to herein as mobile communications devices or mobile nodes. Cell 1 502 sector 1 510 includes a plurality of ENs (EN1 524, EN N 526); cell 1 502 sector 2 512 includes a plurality of ENs (EN1 528, EN N 530); cell 1 502 sector 3 514 includes a plurality of ENs (EN1 532, EN N 534). Cell M 504 sector 1 516 includes a plurality of ENs (EN1 536, EN N 538); cell M 504 sector 2 518 includes a plurality of ENs (EN1 540, EN N 542); cell 1 504 sector 3 520 includes a plurality of ENs (EN1 544, EN N 546).

The access nodes (base stations) (506, 508) are coupled to a network node 548, e.g., a router, via network links (550, 552), respectively. Network node 548 is coupled to other network nodes and the Internet via network link 554. Network links (550, 552, 554) may be, e.g., fiber optic cables.

Sector boundary regions are identified as dividing lines within each cell separating the three sectors (510, 512, 514) or (516, 518, 520), and exemplary cell boundary region 522 is shown as an overlapping area between cell 1 and cell M. As wireless terminals travel throughout the system and approach and/or traverse sector and/or cell boundaries handoff operations involving a change in carrier frequency may be performed in accordance with the invention.

In accordance with the invention the base stations (506, 508) are periodically transmitting beacon signals in each of three frequency bands (associated with the three carrier frequencies $f_1$, $f_2$, $f_3$) into each sector of each cell. In accordance with the invention, the end nodes (524, 526, 528, 530, 532, 534, 536, 538, 540, 542, 544, 546) are monitoring the beacon signals in the frequency band of current operation, in order to make decisions regarding inter-sector, intra-sector (if multiple carriers are used in a sector) and/or inter-cell handoffs.

Figure 6:
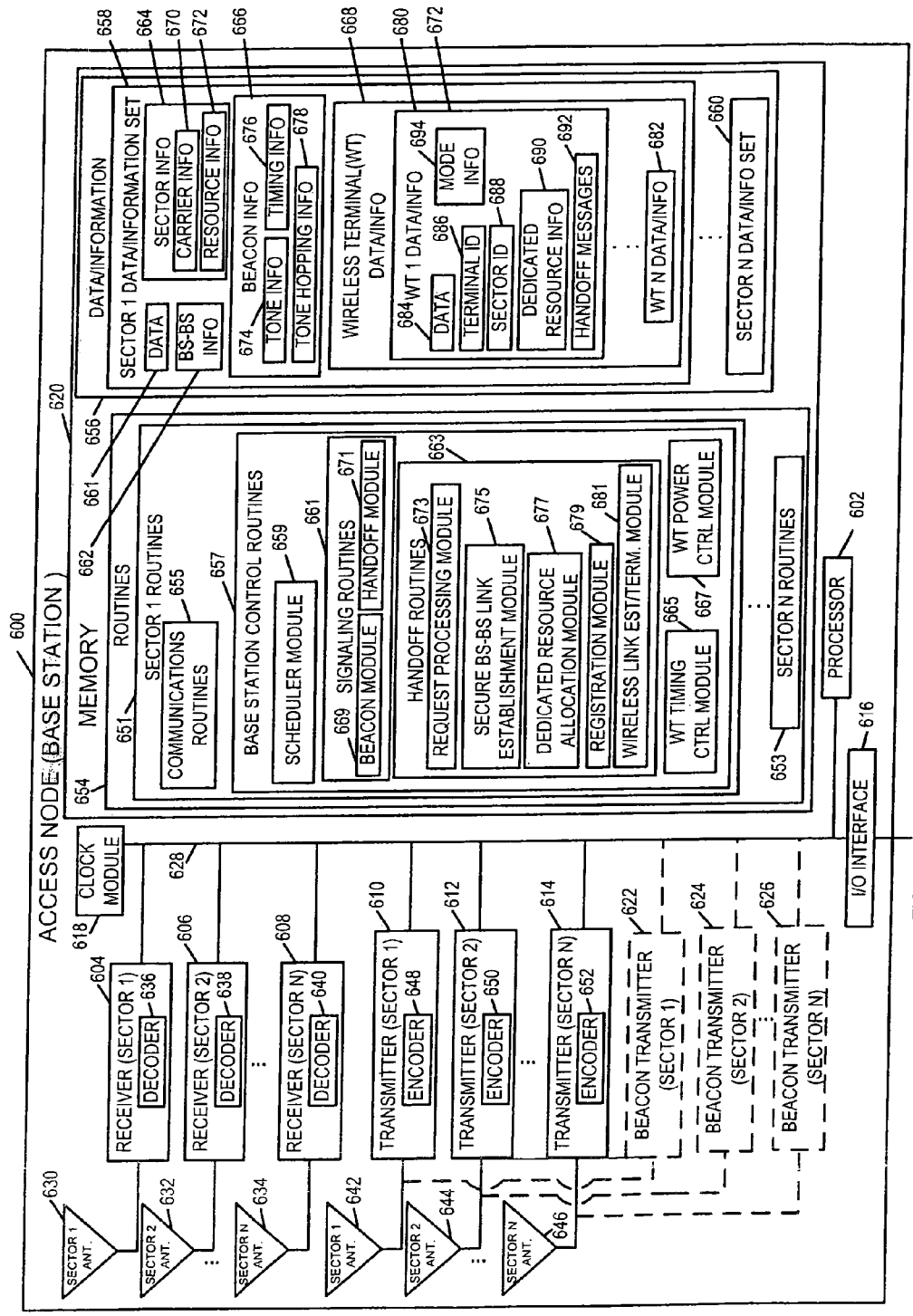
FIG. 6 is a drawing of an exemplary access node (base station) implemented in accordance with the present invention and using methods of the present invention.

FIG. 6 illustrates an exemplary access node (base station) 600 implemented in accordance with the present invention. The base station 600 of FIG. 6 may be a more detailed representation of any of the base stations of the system of FIG. 1, 2 or 5. The base station 600 includes a processor 602, e.g., CPU, a plurality of receivers, e.g., one for each sector of the base station 600 (sector 1 receiver 604, sector 2 receiver 606, . . . sector N receiver 608), a plurality of transmitters, e.g., one for each sector of the base station (sector 1 transmitter 610, sector 2 transmitter 612, . . . sector N transmitter 614), an I/O interface 616, a clock module 618, a memory 620, and, in some embodiments, a plurality of beacon transmitters, e.g., one for each sector of the base station (beacon sector 1 transmitter 622, beacon sector 2 transmitter 624, . . . beacon N transmitter 626), coupled together via a bus 628 over which the various elements can interchange data and information. Different transmitter circuitry can, and often is, included for each carrier frequency used in a sector in the case of sectors which support the use of multiple carrier frequencies. Each base station sector receiver (604, 606, 608) is coupled to a sector antenna (sector 1 receive antenna 630, sector 2 receive antenna 632, sector N receive antenna 634), respectively, and can receive signals, e.g. uplink signals including requests for handoffs, timing control signals, power control signals, and user data, from wireless terminals in the sector covered. Different receiver circuitry may, and often is, included for each carrier frequency used in a sector in the case where multiple carrier frequencies are used in a sector. Each receiver (604, 606, 608) includes a decoder (636, 638, 640), respectively, which decodes received uplink encoded signals to extract the information being communicated. Each sector transmitter (610, 612, 614) is coupled to a sector antenna (sector 1 transmit antenna 642, sector 2 transmit antenna 644, sector N transmit antenna 646), respectively, and can transmit signals, including downlink broadcast signals such as, e.g., beacon signals, and user specific downlink signals such as signals including information identifying dedicated resources for use in handoff operations, in accordance with the invention, into the sector covered. Each sector transmitter (610, 612, 614) includes an encoder (648, 650, 652), respectively, for encoding downlink information prior to transmission. In some embodiments the base station 600 includes and uses separate receivers, transmitters, and/or antennas for each of the sectors, and optionally, carrier frequencies in a sector, of the cell. In some embodiments, a base station uses: a single receiver with sectorized functionality to receive signals from each of the sectors covered by the base station, a single transmitter with sectorized functionality to transmit into each of the sectors covered by the base station, and/or sectorized antennas, e.g., an antenna with different elements corresponding to different sectors. In some embodiments, sector beacon transmitters (622, 624, 626) are included and are coupled to transmit antennas (642, 644, 646), respectively; the sector beacon transmitters (622, 624, 626) are used to transmit some or all of the beacon signaling, allowing simultaneous transmission of multiple beacon signals, and limiting disruptions in normal ordinary signaling transmissions by, in some embodiments, off loading some or all of the beacon transmissions functions.

The base station I/O interface 616 couples the base station 600 to other network nodes, e.g., other access nodes (base station), routers, AAA servers, home agent nodes, and the Internet. Handoff signaling is communicated through I/O interface 616 between base stations prior to the termination of the current wireless link and the establishment of a new wireless link, in accordance with some embodiments of the present invention.

Clock module 618 is used for maintaining timing synchronization between the various sectors covered by the base station. Synchronization between the different sectors of the same cell allows for intra-cell inter-sector and intra-cell intra-sector inter-carrier handoff operations to be performed in a more efficient manner, e.g., with reduced or eliminated wireless terminal timing synchronization steps, as compared to inter-cell handoff operations in which the WT needs to perform timing synchronization steps with the new attachment point before communicating power control information and/or user data.

Memory 620 includes routines 654 and data/information 656. The processor 602 executes routines 654 and uses the data/information 656 in the memory 620 to control the operation of the base station 600 including the normal functions of scheduling, base station power control, base station timing control, communication, signaling, and including the new features of the invention including the beacon signaling and handoff operations.

The data/information 656 in memory 620 includes a plurality of sets of data/information, e.g., one for each sector covered by the base station (sector 1 data/information set 658, sector N data/information set 660). Sector 1 data/information set 658 includes data 661, base station-to-base station information 662, sector information 664, beacon information 666, and wireless terminal (WT) data/information 668. Data 661 includes user data to be transmitted to and received from wireless terminals. Base station-to-base station information 662 includes information communicated between BSs pertaining to handoff signaling and stored security information, e.g., security keys used to establish a secure link between base stations prior to conveying WT handoff information between base stations. Sector information 664 includes carrier information 670, e.g., carrier frequencies and bandwidths associated with the sector. Sector information 664 also includes resource information 672, e.g., information identifying dedicated resources which can be allocated to WTs for use in handoff operations, e.g., base station assigned WT identifiers, uplink dedicated segments such as timing control channel segments, power control channel segments, and traffic channel segments.

The beacon information 666 includes tone information 674, e.g., information associating beacon signals in each sector with specific frequencies, timing information 676, e.g., information identifying beacon signal transmission timing and information identifying timing relationships between beacon signals and dedicated uplink resources which may be assigned for use in handoff operations, and tone hopping information 678, e.g., information used to generate hopping sequences used for the beacon signals, e.g., to convey cell identification information, e.g., slope.

WT data/info 668 includes a plurality of WT data/information sets for each WT: WT 1 data/info 680, WT N data/info 682. WT 1 data/info 680 includes user data 684 in route from/to WT 1, a terminal ID 686 associating the WT to the base station, and sector ID information 688 including information identifying the sector in which WT 1 is currently located and associating WT 1 to a specific carrier frequency used for ordinary signaling. Sector ID information 688 also includes information identifying a sector to which WT1 has requested as the new attachment point in a handoff request. WT 1 data/info 680 also includes dedicated resource information 690, e.g., information from the set of sector dedicated resource information 672, which has been allocated to WT 1 for use in handoff operations. In different types of handoff operations different resources may be dedicated to WT 1 and included in dedicated resources information 690. For example, an inter-cell handoff into sector 1 of BS 600 may include the allocation of a dedicated device identifier to be used in the specific sector where communicating on a particular carrier, a dedicated uplink timing channel segment and/or a dedicated uplink power control channel segment to WT1, while an intra-cell inter-sector or an intra-cell intra-sector inter-carrier handoff into or within sector 1 of BS 600 may omit the allocation of an uplink timing control channel segment to WT1 and include the allocation of an uplink power control channel segment to WT1. Handoff messages 692 includes handoff messages pertaining to WT1, e.g., handoff request messages received directly or indirectly from WT1 requesting initiation of a different attachment point, dedicated resource allocation messages being sent to WT1 identifying resources, e.g., identifiers and/or uplink segments, that may be used establish a new wireless communications link with a new attachment point, and base station to base station secure communications link establishment messages. Mode information 694 includes information identifying the state of operation of WT 1, e.g., ON, Hold, Access, etc, and information identifying whether a wireless link has been established between WT1 and the base station 600 sector 1, is being established, or is in a process of termination. Mode information 694 also includes information identifying that a new wireless link that being established between WT1 and other base station and/or other sector attachment points.

Routines 654 includes a plurality of sets of routines, e.g., one for each sector covered by the base station (sector 1 routines 651, . . . , sector N routines 653). Routines 651 include communications routines 655, and base station control routines 657. The communications routines 655 implement the various communications protocols used by the base station. The base station control routines 657, using data/information 658, control base station sector 1 operation including the receiver 604, transmitter 610, optional beacon transmitter 622, I/O interface 616, scheduling, ordinary control and data signaling, beacon signaling, and handoff operation, in accordance with the present invention. Base station control routines 657 includes a scheduler module 659, signaling routines 661, handoff routine 663, WT timing control module 665, and WT power control module 667. Scheduler module 659, e.g., a scheduler, schedules air link resources, e.g. bandwidth over time in the form of segments, to wireless terminals for uplink and downlink communications.

Signaling routines 661 control one or more of: the receiver, the decoder, the transmitter, the encoder, ordinary signal generation, beacon signal generation, data and control tone hopping, signal transmission, signal reception, and handoff signaling. Signaling routines 661 include beacon module 669 and handoff signaling module 671. The beacon module 669 uses the beacon information, e.g., sector 1 beacon info 666, to control the generation and transmission of beacon signals in accordance with the invention. In accordance with the invention, beacon signals may be transmitted in each sector in each of the carrier frequency bands used in the sector. In some embodiments, the beacon signals are transmitted through the sector transmitters (610, 612, 614). In other embodiments, some or all of the beacon signals may be transmitted by the beacon transmitters (622, 624, 626). Handoff signaling module 671 controls the handoff signaling, e.g., handoff messages 692, being transmitted from and received by base station 600 sector 1.

Handoff routines 663 include a request processing module 673, a secure base station-base station link establishment module 675, a dedicated resource allocation module 677, a registration module 679, and a wireless link establishment/termination module 681. Request processing module 673 receives and processes requests by a WT to establish a new wireless communications link with a base station sector attachment point. Base station-base station link establishment module 675 uses the data/info 656 including BS-BS info 662 to establishes a secure communications link between BS 600 sector 1 and another base station, the secure communications link can be used to communicate handoff information via I/O interface 616. Dedicated resource allocation module 677 allocates dedicated resources, e.g., such as resources identified in resource info 672, to a WT which has requested a handoff to sector 1 of BS 600. Module 677 may generate information such as dedicated resource info 690 and form such information into handoff messages 692 specifying identifiers, uplink timing control channel segments, uplink power control channel segments, and/or uplink traffic channel segments, which may be communicated via the handoff signaling module 671 either directly or indirectly to the WT, e.g., depending upon whether an inter-cell or intra-cell handoff operation is involved. Registration module 679 may control the performance of registration operations when a WT requests the initiation and establishment of a new wireless link with a base station 600 sector 1 attachment point. Different registration operational sequences may be used depending upon whether the handoff is inter-cell or intra-cell, e.g., with respect to whether or not timing synchronization steps are performed. Wireless link establishment/termination module 681 controls operations in the establishment and termination of wireless link to BS 600 sector 1. For example, in the case of the establishment of a new wireless link, module 681 recognizes that a new link can be established at the time of the earliest allocated dedicated uplink segment that BS 600 sector 1 has allocated to the WT requesting a handoff, and therefore looks for uplink signaling from the WT at the appropriate time. In the case of the termination of a wireless link between BS 600 sector 1 and a WT, e.g., the termination may be based on the BS not receiving any signaling from the WT in a predetermined time, and module 681 performs the timeout measurement and relinquishes resources, e.g., an identifier and associated dedicated segments, following a timeout determination. Alternative termination methods are possible, e.g., the BS sector 1 can monitor the handoff signaling corresponding to the new attachment point, e.g., handoff messages traversing I/O interface 616, and determine when the new wireless link is to be established and terminate based upon that determined time. Alternately, the WT may communicate a termination message to BS 600 sector 1.

WT timing control module 665 performs operations to control the timing of the WTs, e.g., synchronizing the WT with respect to the BS 600 sector 1 so that signals may be processed and decoded. Module 665 processes received timing control information received on dedicated uplink timing control segments allocated by BS 600 sector 1 to a WT seeking to establish a new wireless link. In addition timing control module 665 generates timing correction signals which are sent via the BS sector transmitter over established wireless links which the WT uses to make transmission timing adjustments.

WT power control module 667 performs operations to control the power of WTs, e.g., uplink transmission power of a WT. WT power control module 667 processes received power control information received on dedicated uplink power control segments allocated by BS 600 sector 1 to a WT seeking to establish a new wireless link.

Figure 7:
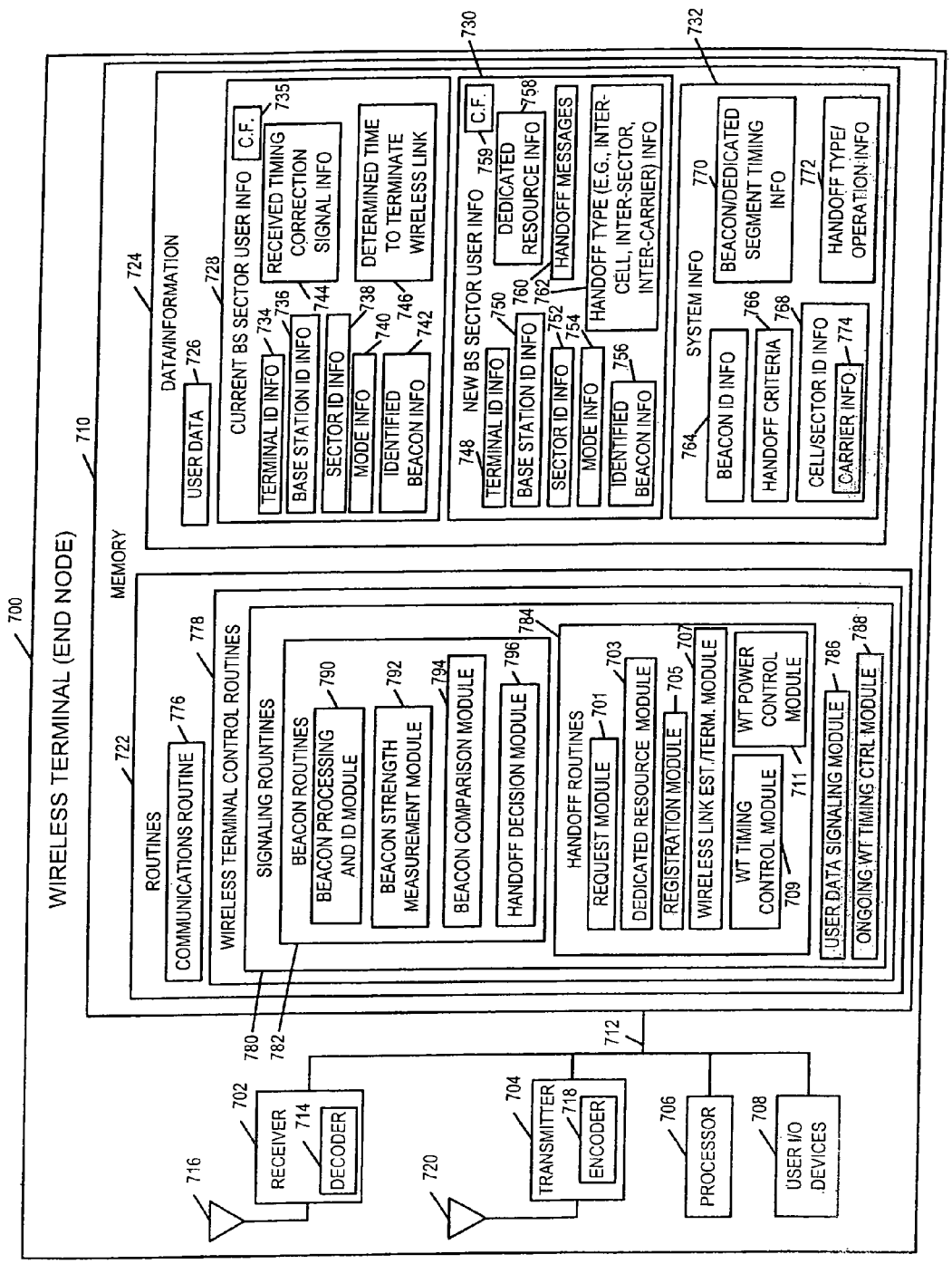
FIG. 7 is a drawing of an exemplary wireless terminal (end node) implemented in accordance with the present invention and using methods of the present invention.

FIG. 7 illustrates an exemplary wireless terminal (end node) 700 such as a mobile node, implemented in accordance with the present invention. The wireless terminal 700 of FIG. 7 may be a more detailed representation of any of the end nodes of the systems of FIG. 1, 2, or 5. The wireless terminal 700 includes a receiver 702, a transmitter 704, a processor 706, e.g., CPU, user input/output (I/O) devices 708, and memory 710 coupled together via a bus 712 over which the various elements can interchange data and information. The receiver 702 including a decoder 714 is coupled to an antenna 716 over which the wireless terminal 700 may receive downlink signaling including beacon signaling and handoff messages including information identifying dedicated resources transmitted from base stations 600 in accordance with the invention. The decoder 714 in the receiver 702 may decode ordinary signaling intended for WT 700 and use error correction coding processes to attempt to recover information overwritten or interfered with by other signals including beacon signaling. The transmitter 704 including an encoder 718 is coupled to an antenna 720 and may transmit signals including encoded information to the base station 600 including requests to initiate a handoff of WT 700 to another base station sector attachment point, timing synchronization information over dedicated uplink timing channel segments, power synchronization information over dedicated uplink power control channel segments, and user data over dedicated uplink traffic channel segments. Different types of handoffs are possible, in accordance with the present invention, said handoffs including one or more of the following characteristics: inter-cell, inter-sector, and/or inter-carrier.

User I/O devices 708, e.g., speaker, microphone, keyboard, keypad, display, mouse, video camera, etc, provide the user of WT 700 the ability to input user data/information intended for peer nodes and to access user data/information received from peer nodes. The wireless terminal's memory 710 includes routines 722 and data/information 724. The processor 706 executes the routines 722 and uses the data/information 724 in memory 710 to control the operation of the wireless terminal 700 including implementing the beacon functions and handoff operations of the present invention.

Wireless terminal data/information 724 includes user data 726 such as voice, text, or other types of data, and/or files intended, e.g., to be sent to/or received from a peer node in a communications session with the wireless terminal 700. Data/information 724 also includes current base station sector user information 728, new base station sector user information 730, and system information 732.

Current BS sector user information 728 includes terminal ID information 734, base station ID information 736, sector ID information 738, mode information 740, identified beacon information 742, received timing correction signal information 744, and determined time to terminate wireless link 746. The terminal ID information 734 may be an identifier or identifiers, assigned to the WT 700 by the base station sector to which the WT 700 is currently coupled via a wireless link that identifies the wireless terminal 700 to the base station sector. Base station ID information 736 may be, e.g., a base station identifier, e.g., a slope value associated with the base station and used in hopping sequences. Sector ID information 738 includes information identifying the sector ID of the sectorized base station's transmitter/receiver through which ordinary signaling is being communicated and corresponds to the sector of the cell in which the wireless terminal is located. Carrier frequency information (CF) 735 indicating the carrier frequency to be used for the current communication link is also sometimes stored in information 728 of data/information 724 in memory 710. Mode information 740 identifies whether the wireless terminal is in an on/hold/sleep state. Identified beacon information 742 may include: information on each of the beacon signals that have been received and measured, e.g., cell/sector ID, signal strength level, filtered signal strength level, and carrier frequency associated with ordinary signaling in the sector from which the beacon signal was transmitted. Identified beacon information 742 may also include information identifying the current attachment point sector beacon, information from comparing adjacent sector beacons to the current WT sector beacon, and information from comparing measured beacon signals and/or information derived from measured beacon signals to handoff criteria. Received timing correction signal information 744 includes timing correction signals received over the established wireless link and transmission timing adjustment information used to correct the timing of signals transmitted by WT 700 over the established wireless link. Determined time to terminate wireless link 746 is the time determined by WT 700 to terminate its established wireless link, during handoff, e.g., based on signaling received over the air from the new base station sector attachment point such as, e.g., beacon signaling and allocated dedicated uplink segments and/or through communication received over an existing link with a current base station.

New BS sector user information 730 includes terminal ID information 748, base station ID information 750, sector ID information 752, mode information 754, identified beacon information 756, dedicated resource information 758, handoff messages 760, and handoff type information 762 and carrier frequency information (CF) 759. The terminal ID information 748 may be an identifier or identifiers, assigned to the WT by the base station sector to which the WT 700 has requested that a handoff be initiated to, that identifies the wireless terminal 700 to that base station sector. Base station ID information 750 may be, e.g., a value of slope associated with the new base station and used in hopping sequences. Sector ID information 752 includes information identifying the sector ID of the new attachment point's sectorized base station's transmitter/receiver through which ordinary signaling will be communicated via a new wireless link. Mode information 754 identifies the state of operation of the WT with respect to the new BS sector attachment point, e.g., transmitting handoff request, waiting for dedicated resource allocation, receiving and processing dedicated resources such as assigned identifier and/or assigned dedicated uplink segrnent, performing handoff operations such as transmitting timing control and/or power control signaling on dedicated uplink channel segments, handoff complete, transmitting user data, hold state, on state, sleep state. Identified beacon information 756 includes information such as timing information pertaining to a received beacon from the new BS sector attachment point. The timing relationship existing between the new BS sector attachment point beacon signal and dedicated uplink segments that may be allocated as resources to WT 700, e.g., in a handoff operation, allows for WT 700 to determine the point in time to terminate the current established wireless link and start uplink signaling to the new BS sector attachment point establishing a new wireless link, such that the interruption interval during the handoff process can be minimized.

Dedicated resource information 758 includes information, e.g., a BS sector assigned WT identifier and/or information identifying dedicated uplink channel segments, from the new BS sector attachment point, which has been allocated to WT 700 for use in a handoff operation. In different types of handoff operations different resources may be dedicated to WT 700 and included in dedicated resources information 758. For example, in an inter-cell handoff information 758 may include information identifying a dedicated uplink timing channel segment and an uplink power control channel segment to WT 700, while in an intra-cell inter-sector handoff information 758 may omit the allocation of an uplink timing control channel segment to WT 700 and include the allocation of an uplink power control channel segment to WT 700. Handoff messages 760 includes handoff messages pertaining to WT 700, e.g., a handoff request initiation message to be transmitted to the new requested BS sector attachment point via the current established wireless link and BS sector, and then through the backhaul link. Handoff messages 760 may also include dedicated resource allocation messages originally sourced from the new base station sector attachment point, transmitted base station to base station via the backhaul link, and received from the current base station sector attachment point via the current wireless link, such messages identifying resources, e.g., identifiers and/or uplink segments, that may be used to establish a new wireless communications link with a new base station sector attachment point. Handoff type information 762 includes information identifying the type of handoff requested, e.g., an inter-cell handoff operation, an intra-cell inter-sector handoff operation, or an intra-cell inter-carrier handoff operation. Inter-cell and inter-sector handoffs, in some-embodiments, are also distinguished by whether or not the handoff operation is an inter-carrier handoff operation.

System information 732 includes beacon ID information 764, handoff criteria 766, cell/sector ID information 768, beacon/dedicated segment timing information 770, and handoff type/operation information 772. System information 732 includes structural information of the wireless communications system, e.g., base station frequency usage, timing structures and repetition intervals. The beacon ID information 764 includes information, e.g., look-up tables, equations, etc, associating specific sector/cell beacons in the communication system to specific frequencies at specific times, allowing the WT 700 to identify the received beacon signal or signals. Handoff criteria 766 may include threshold limits used by the wireless terminal 700 to trigger a hand-off request to an adjacent sector/cell, e.g., a minimum threshold on the strength level of the beacon signal from the adjacent sector and/or a threshold level on the comparative strength of the adjacent sector received beacon signal with respect to the WT's own current sector received beacon signal strength. Cell/sector ID information 768 may include information used to construct hopping sequences used in the processing, transmission, and reception of data, information, control signals, and beacon signals. Cell/sector ID information 768 also includes carrier information 774. Carrier information 774 includes information associating each sector/cell of the base stations in the communications system with a specific carrier frequency, bandwidth, and set of tones. In some embodiments, a base station sector uses different non-overlapping sets of tones for uplink and downlink signaling. Beacon/dedicated segment timing information 770 includes information defining timing relationships between the beacon signals transmitted by the BS sectors and the dedicated uplink segments which may be allocated by the BS sector to WT 700 for use in a handoff. Handoff type/operation information 772 includes information identifying steps or sequences of steps that are performed as a function of the type of handoff. For example, an inter-cell handoff may include a timing synchronization step that is omitted in an intra-cell handoff.

Routines 722 include communications routine 776 and wireless terminal control routines 778. Wireless terminal control routines 778 includes signaling routines 780 including beacon routines 782, handoff routines 784, user data signaling module 786 and ongoing wireless terminal timing control module 788. Wireless terminal communications routine 776 implements the various communication protocols used by the wireless terminal.

Wireless terminal control routines 778 performs the basis control functionality of the wireless terminal including power control, timing control, signaling control, data processing, I/O, control of the beacon related functions, and control of handoff signaling and operation in accordance with the present invention. The signaling routines 780, using the data/information 724 in memory 710, control the operation of the receiver 702 and transmitter 704 to perform operations including beacon signal reception and processing, handoff signaling and processing, and user data signaling and processing.

The beacon routines 782 include a beacon processing and ID module 790, a beacon strength measurement module 792, a beacon comparison module 794, and a handoff decision module 796. The beacon processing and ID module 790, using the system information 732 including beacon ID information 764 and cell/sector ID information 768, identifies a received beacon signal and stores the information in the user's identified beacon info 742. The beacon signal strength measuring module 792 measures the signal strength of a received beacon signal and stores the information in the user's identified beacon information 742. The beacon comparison module 794 compares identified beacon information 742 in order to obtain information that may be used to determine when to initiate a handoff to an adjacent sector/cell. The beacon comparison module 794 may compare individual beacon signal strength levels to minimum threshold levels in the handoff criteria 766. The beacon comparison module 794 may compare relative signal strength levels between a WT's own beacon signal and an adjacent sector/cell beacon signal. The beacon comparison module 794 may compare the relative strength level difference measurements to threshold levels in the handoff criteria 766. The handoff decision module 796 receives output information from the beacon comparison module 794 and makes decisions as to whether or not to initiate a handoff request and to which base station sector using which carrier frequency to initiate the handoff request. Handoff decision module 796 may consider other information such as in process user data sessions when considering the time to initiate the request so as to minimize disruptions.

The handoff routines 784, when triggered by output from the handoff decision module 796 generate signaling to initiate an inter-sector, inter-cell, and/or inter-carrier handoff and perform operations to complete the handoff. The carrier frequency and base station sector attachment point for the new wireless link to be used following hand-off are normally identified, in various embodiments, using beacon signals as discussed elsewhere. Handoff routines 784 include a request module 701, a dedicated resource module 703, a registration module 705, a wireless link establishment/termination module 707, a wireless terminal timing control module 709 and a wireless terminal power control module 711.

Request module 701 generates requests by WT 700 to initiate and establish a new wireless communications link with a different base station sector attachment point. Dedicated resource module 703 receives and processes received signals including signals identifying dedicated resources, e.g., identifiers and/or dedicated uplink segments, allocated to WT 700 by the new BS sector attachment point for handoff operations. Module 703 may receive handoff messages 760 from which dedicated resource information 758 may be extracted and stored. Such information in handoff messages 760 specifies identifiers, uplink timing control channel segments, uplink power control channel segments, and/or uplink traffic channel segments. Registration module 705 uses the data/information 724 including handoff type information 762 and handoff type/operation information 772 to control the performance of registration operations by WT 700 requesting the initiation and establishment of a new wireless link with a base station sector attachment point. Different registration operational sequences may be used depending upon whether the handoff is inter-cell or intra-cell, e.g., with respect to whether or not timing synchronization steps are performed. Registration module 705 may also include signaling to the home agent associated with WT 700 identifying the new attachment point at the appropriate time. Wireless link establishment/termination module 707 controls operations in the establishment of the new wireless link and termination of the old wireless link with respect to the handoff. For example, in the case of the establishment of a new wireless link, module 707 recognizes that a new link can be established at the time of the earliest allocated dedicated uplink segment that has been allocated to the WT requesting a handoff by the new base station sector attachment point, and therefore establishes the new link by performing uplink signaling at the assigned time. In the case of the termination of an established wireless link as part of handoff operations, e.g., the termination may be performed by WT 700 ceasing transmissions over the established wireless link at a appropriate time, e.g., a time just prior to the to the occurrence of the earliest dedicated uplink segment which has been allocated to WT by the new BS sector attachment point. The timing of a received beacon signal stored in information 756 and its known relationship to a dedicated resource identified in information 758 which was allocated by the new BS sector to WT 700 can be used in combination with beacon to dedicated segment timing information 770, which indicates an offset between the dedicated resource and the beacon, to determine the termination time, e.g., so that termination will occur shortly before the time a resource dedicated to the WT for establishing a new link can be used Alternative termination methods are possible; e.g., WT 700 may communicate a termination message over the original wireless link to the base station sector attachment point to be terminated just prior to communicating on the earliest dedicated uplink segment to the new BS sector. In another embodiment, the new BS sector can communicate a termination message over the backhaul BS-to-BS link to the original BS sector WT attachment point upon successfully receiving uplink signaling from the WT during the allocated dedicated segment.

WT timing control module 709 performs operations to control the timing of WT 700, e.g., synchronizing WT 700 with respect to the new BS sector attachment point so that signals may be processed and decoded. Module 709 generates and sends timing control information on dedicated uplink timing control segments allocated by the new BS sector attachment point as part of a timing synchronization operation. In response to timing signals received from BS, the WT timing control module 709 will modify symbol transmission timing, e.g., a clock used to control symbol transmission timing so that symbols are received at the BS from different WTs in a synchronized manner. WT power control module 711 generates and sends power control signals on dedicated uplink power control segments allocated by the new BS sector attachment point as part of a WT power control operation. Thus, module 711 is responsive to power control signals received from the BS to adjust the WT transmission power level e.g., as part of a power control operation. Modules 709 and 711, in addition to generating and sending control signals, also, in some embodiments, receive and process control signals from the new BS sector attachment point as part or WT timing and/or power control operations, e.g., adjusting WT transmission timing and/or WT transmission power as part of the handoff operations.

User data signaling module 786 performs operations including using dedicated resources, e.g., dedicated uplink traffic channel segments, allocated to the WT 700 for the new wireless link by the new BS sector attachment point, to control the transmission of user data over the new wireless link. Ongoing wireless terminal timing control module 788 is used by an established wireless communications link to maintain timing control between the current BS sector attachment point and WT 700 in which the module receives and processes timing control signals which have been communicated over the established wireless link. The processing of module 788 includes, e.g., operating WT 700 to make a transmission timing adjustment to adjust the timing of signals e.g., symbols, transmitted by WT 700 over the established wireless link. In some embodiments, intra-cell inter-sector handoff operations and/or intra-sector inter-carrier handoff operations performed by WT 700 can use the timing synchronization performed by module 788 or perform a predetermined adjustment based on the module 788 information, e.g., a fixed offset, so that dedicated resources for timing adjustment need not be, and are not, allocated to and used by WT 700 by the new BS sector attachment point prior to the allocation and use of at least one uplink segment which is used to communicate non-timing control data. In such as embodiment, in the case of an intra-cell handoff, the WT can terminate an existing link, establish a new link with a new carrier or sector and transmit power control signals and/or user data, prior to changing its transmitter timing in response to a timing control signal transmitted over the air from the new BS sector attachment point.

Depending on the particular embodiment, a base station may not transmit beacon signals corresponding to each of the system frequency bands into a given sector. In some embodiments, a base station may limit the beacon signals transmitted into a given sector to a subset corresponding to the frequency bands used by its own sector and adjacent sectors. In some embodiments, with regard to individual sectors, a base station may limit the beacon signals transmitted into a given sector to a subset corresponding to the frequency bands used in adjacent sectors.

Although shown for a communications system with bandwidth divided between 3 carrier slots (frequency bands), the invention is applicable to other communications systems in which the same frequency band is not used everywhere in the system.

In some embodiments, various features or elements of the invention may be implemented in part of a communications system and not implemented in other parts of the system. In such an embodiment, the wireless terminals, implemented in accordance with the invention, may utilize the beacon signaling features and method of the invention when available in making decisions regarding inter-sector and/or inter-cell handoff.

Various features of the handoff methods and apparatus of the invention will now be described with reference to FIGS. 6-11.

In the case of non-sectorized cells each cell is normally served by a single base station. In the case of sectorized cells, each sector may be served by a different base station or a sectorized base station may be employed. FIG. 6 shows an exemplary sectorized base station (access node) 600 where each sector is serviced by a separate receiver (sector 1 receiver 604, sector 2 receiver 606, . . . , sector N receiver 608), and transmitter (sector 1 transmitter 610, sector 2 transmitter 612, . . . , sector N transmitter 614) which are coupled to different antennas used in each sector. Alternatively, each sector receiver may be coupled to a different portion, e.g., element, of a sectorized antenna, where each portion corresponds to a sector. Similarly, each sector transmitter may be coupled to a different portion, e.g., element, of a sectorized antenna, where each portion corresponds to a sector. In some embodiments, e.g., where uplink and downlink signals use different non-overlapping sets of tones for a given sector, receivers and transmitters for the given sector may use the same antenna or antenna portion.

Thus, in the case of a sectorized base station embodiment 600, the cell's base station 600 includes one receiver and transmitter per sector, each of which includes an analog filter, along with associated routines, modules and data/ information that operate on a per sector basis to handle mobile node registration and other operations in the individual sectors. Thus, base station 600 includes multiple sets of routines (sector 1 routines 651, . . . sector N routines 653) and multiple sets of data/information (sector 1 data/information set 658, . . . , sector N data/information set 660), one per sector. Intra-cell inter-sector handoffs from one sector to another may be viewed as a handoff from a base station sector or module included therein corresponding to a first sector, to a base station module corresponding to a second sector of the same cell.

The use of a single base station 600 in a sectorized cell, in some embodiments, facilitates timing synchronization between sectors of the cell. Common clock circuitry included in clock module 618 may be shared between the base station module's which make up a multisector cell so that symbol timing and other operations in the individual sectors of the cell are synchronized. In the case of intra-cell handoffs, when symbol timing through the different sectors of a cell is maintained, it is possible to reduce or eliminate the need to perform an initial timing synchronization operation when performing a handoff since timing synchronization remains reliable. Accordingly, at least in some embodiments, the time required to implement an intra-cell handoff is reduced by avoiding timing synchronization operations which are used when an unsynchronized mobile device enters the system The intra-cell handoff may be an intersector handoff. Thus, intra-cell handoffs can be implemented in less time and/or using less resources than an inter-cell handoff.

For purposes of explaining the invention it should be appreciated that each cell includes at least one sector and one base station. In some embodiments multi-sector cells and base stations 600 as shown in FIG. 6 are used. A sector can support multiple carrier frequencies in some embodiments. Handoffs occur between sectors or between carriers in a sector. In the case of multi-sector cells, intra-cell as well as inter-cell handoffs may occur. Handoffs involve transfers of information, physical layer signaling including, e.g., device ID assignments for a sector and/or carrier within a sector, and other signaling layer operations, e.g., power and/or timing control which are performed by the module(s) of the sector(s) involved in the handoff. Data may be communicated from one sector to another via communications links, e.g., non-wireless links such as fiber optic or wire links, that exist between one or more base stations and/or between the modules corresponding to the sectors of a single base station.

It will be assumed for purposes of discussion that adjoining cells use different frequencies. However, the handoff method of the present invention can be used in systems with frequency reuse factors of one, e.g., with the steps relating to making filter/receiver changes to accommodate a different frequency being omitted from the handoff processing in the implementations where the same frequencies are used in different, e.g., adjoining sectors.

Figure 9:
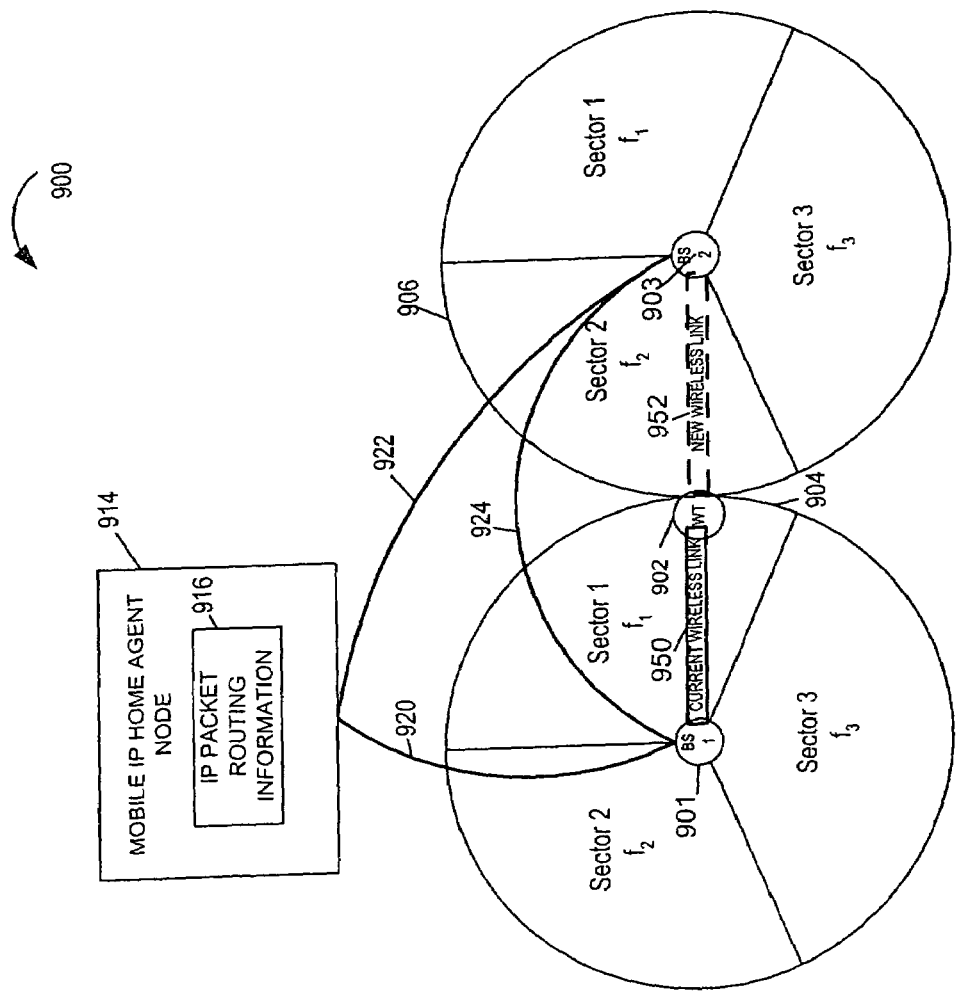
FIG. 9 is a drawing of an exemplary system, implemented in accordance with one exemplary embodiment the present invention, and is used for explaining various features and signal flows related to handoff operations in accordance with the present invention.

FIG. 9 is a drawing of an exemplary system 900 including a first base station (BS1) 901, a second base station (BS2) 903, a WT 902, and a Mobile Internet Protocol (IP) Home Agent (HA) node 914, implemented in accordance with the present invention. The BSs 901, 903 may be similar to or the same as exemplary BS 600, while WT 900 may be similar to or the same as exemplary WT 700.

Using various methods, a mobile node such as the wireless terminal (WT) 902 shown in FIG. 9, engaged in an existing communications session in a first base station sector 904, via first base station (BS1) 901, may identify a cell and/or sector 906 of second base station (BS2) 903 (and/or a sector carrier if multiple carriers are supported in a sector) to handoff to, e.g., because of better signal conditions exist between the identified cell or sector 906 than with the current cell or sector 904. For purposes of explaining the invention, the discussion will be limited for the time being to examples where a single carrier is used in each sector. For discussion purposes, the base station sector 904 with which a mobile device, WT 902, is communicating via wireless signaling, e.g., radio signaling, using current wireless link 950 will be described as the "current base station sector". The mobile device, WT 902, has network connectivity through the wireless connection 950 to the current base station sector 904 and via links 920, 924, 922 to other base station sectors in the same or other cells. The base station sector to which a mobile node, WT 902, seeks to complete a handoff will be referred to as the "new base station sector", and is base station sector 906 in this example. In the case where there is one sector per base station, e.g., as in the case of single sector cells, the new base station sector will be the new base station to which a handoff operation is to be completed. In the case of multi-sector cells the new base station sector may be part of a new base station or a different base station sector within the same cell as the current base station sector.

Figure 8:
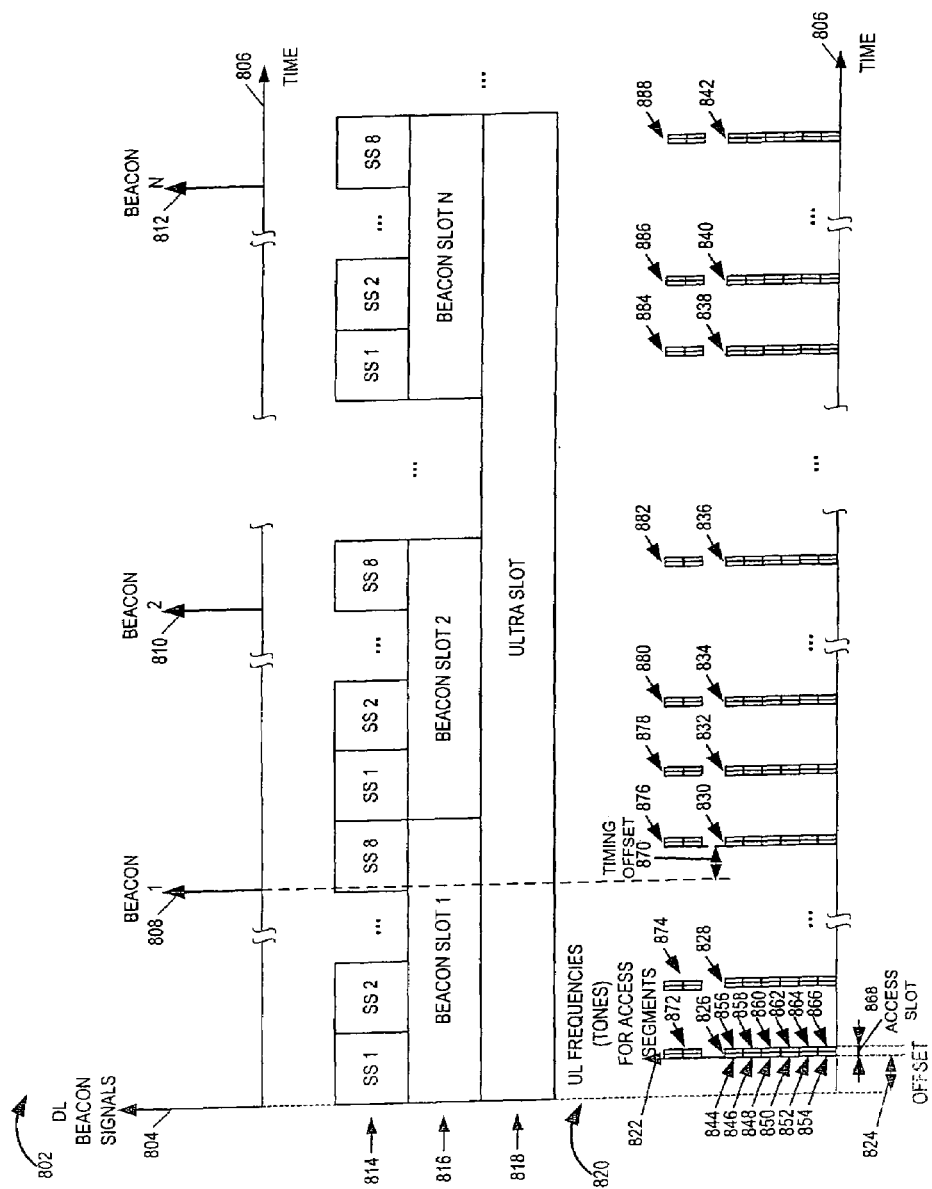
FIG. 8 is a drawing of exemplary downlink beacon signals, exemplary uplink dedicated segments and contention based uplink segments which can be used for access purposes, and exemplary timing relationships, and is used to explain various features of the present invention.

In accordance with various embodiments of the present invention, each sector of a base station periodically transmits a beacon signal into the frequency band, e.g., $f_1$ band, $f_2$ band or $f_3$ band, used by the current sector and by a physically adjacent sector. Drawing 802 of FIG. 8 illustrates exemplary downlink beacon signals (beacon 1 808, beacon 2 810, . . . , beacon N 812) from a base station sector transmitter on the vertical axis 804 vs time on the horizontal axis 806. The transmission of a beacon signal for a given base station sector transmitter into a frequency band occurs in the example at least once during a first plurality of symbol times, sometimes called a beacon slot. In the exemplary embodiment, each base station sector transmitter transmits a beacon signal during a beacon slot. A sequence of beacon signals in which the beacon signal transmitted during one beacon slot uses a different tone or tones than the beacon signal transmitted in another beacon slot within the sequence may be used. The sequence of beacon signals transmitted by a sector transmitter may include different types of beacon signals, e.g., a beacon signal associated with carrier $f_1$, a beacon signal associated with carrier $f_2$, and a beacon signal associated with carrier frequency $f_3$. Other types of beacon signals are also possible in accordance with the present invention, e.g., a beacon signal which used to convey cell and/or sector information. The sequence of beacon signals repeats for each ultraslot which includes N beacon slots, where N is a positive integer. In the example, each beacon slot includes 8 superslots; each superslot includes a fixed positive number of OFDM symbol times, e.g., 113 OFDM symbol times. Superslots are shown by row 814, where 8 superslots are included in a beacon slot, and a beacon is transmitted at a fixed predetermined time within each eighth superslot. Beacon slots are shown by row 816, which include multiple beacon slots, and ultra slots are shown by row 818. The beacon signal within a particular index value beacon slot of the ultra slot repeats from ultra slot to successive ultra slot. A physically adjacent sector, which transmits its own set of beacon signals, may be of the current (present attachment point) cell or an immediately neighboring cell.

Drawing 820 illustrates uplink frequencies (tones) for access segments on the vertical axis 822 vs time 806 on the horizontal axis. It should be noted that there is a time offset 824 between the start of a superslot on the downlink and the start of a corresponding interval on the uplink. In this example, corresponding to each superslot, there is a set of twelve access segments which may be assigned by the base station sector attachment point as a dedicated resource to a wireless terminal which has requested a handoff operation to the base station sector attachment point. Exemplary sets of access segments (826, 828, 830, 832, 834, 836, 838, 840, and 842) are shown in drawing 820. By using dedicated periods of time corresponding to access slots interference with transmissions by WTs already registered in the cell is minimized. Access segments are segments in which WTs entering a sector are permitted to begin transmitting, e.g., for purposes of registering in the sector, performing initial timing control operations, and/or performing initial power control operations in a sector.

Each set of access segments occurs during an access slot, e.g., set 826 occurs during access slot 868. The set of twelve access segments 826 includes access segments (844, 846, 848, 850, 852, 854, 856, 858, 860, 862, 864, and 866). The access segments corresponding to a base station sector attachment have a fixed timing relationship with respect to the beacon signals transmitted by that base station sector transmitter. In some embodiments, the access segments corresponding to a base station sector attachment point have a fixed timing relationship with respect to other beacon signals transmitted by the same base station. Note that because the beacon signals of different carriers transmitted by the same base station are synchronized with fixed timing relationships, the access segments of one carrier have a fixed timing relationship with respect to the beacon signals transmitted by the same base station into other carrier bands used by the base station and not just the beacon signal transmitted into the same frequency band to which the access segments correspond. This known relationship may be used by the wireless terminal involved in the handoff operation in determining the point in time to terminate the wireless link with the currently connected base station sector attachment point and to start to communicate over the new wireless link on the uplink using the assigned uplink access segment. Timing offset 870 shows an exemplary offset between beacon signal 1 808 and the earliest access segments of set 830. Each access segment includes one or more symbol times and uses one or more tones. In the exemplary embodiment each of the access segments, includes the same number of tone-symbols, a tone-symbol being a basic unit of air link resource representing one tone for one OFDM symbol interval time. In other embodiments different number of access segments may be available and different types of access segments, e.g., for different purposes may include different numbers of tone-symbols. For example an access segment for timing control operations may have different characteristics than an access segment for power control operations. Each access segment is a dedicated segment dedicated for mobile device access uplink signals, e.g., registration, operations, e.g., device ID assignment, timing control and/or power control operations where a device entering a sector can perform such operations, e.g., using one or more of a plurality of segments (844, 846, 848, 850, 852, 854, 856, 858, 860, 862, 864, 866) dedicated for this purpose which has been assigned to the WT by the base station sector scheduler.

In some embodiments, access segments assigned for timing control operations shall precede segments assigned for power control operations. For example, in the case of an inter-cell handoff operation, a WT may be assigned one segment from the set of segments (844, 846, 848, 850, 852, 854) to be used to transmit timing control signal(s) and one segment from the set of segment (856, 858, 860, 862, 864, 866) to be used to transmit power control signal(s). The assignment of these dedicated resources having been conveyed to the wireless terminal via the original wireless link, e.g., via current wireless link 950 after having been communicated from BS2 903 sector 906 through network link 924 to BS1 901 sector 904. Different segments may use different sets of tone-symbols. In some embodiments, different types of access segments use different sets of tones. In some embodiments, as shown in FIG. 8, the tone-symbols of a segment are contiguous; however, in other embodiments, tone-symbols included in a segment may not be continuous.

In some embodiments of the invention, a sector uses different frequencies to transmit the beacon signal into the adjacent sector during a set of N successive beacon slots. The N successive beaconslots form what is referred to as an ultraslot. The exact pattern of beacon signaling does not repeat in the exemplary embodiment within the ultraslot, e.g., different beaconslots may use slightly different frequencies for beacon tones, but does repeat with the next ultraslot. However, the beacon signaling pattern will repeat from one ultraslot to the next.

From a beacon signal received from an adjoining base station sector, a mobile device 902 can, and in various embodiments does one or more of the following: determine the quality of the communications channel between the mobile device and the base station sector from which the beacon signal was transmitted and select between a plurality of sectors to make a handoff decision based on beacon signal measurement(s) and other information such as traffic loading, determine the cell and/or sector identifier, e.g., slope, of the cell which includes the transmitting sector, determine the frequency band (e.g., sector type) of the sector and/or sector carrier corresponding to the transmitted beacon signal, determine the relative timing within a super slot between the timing in the current base station sector and the timing within a super-slot of a base station sector selected by the mobile node to be the new base station sector to which a handoff operation is to be completed.

Figure 10:
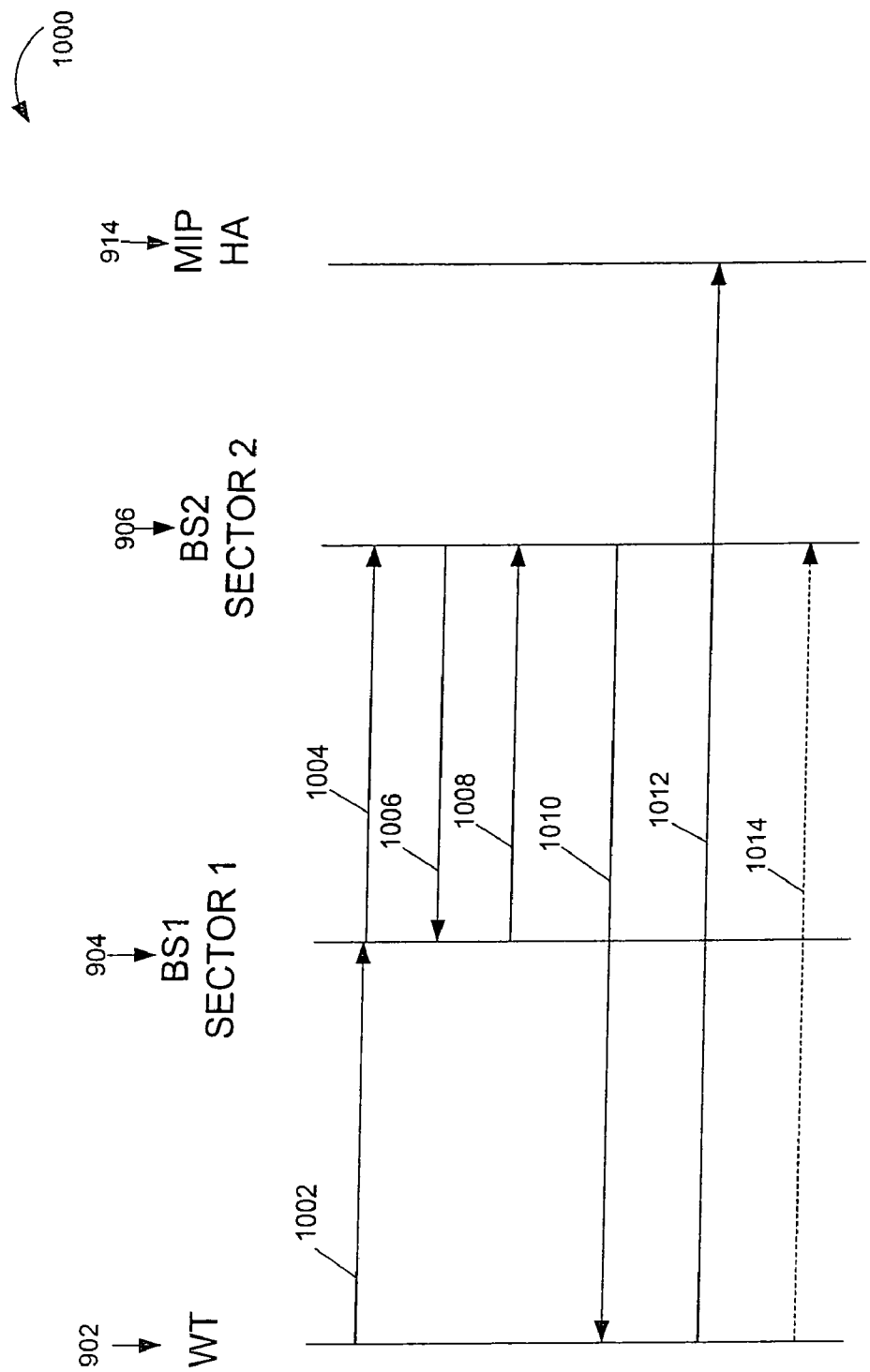
FIG. 10 is a drawing illustrating exemplary handoff signaling in accordance with the present invention.

Once a decision to implement a handoff is made by a mobile device, e.g., based on the relative strength of beacon signals received from different network attachment points, in accordance with the present invention, a handoff is initiated by the mobile device through the current base station sector with which the mobile device is communicating. In this manner a handoff can be initiated through the current base station sector without the need for the mobile device to switch its receiver/transmitter circuitry from the frequency band of the current base station sector to the frequency band of the new base station sector. FIG. 10 illustrates various exemplary handoff related signaling, e.g., which occurs in some embodiments. The mobile device 902 transmits a signal 1002 to the current base station sector 904, e.g., a cell identifier and/or a sector type identifier corresponding to the adjacent sector 906 to which a handoff is to be completed. The current network attachment point, base station sector 904 in this example, uses this information to enable communications between the mobile node 902 and the new network attachment point, e.g., base station sector 906 in this example. In some embodiments the current BS sector acts as a router and simply relays handoff messages between the mobile node and the new network attachment point. However, for communications purposes and to reduce the amount of signaling required over the current air link with the mobile device, the current base station sector 904 may, and often does, act as a proxy in either relaying communications between the mobile device 902 and the new base station sector 906 or negotiating handoff with the new base station sector 906 on behalf of the mobile device 902. Thus, handoff information is communicated on behalf of the mobile node to the new base station sector over links, which are often wireline (e.g., copper or fiber optic lines), connecting base stations and/or sectors within a base station. In the case of links between base stations, such links may include backhaul links. Handoff communications between the base station sectors may, and often are, subject to authentication and/or other security procedures, including encryption, before handoff communication is allowed to proceed further. In such embodiments, a secure communications link is established between the current network point of attachment and the new network point of attachment with handoff messages including resource assignments being passed over the secure link.

In FIG. 10, signal 1004 represents the transmission of a signal from BS1 to the new BS sector 906 to initiate a handoff on behalf of mobile 902. This signaling may include mobile node identification information as well as the base station identifier and sector identifier supplied by the mobile 902 and/or other information indicating an intent to initiate a handoff. The new BS sector 906 responds by sending a security challenge 1006 to the current BS sector 904. The BS sector 904 responds with the correct reply 1008 thereby establishing a secure communications link for purposes of further handoff related signaling. In an alternative embodiment, at least some of the above steps of 1004, 1006 and 1008 are omitted. The WT sends information (see below step 1010) through the current base station sector to the new base station sector.

Once a sufficient level of security is established between the current base station sector 904 and the new base station sector 906, the mobile node 902 can communicate through the current base station sector 904 information including its intent to complete a handoff to the new base station sector 906 and/or receive information from the new BS sector 906. Following the current base station sector 904 signaling the new base station sector 906 of the impending mobile device handoff, the new base station sector 906 assigns the mobile device 902 a dedicated communications resource, e.g., at least one device identifier to be used by the mobile device 902 in regard to air link signaling upon entry into the new sector 906. In some systems multiple device identifiers are assigned to the mobile 902 for use in a sector 906, e.g., one to be used by the mobile when operating in an "on-state", and another identifier identifying the mobile among a set which includes a relatively large number of mobiles which can operate in the cell in a "hold" state at the same time in the sector. Signal 1010 represents the transmission of device identifiers and resource allocation information to the WT 902 via the current BS sector 904. Thus, device identifier assignments, used for physical layer signaling such as over the air signaling, are made by the new base station sector 906 to the mobile 902 via the current base station sector 904. In addition to assigning device identifiers to be used in the new base station sector, the new base station sector 906 can, and often does, reserve dedicated resources, e.g., uplink and/or downlink channel segments, for the mobile device for purposes of performing access including initial closed-loop power control and/or timing control signaling upon entry into the cell, e.g., as part of a registration process. In various embodiments, a set of tone-symbols, e.g., segment 844, dedicated for timing control and/or a set of tone-symbols, e.g., segment 856, dedicated for power control signaling purposes during registration is assigned to the mobile device 902 by the new base station sector 906. Each set of dedicated tone-symbols, e.g., segment 844, may be one of a plurality of sets of tone-symbols, e.g., segments, available in a particular portion of the air link resources, e.g. available to handoffs but not to new initial entry into the cell. Those tone-symbol sets, e.g., segment 844, are used on the basis of the assignment given by the base station. Therefore, although those tone-symbol sets, e.g., segments, are used for access, there is no contention in those tone-symbol sets, e.g., segments, since they are dedicated for use to a specific WT. Moreover, as the use of the tone-symbol sets, e.g., segments, is based on the assignment, the base station knows which mobile devices are supposed to use which tone-symbol sets, e.g., segments, which is very different from a contention-based random access situation where the base station does not necessarily know the identity of the mobile devices even after the base station has detected one or more access signals. In signal 1010, which may include multiple IP packets and/or separate messages, the assignment of dedicated resources to be used to complete timing and/or power control upon entry into the new base station sector is communicated to the mobile device along with information identifying the time period within an ultra slot in which the resources are dedicated to the mobile, e.g., the timing of the dedicated uplink segment in the ultraslot. The time period is specified, in some embodiments, within an ultraslot 818 to take into consideration the fact that communications between the mobile node 902 in the current base station sector 904 and the new base station sector 906 via the current base station sector 904 may take longer than a superslot time period to communicate due to communications delays associated between the links between base station sectors 904, 906. The mobile device, e.g., WT in some embodiments interprets the assignment information using stored information about the framing structure of the communications channels used by the new network attachment point. This information may, and in some embodiments is, accessed and retrieved using beacon information. For example, a WT may retrieve from memory communications channel information relating to a network access point corresponding to a beacon signal which resulted in the network access point being selected as the new network access point. This information can be used to interpret resource assignment information received from the new network access point and/or to determine the time of a dedicated segment relative to the time a beacon signal was received.

In addition to the dedicated resources, e.g., tone-symbol sets, e.g., segments, set aside in a particular access slot for a pre-assigned mobile node which has signaled an intent to transfer to the new base station sector, other tone-symbol sets, e.g., other segments, are available in some embodiments for use on a contention basis, e.g., for mobile nodes newly entering the cell without prior notification via another base station sector to performing timing and power control operations. FIG. 8 illustrates such contention based segments that are set aside during each access slot. During access slot 858 four exemplary contention based segments are set aside as indicated by segments 872. Similarly, during subsequent access slots, sets of contention based segments 874, 876, 878, 880, 882, 884, 886, and 888 are available. Each set of four segments, e.g., segment set 872 may accommodate two WTs, where each WT uses one segment for timing synchronization operations and one segment for power control operations. In some embodiments, the WT uses the contention based access segments following a failure of a handoff attempt using allocated dedicated access segments.

By using dedicated pre-assigned resources during the access (registration) interval, e.g., registration slot, as opposed to trying to use resources where collisions are possible, e.g., due to competing devices attempting to use the same set of tones at the same time, the chance a mobile node entering the base station sector and being able to complete registration, timing control, and/or power control operations at a predictable time, e.g., at a particular time within an ultraslot, is greatly increased as compared to where contention based resource allocation is used.

Upon entry into a base station sector from another cell, a mobile node may be required to complete timing synchronization and/or power control signaling before being allowed to receive/send IP packets corresponding to communications sessions via the new base station sector. The handoff methods of the present invention increase the predictability of when such IP signaling will occur while reducing the time required to complete physical layer power control and timing synchronization operations upon entry into a new base station sector.

In accordance with one feature of the present invention, an IP routing update signal 1012 is sent, via the current base station sector 904, to cause IP packets intended for the mobile node 902 to be redirected to the new base station sector 906, after a handoff operation is initiated. This normally occurs before handoff signaling has been completed in the new sector, e.g., before registration, power control signaling, and/or timing control signaling required for the WT to receive/send packets via the new link has been completed. The signaling 1012 may be to a mobile IP home agent 914 responsible for redirecting packets addressed to the mobile node 902 to the mobile node's current point of network attachment. Given delays associated with the communication of such routing update signals, by initiating the IP packet redirection from the current base station before physical layer signaling setup operations are completed in the new base station sector, packet redirection delays can be made to correspond to the time period during which the mobile device 902 is temporarily unreachable due to the delays associated with frequency band switching, timing synchronization operations and/or power control signaling. Thus, by the time the mobile device 902 is able to receive IP packets in the new base station sector 906, or shortly thereafter, the IP routing update operation may have been completed.

In some embodiments, the IP routing update request 1012 is transmitted in response to the mobile device 902 being assigned a resource, e.g., an identifier, to be used in the new base station sector 906 and/or being assigned dedicated communications resources required to complete any timing control and/or power control operations which need to be completed prior to the mobile device 902 being able to receiver IP packets in the new base station sector 906. In such embodiments, IP routing updates 1012 are transmitted via the current base station sector 904 after it is known with a high degree of certainty that a handoff operation will successfully be completed. The routing update message may be triggered by receipt of a resource assignment message from BS2, at BS1, which is directed to the WT seeking to complete a handoff. In such cases, IP routing updates will not be triggered in cases where the new base station sector 906 is unable to allocate the resources required to accept the mobile device 902, e.g., because the maximum supported number of devices are already present and active in the cell precluding device ID assignment. In cases where packets are received at the new BS prior to the WT establishing a communications link with the new BS, the BS stores the received packets in a buffer and, upon successful completion of a handoff and establishment of a communications link supplies the packets addressed to the WT to the WT over the newly established communications link.

A handoff initiated via a current base station sector 904 may fail to be completed successfully, e.g., due to interference with the dedicated set of tone-symbols allocated for initial timing and/or power control operations with regard to the new base station sector 906. In some cases, the above described handoff process is repeated but this requires connectivity to be re-established through the old BS sector 904. However, in other cases rather than attempt to initiate a handoff via the current base station sector 904 again, having already switched to the frequency sub band of the new base station sector 906 and thereby terminating the communications link via the old sector, the mobile node 902 proceeds to register in the cell in the same manner as other mobile devices entering the cell without having a preexisting communications session with an adjacent sector. In such embodiments, if a registration is not successfully completed using the dedicated set of resources assigned to a device as part of a handoff operation, the base station sector 906 frees the airlink resources dedicated to the WT seeking to implement a handoff e.g., the assigned mobile device identifier is released for use by another device.

After successful registration by a mobile node with a new sector, the new BS sector 906 becomes the current BS sector through which IP packets are to be communicated between the mobile device 902 and other devices. Signaling 1014 represents the transmission of radio signals to the new BS sector 906 via wireless link 952 to communicate IP packets following successful registration.

Figure 11:
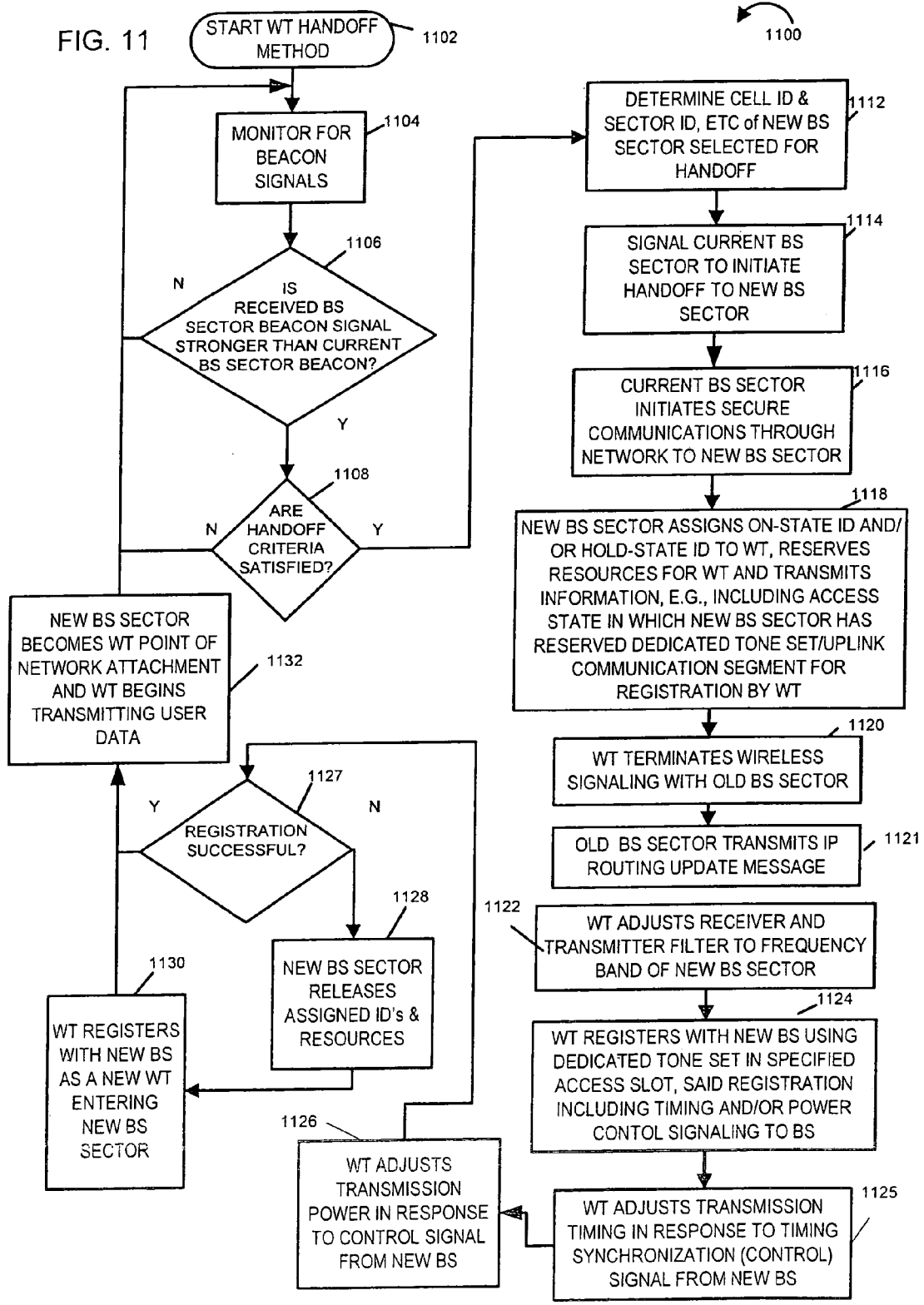
FIG. 11 is a flowchart of an exemplary method of operating a wireless communications system to perform handoffs of a wireless terminal from one base station sector point of attachment to another base station sector point of attachment in accordance with the present invention.

FIG. 11 is a flowchart 1100 of an exemplary method of operating a wireless communication system, e.g., an OFDM wireless communications system using beacon signals, to perform handoffs of wireless terminals from one base station sector attachment point (AP) to another base station sector attachment point in accordance with the present invention. In the case were a single carrier is used in each sector, the sector servers as the base station sector attachment point. The steps in FIG. 11 refer to BS sectors. These references are to be interpreted as referring to BS sector attachment points which, in the case of a single carrier BS sector, will in fact be the same as the BS sector. However, when multiple carriers are used in a sector, the sector may include multiple BS sector attachment points, one for each of the carriers supported in the sector. In an embodiment which supports multiple BS sector attachment points per sector, each BS attachment point corresponding to a different carriers the receiver components corresponding to each carrier serve as a separate base station attachment point. In such an embodiment a handoff can occur within a sector from one carrier to another carrier frequency as the attachment changes from a BS attachment point associated with one carrier to a BS attachment point in the same sector corresponding to another carrier. Operation starts in step 1102, in which an exemplary WT is currently attached to a base station sector attachment point.

For purposes of explaining the method of the invention, it will be assumed that the base stations in the system are transmitting beacon signals on a periodic basis for each of the possible BS sector attachment points and the WT has strength information on the last received beacon signal corresponding to the current attachment point. FIGS. 3 and 4 are exemplary of the type of signaling which may occur in multi-sector cells with one carrier pre-sector which each sector serves as a single point of network attachment.

Operation proceeds from step 1102 to step 1104. In step 1104, the WT monitors for beacon signals. Detected beacon signals are identified as to their transmission source, e.g., corresponding base station sector and corresponding carrier frequency, measured as to their received signal strength level, and the obtained information is stored.

Then, in step 1106, for each detected beacon a comparison is performed to determine if a beacon signal of a potential carrier corresponding to a different sector and/or carrier within the current sector is stronger than the current BS sector attachment point beacon signal. If the potential carrier BS sector beacon signal is not stronger than the current BS beacon signal, then operation returns to step 1104, where the WT continues to monitor for additional beacon signals. However, if a detected adjacent BS sector beacon signal is stronger than the current BS sector beacon signal, then operation proceeds to step 1108. In step 1108, the WT is operated to check if handoff criteria are satisfied. For example, satisfied handoff criteria may include the potential carrier BS beacon signal being stronger than the current BS beacon signal by a predetermined margin, the potential carrier BS beacon signal meeting a minimal signal strength threshold level, and/or the potential carrier BS beacon signal having exceeded the current BS beacon signal for a predetermined amount of time or number of successive iterations. If the handoff criteria of step 1108 is not satisfied, operation proceeds from step 1108 to step 1104, where the WT continues to monitor for additional beacon signals. If the handoff criteria of step 1108 is satisfied, operation proceeds to step 1112.

In step 1112, the WT determines the cell ID, sector ID, and other identifying information, e.g., carrier frequency, of the new BS sector attachment point, e.g., new section and/or current section but new carrier frequency selected for the handoff. Then in step 1114, the WT is operated to signal the current BS sector to initiate a handoff to the new BS sector. The new BS sector requested attachment point may be, e.g., in a different cell, in a different sector of the same cell, or in the same sector of the same cell using a different carrier frequency. Operation proceeds from step 1114 to step 1116. In step 1116, the current BS sector attachment point initiates secure communications through the network to the new BS sector attachment point. In the case of an inter-cell handoff, a secure communications link is established between the two base stations, e.g., through the backhaul network links, and the request from the WT is forwarded over the secure link from the current base station sector to the new BS sector. In the case of an intra-cell or intra-sector handoff signaling is internal to the BS and may therefore be secure by the physically limited nature of the link. Operation proceeds from step 1116 to step 1118. In step 1118, the new BS sector allocates an air link resource to the WT, e.g., assigns an on-state identifier and/or a hold-state identifier to the WT, reserves additional resources for the WT such as an uplink transmission segment, and transmits information including access state in which the new base station now has reserved a dedicated tone set, e.g., dedicated tones to be used during the time period of the dedicated uplink segment, for registration by the WT. In some embodiments, reserved resources include dedicated uplink timing control channel segments, dedicated uplink power control channel segments, and/or dedicated uplink traffic channel segments. In some embodiments, each type of channel uses different sets of tones. In intra-cell handoffs, an initial dedicated uplink timing control channel segment may not be required and may not be reserved and assigned, as the new BS sector point of attachment being collocated with the current base station sector and sharing common clock circuitry may be operated to be timing synchronized with respect to the current base station sector, allowing the WT to skip an initial timing re-synchronization step in the registration process of the handoff. Operation proceeds from step 1118 to step 1120. In step 1120, the WT terminates wireless signaling with the old BS sector attachment point, e.g., by ceasing to transmit addition signals on the uplink over the original wireless link. The point in time chosen to terminate the original wireless link is determined by the WT to be prior to the transmission of the earliest uplink signaling to the new BS sector attachment point using the allocated dedicated resources, e.g., just prior to the uplink timing control signaling to the new BS sector using the allocated dedicated segment or at some fixed time prior to uplink signaling to the new attachment point. At this point in time, or shortly before the point the connection is terminated, the current BS sector in step 1121 may transmit a routing update message signaling the IP routing system to start routing packets including an address corresponding to the WT to send the IP packets to the new BS even though the registration with the new BS has not been completed. Operation proceeds from step 1121 to step 1122. The dedicated segments assigned by the new BS sector have a fixed timing relationship to the beacon signal corresponding to new BS sector, and this known relationship can be used by the WT in the determination of original link termination time. Operation proceeds from step 1120 to step 1122. In step 1122, the WT adjusts its receiver to the frequency band of the new BS sector attachment point. Then, in step 1124, the WT registers with the new BS sector attachment point using the dedicated resources, e.g., assigned identifier, dedicated uplink channel segments including dedicated tone sets in specified access slot(s). In the case of an inter-cell handoff this involves transmitting timing control and/or power control signals to the new BS sector before user data is transmitted to the new BS sector. A timing control signal to the BS, in some but not all embodiments, is used for multiple purposes and can serve, e.g., as a registration signal in addition to serving as a timing control signal. In the case of an intra-cell handoff the timing control signaling operation is skipped in some embodiments since timing synchronization is maintained in some embodiments across sectors of the cell. Power control signaling is optional and need not be performed in all intra-cell and inter-cell handoffs before the WT can receive and transmit user data. The BS sector responds to the timing and/or power control signals, when used as part of the registration process, by transmitting corresponding control signals to the WT. A timing synchronization (control) signal is transmitted to the WT in response to a received timing control signal. The timing synchronization signal can indicate to the WT that it should advance, retard or leave its transmission timing unchanged. In the case of power control signaling, a power control signal is transmitted to instruct the WT to, e.g., increase, decrease or leave its transmission power unchanged.

In the case of an inter-cell handoff operation proceeds from step 1124 to step 1125 wherein the WT adjusts its transmission timing in response to the timing synchronization signal received from the new BS. In the case of intra-cell handoffs the initial timing control performed in step 1125 as part of the handoff can be skipped when symbol timing synchronization is maintained throughout the sectors of a cell and already exits with the WT as a result of one or more previous symbol transmission timing adjustments made based on one or more timing control signals received from the BS sector to which the WT was attached prior to the handoff. Operation proceeds from to step 1125 to step 1126 wherein the WT adjusts its transmission power, assuming transmission power control is performed as part of the registration process in response to a transmission power control signal received from the new BS. In various embodiments, the transmission power control is optional in the registration process. Accordingly, in some embodiments step 1126 is skipped. Operation proceeds from step 1126 (or 1125 when step 1126 is skipped) to step 1127 where the new BS sector checks to determine whether or not the registration was successful. For example, the new BS sector attachment point checks if it has successfully received registration information from the WT over the dedicated assigned uplink segments during the assigned access slot, e.g., receiving the proper identifier and signaling to achieve WT timing synchronization and WT power control signaling when implemented. If the registration was successful, operation proceeds from step 1126 to step 1132. In step 1132, the new BS sector attachment point becomes the WT's point of network attachment at which point the WT can begin transmitting user data, e.g., text, voice and/or image data included in IP packets, to the BS. The new BS sector attachment point can also begin transmitting IP packets directed to the WT over the established communications link. As a result of the routing update process which begins in some embodiments of the invention prior to the registration process with the new BS sector attachment point being completed, packets addressed to the WT may begin being received by the new BS sector attachment point, e.g., new BS sector in the case of a single carrier sector, prior to completion of the registration process. Such packets are temporarily stored and forwarded to the WT over the new communications link upon completion of the registration process in step 1132 with the new BS sector attachment point now serving as the WT's network point of attachment. Operation proceeds from step 1132 to step 1104, where the WT monitors for additional beacon signals. Returning to step 1126, if the registration was not successful, e.g., the new BS sector attachment point was not able to obtain appropriate registration information and signals, e.g., due to interference, then operation proceeds to step 1128. In step 1128, the new BS sector attachment point releases the assigned IDs and assigned dedicated resources, e.g., dedicated uplink segments. Operation proceeds from step 1128 to step 1130. In step 1130, the WT registers with the new BS sector attachment point as a new WT entering the new BS sector would, e.g., using contention based uplink resources to request registration with the BS sector. Operation proceeds from step 1130 to step 1132, in which the new BS sector attachment point becomes the WT's point of network attachment.

Figure 12:
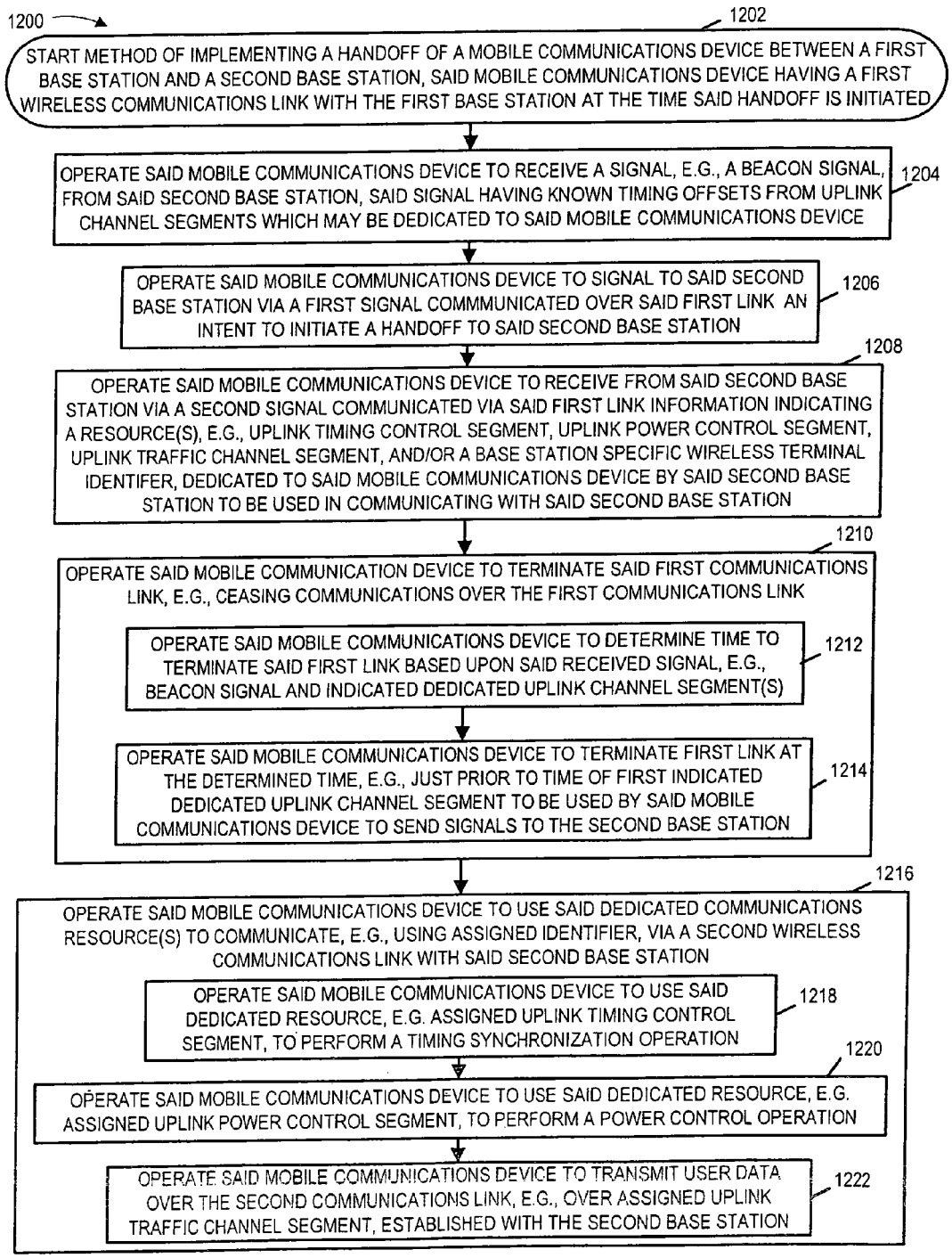
FIG. 12 is a flowchart of an exemplary method, in accordance with the present invention, of operating a mobile communications device to implement a handoff of the mobile communications device between a first base station and a second base station, said mobile communications device having a first wireless communications link with the first base station at the time the handoff is initiated.

FIG. 12 is a flowchart 1200 of an exemplary method of operating a mobile communications device, e.g., a mobile wireless terminal such as a mobile node, to implement a handoff of the mobile communications device between a first base station and a second base station, said mobile communications device having a first wireless communications link with the first base station at the time said handoff is initiated. The method of implementing the handoff starts in step 1202 and proceeds to step 1204. In step 1204, the mobile communications device is operated to receive a signal, e.g., a beacon signal, from said second base station, said signal having known timing offsets from uplink channel segments which may be dedicated to said mobile communications device. The first and second base stations may not be synchronized with respect to one another, and the mobile communications device, operating with respect to the first base station timing can and does advantageously use the second base station beacon signal to determine timing associated with second base station dedicated uplink segments. Operation proceeds from step 1204 to step 1206. In step 1206, the mobile communications device is operated to signal to said second base station, via a first signal communicated over said first link, an intent to initiate a handoff to said second base station. For example, the mobile communications device can send a request for handoff over the first wireless communications link, and the first base station can forward the request via the backhaul network to the second base station. Operation proceeds from step 1206 to step 1208. In step 1208, the mobile communications device is operated to receive from the second base station, via a second signal communicated via said first link, information indicating a resource(s) dedicated to said mobile communications device by said second base station to be used in communicating with said second base station. For example, the second base station may send information indicating dedicated resources, thus conveying a grant corresponding to the handoff request. The information may be conveyed from the second base station to the first base station via the backhaul link, and the first base station may forward such information as a second signal over the first wireless link. The dedicated resource(s) may be, e.g., an uplink timing control segment, an uplink power control segment, an uplink traffic channel segment, and/or a base station specific wireless terminal identifier dedicated to said mobile communications device by said second base station to be used in communications with said second base station. Operation proceeds from step 1208 to step 1210.

In step 1210, the mobile communications device is operated to terminate said first communications link. For example, the termination may be performed by the mobile communications device ceasing communications over the first communications link. Step 1210 includes sub-steps 1212 and 1214. In sub-step 1212, the mobile communications device is operated to determine the time to terminate said first link based upon said received signal, e.g., a received beacon signal, from the second base station and indicated dedicated uplink channel segment(s). For example, the mobile communications device may determine the termination time as the point in time just prior to the time of the earliest indicated dedicated uplink segment to be used by said mobile communications device to send signals to the second base station over the second wireless link, e.g., the time of the assigned dedicated timing control uplink segment. Operation proceeds from sub-step 1212 to sub-step 1214. In sub-step 1214, the mobile communications device is operated to terminate the first link at the time determined in sub-step 1212 based on a signal received from the new BS. In some embodiments, the termination may involve sending a termination signal from the mobile communications device to the first base station over the first wireless link. In some embodiments, the mobile communications device terminates the first wireless communications link by ceasing to send additional signaling over the link. Operation proceeds from step 1210 to step 1216.

In step 1216, the mobile communications device is operated to use said dedicated communications resource(s) to communicate via a second wireless communications link with said second base station. For example, the mobile communications device may have been assigned by the second base station an identifier to be used in wireless communications with the second base station over the second communications link. In some embodiments, some specific dedicated uplink segments may be associated with a specific identifier and reserved for use by the mobile communications device assigned by the base station to use that specific identifier. In some embodiments, some dedicated uplink segments are assigned by the base station on a segment by segment basis to mobile communications devices. Step 1216 includes sub-steps 1218, 1220 and 1222. In sub-step 1218, the mobile communications device uses a dedicated resource, e.g., an assigned uplink timing control segment, to perform a timing control synchronization operation. For example, the mobile communications device sends uplink signaling during the assigned uplink timing control segment, and the signaling is received by the second base station. A signal received from the BS is then and used to synchronize timing between the mobile communications device and the second base station. The timing synchronization operation normally involves adjusting the WTs symbol transmission timing based on a signal received from the BS. Operation proceeds from sub-step 1218 to sub-step 1220. In sub-step 1220, the mobile communications device is operated to use said dedicated resource, e.g., an assigned uplink power control segment, to perform a power control operation. For example, the mobile communications device sends, using an assigned uplink power control or other segment, a signal at a specified power level to be received and measured by the second base station. The base station subsequently convey power adjustment signals to the mobile communications device to which the mobile responds by adjusting its transmission power level. Operation proceeds from sub-step 1220 to sub-step 1222. In sub-step 1222, the mobile communications device is operated to transmit user data e.g., voice, text, or other information, over the second communications link that has been established with the second base station. User data can be communicated using one or more dedicated uplink traffic segments may have been assigned by the second base station to the mobile communications device, and the mobile communications device, which has been previously timing synchronized and power controlled based on signals from the new base station which can communicate user data in a reliable manner on the uplink to the second base station.

Figure 13:
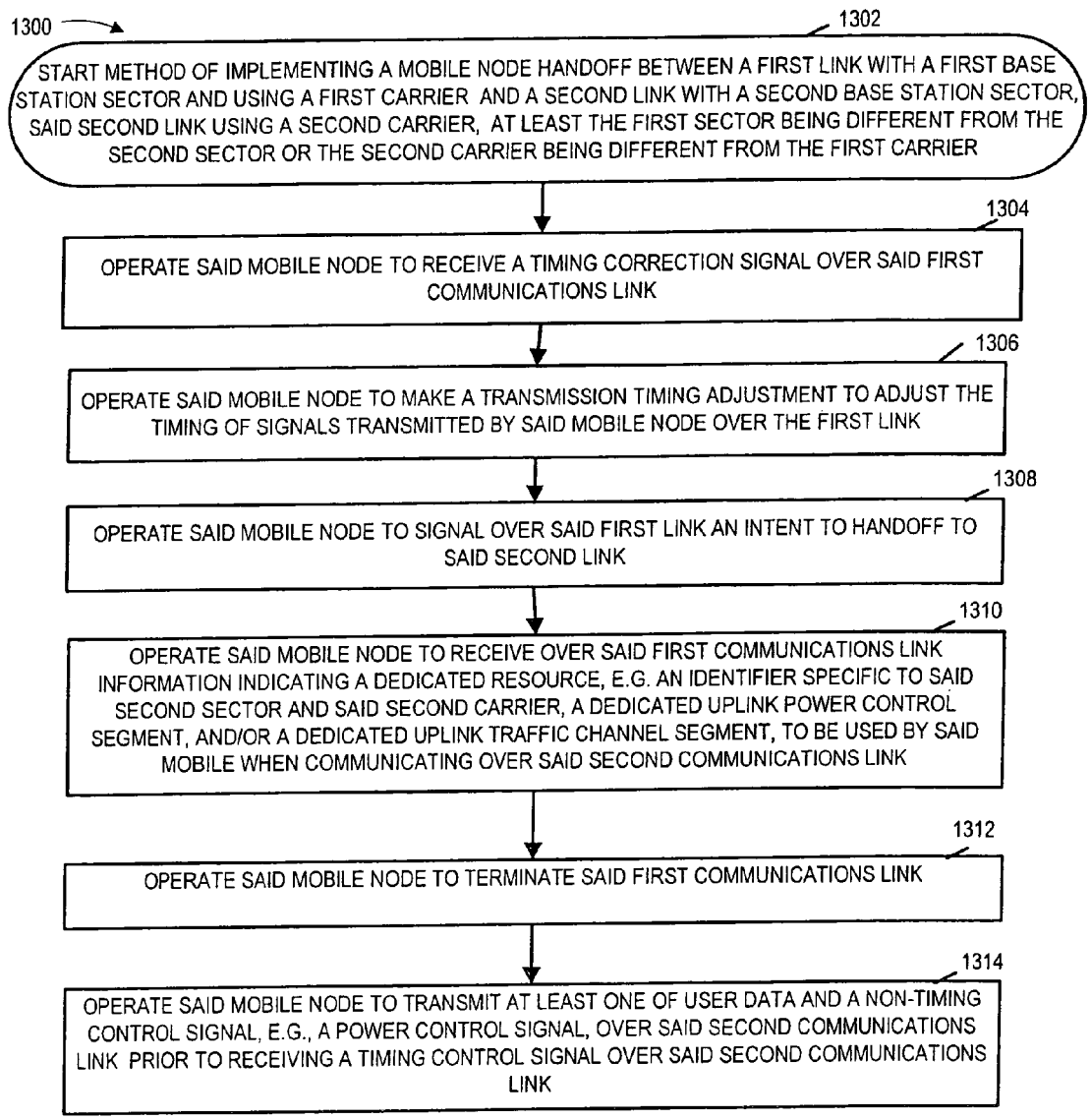
FIG. 13 is a flowchart of an exemplary method, in accordance with the present invention, of operating a mobile node to implement a handoff between a first link with a first base station sector and using a first carrier and a second link with a second base station sector, said second link using a second carrier, at least the first sector being different from the second sector or the first carrier being different from the second carrier.

FIG. 13 is a flowchart 1300 of an exemplary method of operating a mobile node to implement a handoff between a first link with a first base station sector and using a first carrier and a second link with a second base station sector, said second link using a second carrier, at least the first sector being different from the second sector or the second carrier being different from the first carrier. For example, this exemplary method may be used for intra-cell inter-sector handoffs of a mobile node where the carrier used is the same or different. The exemplary method may also be used for intra-cell intra-sector inter-carrier handoffs of a mobile node. The exemplary method of implementing the handoff starts in step 1302 and proceeds to step 1304. In step 1304, the mobile node is operated to receive a timing correction signal over said first communications link, e.g., as part of the normal timing control process performed when operating in a cell. Operation proceeds from step 1304 to step 1306. In step 1306, the mobile node is operated to make a transmission timing adjustment to adjust the timing of signals, e.g., symbols, transmitted by said mobile node over the first link. Then, in step 1308, the mobile node is operated to signal an intent to handoff to the second link. For example, the mobile node may send a handoff request signal over the first link to the first base station sector point of attachment, and the handoff request may be forwarded to the second base station sector point of attachment, where the first and second base station sectors may be different sectors of the same base station. Alternatively, where an intra-sector inter-carrier handoff is being performed, the signal may be sent via a module corresponding to the first carrier in the first sector to a module corresponding to the second carrier in the first sector, in such a case the first and second sector are the same but the carriers used are different. The second base station sector point of attachment may grant the handoff request and respond by assigning some dedicated resources to the mobile node and conveying information identifying those assigned dedicated resources to the mobile node via the first base station sector point of attachment and its wireless link, the first link. Operation proceeds from step 1308 to step 1310. In step 1310, the mobile node is operated to receive over said first communications link information indicating a dedicated resource to be used by said mobile node when communicating over the second communications link. Dedicated resources may include, e.g., an identifier specific to said second sector and said second carrier, a dedicated uplink power control segment, and/or a dedicated uplink traffic channel segment. Operation proceeds from step 1310 to step 1312. In step 1312, the mobile node is operated to terminate said first communications link. In some embodiments, the mobile node terminates the first communications link by sending a termination message to the first base station sector. In some embodiments, the mobile node terminates the first communications link be ceasing to send additional signaling over the first communications link. The mobile node can advantageously terminate the first communications link at a point in time prior, e.g., just prior, to utilizing the earliest dedicated uplink segment, e.g., a dedicated uplink power control segment or a dedicated uplink traffic channel segment, assigned by the second base station sector to the mobile node. Operation proceeds from step 1312 to step 1314. In step 1314, the mobile node is operated to transmit at least one of user data and a non-timing control signal, e.g., a power control signal, over said second communications link prior to receiving a timing control signal over said second communications link. This is done, in some embodiments, prior to altering the transmission timing based on a signal received from the new BS sector point of attachment following termination of the first link. For example, the first and second base station sectors, being part of the same base station, allow for synchronization between the sectors thus allowing the mobile node to maintain timing synchronization as a handoff between sectors occurs; this allows the timing synchronization steps normally required in an inter-cell handoff operation to be omitted in some embodiments minimizing the overhead control signaling involved in an intra-cell handoff and providing for quicker intra-cell handoffs with shorter interruptions in operation.

In some embodiments, intra-sector and inter-sector handoff embodiments, the mobile node uses dedicated air link resources for communications during a time interval extended from said point in time when the mobile terminates said first communications link to a point in time where the mobile transmits user data over said second communications link, said mobile node avoiding the use of shared communication resources which other mobile nodes can access at the same time as said mobile node during the time interval. By utilizing dedicated resources for control signaling, e.g., power control, during this time interval in the handoff operation and not utilizing shared resources, collisions between users resulting in the disruption of a smooth handoff and the associated loss of time and repetition of steps may be avoided resulting in more consistent and efficient handoffs than would be possible if shared resources were used.

Figure 14:
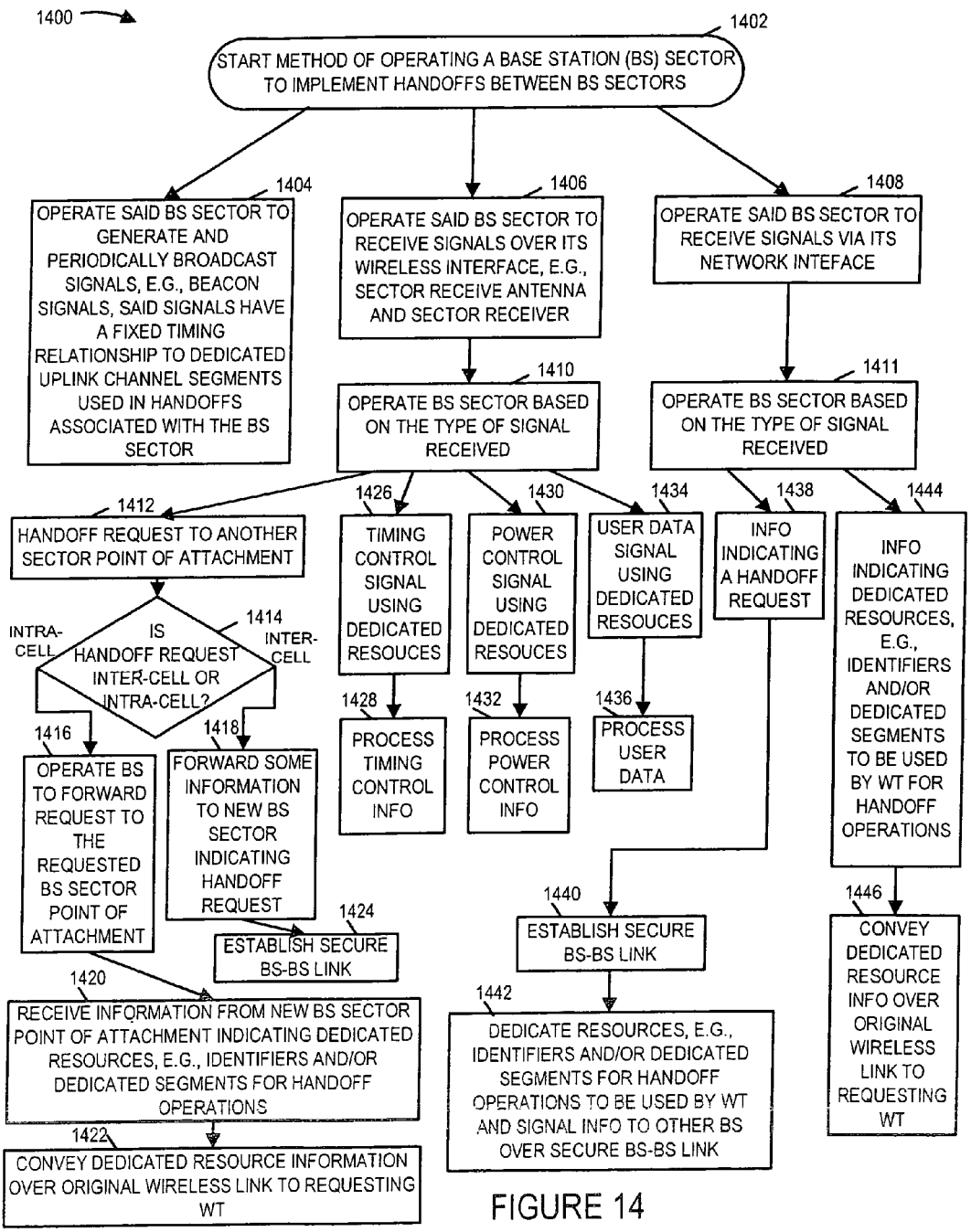
FIG. 14 is a flowchart of an exemplary method of implementing handoffs between base station sectors in accordance with the present invention.

FIG. 14 is a flowchart 1400 illustrating an exemplary method of operating a base station sector to implement handoffs between base station sectors and/or between carrier in a sector corresponding to different points of attachment in accordance with the methods of the present invention. As can be appreciated, control circuitry or modules associated with different carriers in a sector or different sectors can operate as different points of attachment. Operation of the exemplary method starts in step 1402 and proceeds to steps 1404, 1406 and 1408.

In step 1404, the base station sector is operated to generate and periodically broadcast signals, e.g., beacon signals, said broadcast signals having a fixed timing relationship to dedicated uplink channel segments used in handoffs associated with the BS sector from which the beacon signal originates.

In step 1406, the BS sector is operated to receive signals over its wireless interface, e.g., sector receive antenna and sector receiver. Operation proceeds from step 1406 to step 1410. In step 1410, the BS sector operation is determined based on the type of signal received. If the received signal of step 1406 was a handoff request to another BS sector as illustrated in block 1412, then operation proceeds to step 1414. If the received signal of step 1406 was a timing control signal using a dedicated resource as illustrated in block 1426, then operation proceeds to step 1428. In step 1428, the BS sector processes the received timing control information, e.g., establishing timing synchronization as part of handoff operations in establishing a new wireless link. If the received signal of step 1406 was a power control signal using dedicated resources as illustrated in block 1430, then operation proceeds to step 1432. In step 1432, the BS sector processes the power control information received, e.g., performing WT power control signaling as part of handoff operations in establishing a new wireless link. In some embodiments, the BS sector will not process WT power control signals in step 1432 if the timing control processing of step 1428 was required and has not been previously successfully performed. If the received signal of step 1406 was user data communicated using dedicated resources as illustrated in block 1434, then operation proceeds to step 1436. In step 1436, the BS sector processes the user data received, e.g., forwarding the user data toward another WT. In some embodiments, the BS sector will not process user data signals in step 1436 if the timing control processing of step 1428 and/or power control processing of step 1432 were required and have not been previously successfully performed.

Returning to step 1414, which relates to a handoff between different points of attachment, the BS is operated to determine the type of handoff and direct operations based on whether the hand-off request was an inter-cell or an intra-cell handoff request. If the request was an intra-cell request, e.g., an intra-cell inter-sector or intra-cell inter-carrier handoff request, then operation proceeds to step 1416; however, if the request is an inter-cell handoff request then operation proceeds to step 1418. In step 1416, the BS sector point of attachment is operated to forward the request to the requested BS sector point of attachment, e.g., an adjacent sector within the same BS or circuitry corresponding to a different carrier in the same sector. From step 1416, operation proceeds to step 1420. In step 1420, the BS sector is operated to receive information from the new (requested) BS sector indicating dedicated resources, e.g., identifiers and/or dedicated segments for handoff operations, e.g., dedicated uplink power control channel segments within a specified access slot. In some embodiments, the dedicated resources of step 1420 does not include uplink timing control channel segments during an access slot, as the base stations sectors within a given BS in some embodiments are timing synchronized with respect to one another. Operation proceeds from step 1420 to step 1422. In step 1422 the BS sector is operated to convey dedicated resource information over the original established wireless link to the requesting WT.

Returning to step 1418, in step 1418, the BS sector point of attachment is operated to forward some information to the new requested BS sector point of attachment indicating a handoff request. Operation proceeds from step 1418 to step 1424. In step 1424, the BS sector is operated to establish a secure BS-BS link. Once the secure link is established, detailed information regarding the handoff can be conveyed between the new requested BS sector point of attachment and the WT via the old existing BS sector using the backhaul network and the existing established wireless link.

Returning to step 1408, in step 1408 which relates to inter-cell handoffs, the BS sector is operated to receive signals via its network interface. Operation proceeds from step 1408 to step 1411, where the BS sector is operated based on the type of signal received. If the signal received in step 1408 is information indicating a handoff request to the BS sector 1438, operation proceeds to step 1440, where the BS sector is operated to establish a secure BS-BS link. Operation proceeds from step 1440 to step 1442. In step 1442, the BS sector is operated to dedicate resources, e.g., identifiers and/or dedicated segments such as uplink timing control channel dedicated segments and uplink power control channel dedicated segments during a specified access slot by the WT for handoff operations. In some embodiments, the dedicated segments of step 1442 include dedicated uplink traffic channel segments to be used by the WT after timing and power control has been established. In step 1442, the BS sector is also operated to signal information identifying those dedicated resources to the other BS over the secure BS-BS link.

If the received information in step 1408 is information indicating dedicated resources, e.g., identifiers and/or dedicated segments to be used by the WT for handoff operation, then operations proceed from step 1411 to step 1446. In step 1446 the BS sector conveys the received dedicated resource identification information over the original established wireless link to the requesting WT.

It should be noted that the above described intra-cell and inter cell handoff methods may, and in some embodiments are, used sequentially. For example, an intra-cell handoff method of the invention can be used to handoff from one sector to another in a cell, one or more times before a WT implements a handoff from one cell to another using an inter-cell handoff method of the invention. In the case of the intra-cell handoffs, user data may be transmitted upon entry into the new sector or using a new carrier in the cell prior to making a timing adjustment in response to a signal received over the air following termination of the old communications link. However, when the inter-cell handoff occurs, the WT will normally perform a timing synchronization operation, e.g., adjusting its symbol transmission timing, based on one or more signals received over the air from a transmitter in the new cell, prior to transmitting user data in the new cell.

Numerous different system and handoff method implementations are possible using the methods and apparatus of the invention.

For example, in one exemplary system with multiple frequency bands, a mobile listens to one frequency band at a time, converts (e.g., by performing an FFT or DFT) received signals from the time domain to the frequency domain, measures the energy on each of the signal components in the frequency domain generated by the frequency transform operation, (e.g., the per tone signal energy); and detects the presence of beacon signal components based on the received per tone signal energy. In this particular exemplary embodiment, from the locations of beacon tones the mobile determines cell/sector and/or carrier info (e.g., a cell ID, sector Id and/or carrier frequency) of the base station transmitter that transmitted the beacons. From the energy of beacon signal components, e.g., detected beacon signal tones, the mobile then determines the relative signal strengths of various base station transmitters which transmitted beacon signals into the frequency band being used by the mobile node. From the relative energy of the beacon signal components received from different transmitters, and various handoff criteria information stored in the mobile, the mobile determines whether a handoff should be implemented and, in the case of a decision to implement a handoff, the new base station attachment point, corresponding to a transmitter from which a beacon signal was received, to handoff to. In some implementations of such an exemplary system, a beacon signal component is identified based on comparing the signal component energy level to an average per tone energy level. In some embodiments, where the beacon power >20 times the average per tone signal power over a time period such as 1 or 2 seconds, the beacon detection threshold is set at or slightly below 20 times the detected or anticipated average per tone energy, e.g., at 15 times the expected average per tone signal energy.

Once a system decides to implement a handoff various handoff methods of the invention may be used. The handoff techniques described herein are not dependent on the particular method of deciding when implement a handoff. However, diction of one or more beacon signals is used in various handoff embodiments to determine timing and/or other information relating to the network attachment point, e.g., BS sector, to which a mobile node seeks to complete a handoff.

While inter-cell and intra-cell handoffs have many common steps and features when performed in accordance with various embodiments of the invention, inter-cell handoffs may involve timing synchronization and/or power control steps which may be required to be performed before a mobile node is permitted to transmit user data, e.g., text, video or voice data to the new network point of attachment. This is because, in the case of intra-cell handoffs, where the various elements such as sectors are synchronized, the mobile node can rely on previously established timing synchronization with an access point in the cell which should remain reasonably reliable given timing synchronization in the cell even though the mobile changes the point of network attachment being used within the cell.

From a base station perspective, some features that can be used support both intra-cell and inter-cell handoffs are such things as the use of multiple frequency bands, the transmission of beacon signals by a network attachment point into the frequency band used by the network attachment point to communicate data and into the frequency band being used in a neighboring sector, cell or network attachment point for the communication of user data. Thus, a network attachment point transmitter will normally transmit beacon signals into multiple frequency bands. To facilitate interpretation of airlink resource assignments and the processes of determining when to terminate an existing communications link as part of a handoff, a fixed framing structure is used for the uplink and/or downlink supported by each network attachment point. Traffic, access and other types of segments which are used to communicate specific types of data and/or for specific purposes repeat in a predictable known manner given the fixed communication channel framing structure. As a result, once the time location of a received beacon signal is known, the communications channel structure, e.g., superslot/beaconslot structure of the frequency band in which the transmitter transmits its user data (traffic channels, etc) can be uniquely derived from the beacon signal location in terms of frequency or the frequency of beacons which recur in a known periodic manner due to the communications channel structure. The communications channel framing structure defines, in some embodiments, such things as hopping, control or traffic channel segment definitions which may be prestored in the mobile and accessed based on information derived from a received beacon signal. Thus, the transmission of beacon signals in a periodic predictable manner and use of a fixed communications channel structure which can be stored and associated with beacon information which can be used to determine which channel structure is being used, facilitates interpretation of resource assignments and determining when a particular segment will occur at the new network access point before the mobile achieves symbol timing synchronization with the new network attachment point, e.g., in the case of an inter-cell handoff.

With regard to the implementation of handoff's from the mobiles, perspective, in various embodiments, the handoff triggering mechanism is as described above in regard to the use of beacon signals to determine when a handoff should occur.

In some exemplary handoff embodiments, the mobile node uses a beacon signal received from the handoff destination to determine one or more of the following: the cell ID, Sector ID and/or carrier frequency used by the destination network point of attachment which transmitted the detected beacon signal. The mobile node can also determine from the detected beacon signal and, e.g., stored communications channel structure information relating to different cell's and/or sectors, the framing structure of the communications channels used by the network point of attachment to which the handoff is to be completed, e.g., a second base station sector. From the determined framing structure and information about when the beacon signal was received, the mobile can determine the time to drop the exiting wireless communications link and begin establishing the new communications link. The timing may be based in addition to the time the detected beacon signal was received, information about the time a dedicated resource, e.g., particular access segment, will occur at the destination network attachment point.

In many embodiments, the mobile node communicates its intent to handoff to a new network attachment point by sending one or more signals over an existing communications link to the network attachment point, e.g., base station sector, serving as the mobile node's current point of network attachment. Thus, the mobile, in accordance with the invention, will normally signal its intent to perform a handoff by sending a signal over the existing wireless communications link. The current network attachment point forwards the handoff signal from the mobile to the second network attachment point (handoff destination) and/or acts as a proxy for the mobile node and exchanges handoff signals with the second network attachment point on behalf of the mobile node. The destination network node assigns, e.g., dedicates, one or more air link resources to the mobile node and communications information about the dedicated resource(s) to the mobile node via the current network point of attachment. The dedicated resources may include one or more sets of tones in an uplink communications channel, e.g., a portion of an access segment, to be used for, e.g., sending a registration signal, timing control signal and/or power control signal to the base station as part of a registration operation The dedicated resources could also include one or more device identifiers to be used when communicating with the new network point of attachment, e.g., an on-state identifier to be used when communicating in an on-state of operation and a hold=state identifier to be used when the mobile node operates in a hold state. The resource information is communicated to the mobile node over the current wireless communications link with the current point of network attachment. The mobile node terminates, e.g., drops, the existing communications link before establishing the new communications link with the network attachment point which is the destination of the handoff. The time at which the link is terminated may be based on the time of a received beacon signal and expected time offset from the received beacon signal to a communications segment or set of tones in a segment which has been dedicated to the mobile node for purposes of registering with the new network point of attachment. The mobile node uses the resource that was dedicated by the new network attachment point to access the new network point of attachment in a contention free manner and thereby establish a communications link with the new network point of attachment. Should something happen and the mobile node is unable to complete the establishment of the new communications link using the dedicated resource, the mobile node in various embodiments will wait and attempt to perform the registration with the new point of network attachment using contention based signaling.

Various embodiments using the general method described above but with minor variations intended to be particularly well suited for inter-cell or intra-cell applications are contemplated. In one particular inter-cell handoff embodiment, air link resources assigned by the network access point to which the handoff is directed to, e.g., a second base station, includes a dedicated access segment in an uplink of the second base station. In particular exemplary example of such an embodiment the mobile determines the definition of the assigned access segment e.g., on what tone sets and at what OFDM symbol time it has been assigned to use for registering, from the detected beacon signal and the information returned over the existing communications link via a first base station through which the mobile is coupled to the network at the time the handoff is initiated. In such an exemplary embodiment, the mobile drops the first link prior to the starting to transmit to the second base station using the assigned access segment. Using the assigned access segment, the mobile sends one or more signals to the base station, e.g., registration, power control and/or timing control signals. In response to the signals sent on the uplink, the mobile receives timing and/or power control signals from the second base station and makes timing and/or power adjustments in response to the control signals. In such an embodiment, as part of the registration process, the mobile may get further dedicated resources such as ON identifier, dedicated control channels to continue communications with the second base station if they were not previously assigned. In various embodiments of this type, the dedicated access segment is a non-contention bases access segment which and other mobile are not allowed to use the access segment that was dedicated to the mobile node. If use of the access segment is not successful, and a communications link is not established with the second base station, the mobile node attempts to register again through contention based signal competing for resources in the same manner that mobiles entering the system would register without the benefit of previously allocated dedicated registration resources.

Some exemplary intra-cell handoff embodiments will now be discussed. In some intra-cell handoff embodiments, e.g., inter-sector intra-cell and/or inter-carrier intra-sector embodiments, the current and new network access points are located in the same cell and are synchronized in symbol timing and, optionally, carrier frequency. In such a handoff embodiment, at the start of the handoff the mobile is synchronized as a result of the timing control performed with regard to the current link with the symbol timing of the current network point of attachment, e.g., sector. In some of the intra-cell handoff embodiments, a dedicated resource(s) assigned by the new network access point include dedicated resources such as dedicated access segment, ON identifier for use when communicating with the new network attachment point, dedicated control channel segments to be used to perform timing and/or power control communications with the new network access point. In some of the intra-cell handoff embodiments, the mobile does not have to transmit any access, timing control and/or power control signal in order to set up the second link and skips some or all of the signaling steps of this type that would occur in the case of an inter-sector handoff. Given that the handoff is an intra-cell handoff, in many embodiments, messages relating to the handoff are localized between the network attachment points within the cell and there is no need to use a backhaul link between cells to complete the handoff. In some intra-cell handoff's, the mobile drops the current communications link and within a very short period of time, e.g., less than the time to complete an inter-cell handoff, and in some cases in less than 5 milli-seconds, starts to use the assigned dedicated channel resources dedicated by the new network point of attachment and may, in fact, start transmitting user data almost immediately, e.g., without having to wait to first receive a timing and/or power control signal over the air from the new network point of attachment.

Figure 15:
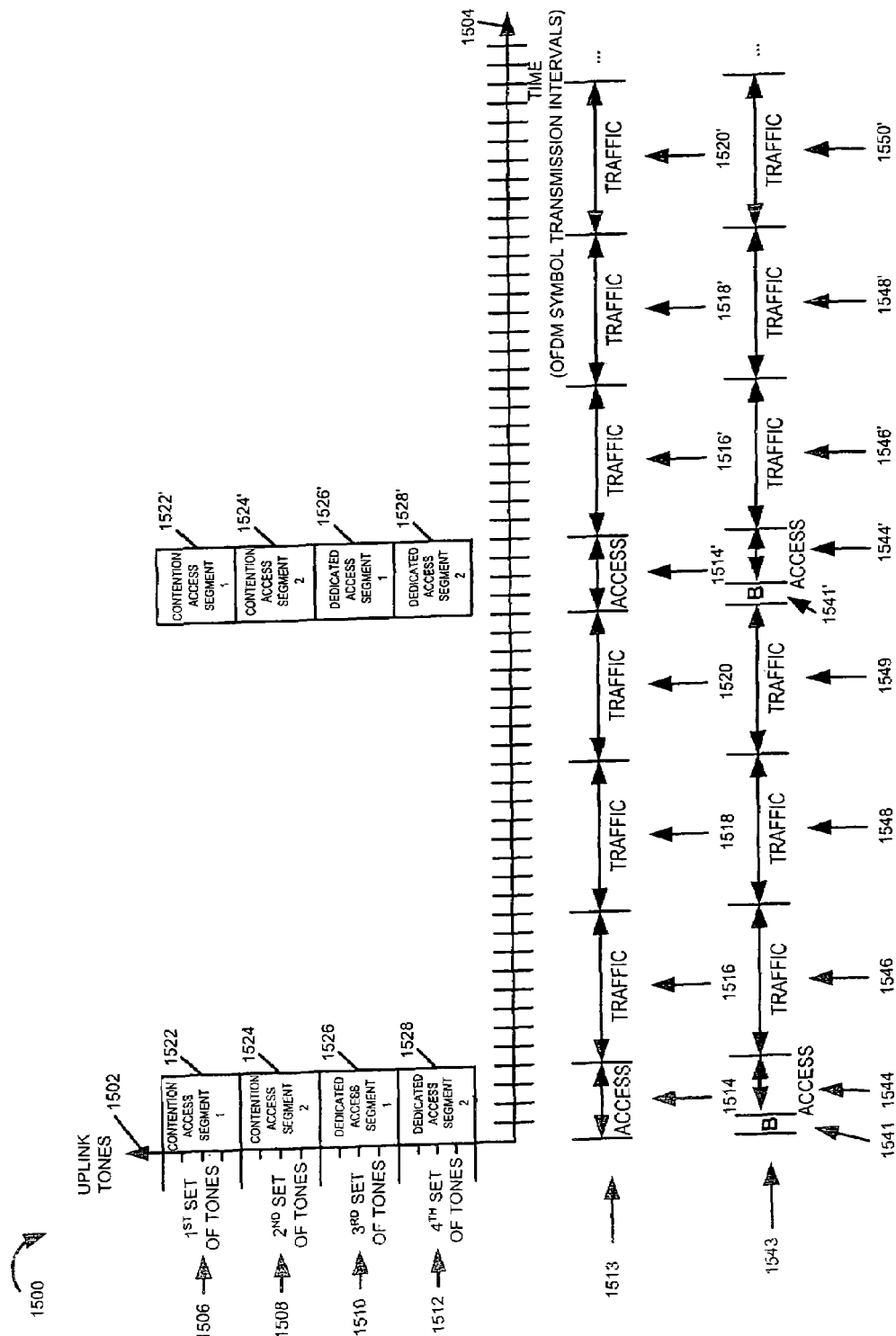
FIG. 15 is a drawing including exemplary uplink dedicated access segments and exemplary uplink contention based access segments in accordance with the present invention.

FIG. 15 is a drawing 1500 illustrating an exemplary embodiment which uses access segments in an uplink and downlink channel in accordance with some embodiments of the present invention. While access and traffic segments are shown as separate segments in terms of time in the downlink in FIG. 15, it should be appreciated that the access and traffic segments could be implemented using different sets of tones during the same period of time. That is, while access and traffic segments may be time multiplexed in the downlink, time multiplexing is not necessarily required for the invention.

Drawing 1500 includes a vertical axis 1502 representing uplink tones and a horizontal axis 1504 representing time. Each small division of the vertical axis 1502 represents a tone, while each small division of the horizontal axis 1504 represents an OFDM symbol transmission interval. Row 1513 corresponds to the uplink channel while row 1543 corresponds to the downlink channel. Beacons are periodically transmitted in the down link channel in beacon slots 1541, 1541'. One or more beacon signals in the beacon slots are transmitted at known fixed offsets from the access slots 1514, 1414' in the uplink channel. For example, at least one beacon signal transmitted in slot 1541 will occur a fixed number of symbol transmission time periods from the start of uplink access slot 1514'.

In addition to beacon slots the downlink includes access slots 1544, 1544' which can be used for communicating registration acknowledgment signals, WT timing control signals and/or WT power control signals to one or more wireless terminals, e.g., terminals seeking to establish a communications link with the network attachment point with which uplink and downlink channels 1513, 1543 are associated.

Uplink tones are shown and have been grouped into four exemplary sets of tones ($1^{st}$ set of tones 1506, $2^{nd}$ set of tones 1508, $3^{rd}$ set of tones 1510, $4^{th}$ set of tones 1512). Downlink tones are not shown but may also be grouped into sets for use by different wireless terminals. In the uplink channel 1513 OFDM symbol transmission time intervals are grouped into exemplary intervals, e.g., slots, including access interval 1514, traffic interval 1516, traffic interval 1518, and traffic interval 1520. The sequence of intervals repeats over time as illustrated with access interval 1514', traffic interval 1516', traffic interval 1518', traffic interval 1520' and will have a known timing relationship to the intervals in the downlink channel 1543.

During an access interval WTs can use access segments, e.g., for registration with a BS sector attachment point establishing a new wireless link. Two types of access segments are shown, contention based access segments and dedicated access segments. Contention access segment 1 1522 uses $1^{st}$ set of tones 1506 during access interval 1514; contention access segment 2 1524 uses $2^{nd}$ set of tones 1508 during access interval 1514; dedicated access segment 1 1526 uses $3^{rd}$ set of tones 1510 during access interval 1514; dedicated access segment 2 1528 uses $4^{th}$ set of tones 1512 during access interval 1514. Similarly, contention access segment 1 1522' uses $1^{st}$ set of tones 1506 during access interval 1514'; contention access segment 2 1524' uses $2^{nd}$ set of tones 1508 during access interval 1514'; dedicated access segment 1 1526' uses $3^{rd}$ set of tones 1510 during access interval 1514'; dedicated access segment 2 1528' uses $4^{th}$ set of tones 1512 during access interval 1514'.

During a traffic interval (1516, 1518, 1520, 1516', 1518', 1520') there are segments including uplink traffic channel segments in which WTs can send user data to the base station sector attachment point via the established wireless link.

In some exemplary systems, when an exemplary WT is in an access state of operation, an access segment may be used for transmitting an uplink signal including registration information, timing control information, and/or power control information. A registration signal sent in the uplink may be used for timing control and/or power control purposes while indicating an intent to register. Thus, a single uplink signal can serve multiple purposes. Alternatively, different signals can be used for each function. As part of the access operation the WT sends the BS some uplink signal using an access segment from which the base station performs measurements. The WT will use a dedicated, contention free slot, for transmission of the uplink signal assuming it was assigned a dedicated segment for this purpose. The uplink signal may be, e.g., a signal that is transmitted at a predetermined WT power level that is transmitted, e.g., at a predetermined time within the access segment with respect to the WTs current timing settings. The base station receives the uplink signal, performs measurements, and sends back to the wireless terminal a signal or signals, e.g., timing and/or power control signals, on a downlink channel segment or segments, e.g., downlink segments in a corresponding downlink access slot 1546 or 1546'. In addition to timing and/or power control signals, the BS may send an acknowledgment of the uplink registration signal. The WT performs any commanded adjustments and can then send uplink signals including user data on allocated uplink traffic channel segments, e.g., traffic segments 1516, 1518, 1520, etc.

In accordance with some embodiments of the invention, a dedicated access segment, e.g., dedicated access segment 1 1526, is assigned to a wireless terminal which has requested a handoff. The assignment information of the dedicated access segment is conveyed to the WT via the current wireless link.

In general, the use of dedicated access segments in handoff operations provides a more efficient handoff. Benefits of using dedicated air link resources assigned via an exiting communications link and timing information obtained from a broadcast signal transmitted over the air into the frequency band used by the WT, may include less time lost between the termination of the original wireless link and the establishment of the new wireless link, a higher handoff success rate due to the use of a dedicated access segment as opposed to the usual contention based (collision prone) access segments, and/or elimination of some operations such as some timing control adjustments, e.g., in an intra-cell handoff.

The contention access segments, e.g., contention segment 1 1522', is used by a WT which does not currently have an established wireless link, e.g., a WT which has just powered on, to register with a BS sector attachment point and establish a wireless link. In some embodiments, if a handoff fails while using a dedicated access segment, the WT then seeks to register using a contention based access segment. Use of contention access segments may result in a collision with another WT seeking to establish a wireless link, resulting in an unsuccessful registration attempt. When using a contention based access segment, the WT generates and transmits an uplink signal to the BS sector attachment point which is received, measured, and used by the BS to calculate WT timing control and power control adjustment information which is sent to the WT via downlink segments. Thus, when the contention based access operation is performed, timing control is normally performed prior to the WT sending user data in the uplink.

In some cases, where the handoff request is an intra-cell handoff request, e.g., inter-sector or intra-sector inter-carrier, registration signals sent in the access segment are not used for timing control operations and/or registration via an access segment may be skipped entirely. Assuming that the sectors are timing synchronized and the WT has been assigned, via the exiting link, the dedicated resources required to send user data, a WT can begin transmitting user data and/or other signals to the new network attachment point which assigned the necessary resources without having to first perform registration, timing control and/or power control via the air link with the new point of attachment. This is possible since, in some embodiments, timing synchronization is maintained across sectors of a cell.

Figure 16:
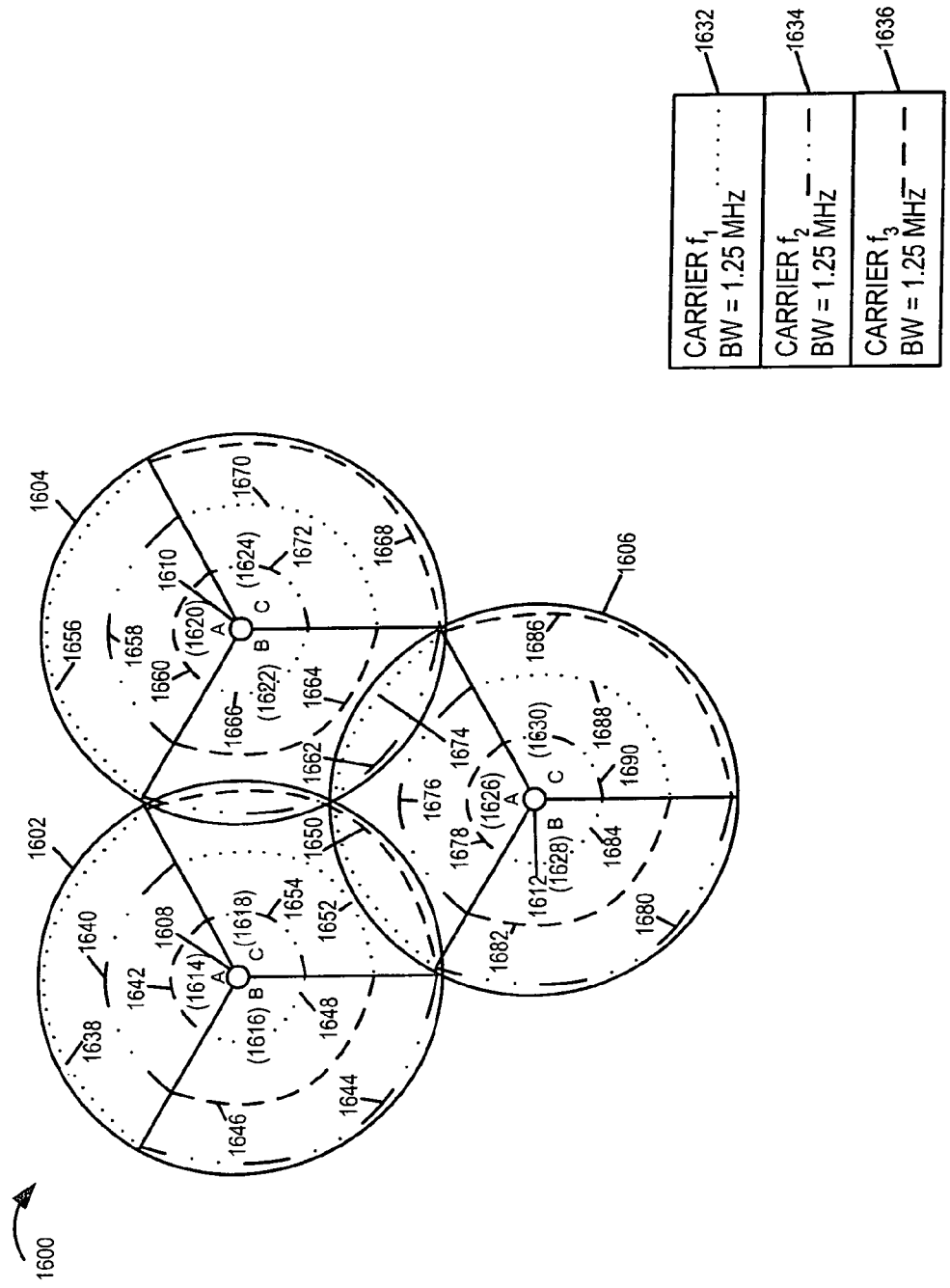
FIG. 16 is a drawing illustrating exemplary cells in an exemplary multi-sector multi-carrier system in which multiple carriers are used in the same sector with different power levels.

FIG. 16 illustrates an exemplary wireless communications system 1600 including three exemplary cells (cell 1 1602, cell 2 1604, cell 3 1606), each cell indicated by a solid line circle. Each cell (1602, 1604, 1606) represents the wireless coverage area for a base station (1608, 1610, 1612) located at the center of the cell (1602, 1604, 1606), respectively. Each cell (1602, 1604, 1606) is subdivided into three sectors A, B, and C. Cell 1 1602 includes sector A 1614, sector B 1616, and sector C 1618. Cell 2 1604 includes sector A 1620, sector B 1622, and sector C 1624. Cell 3 1606 includes sector A 1626, sector B 1628, and sector C 1630. Carrier $f_1$ is indicated by a dotted line as shown in legend 1632; carrier $f_2$ is indicated by a dot/dash line as shown in legend 1634; carrier $f_3$ is indicated by a dash line as shown in legend 1636. Each carrier frequency $f_1$, $f_2$, $f_3$ is associated with a 1.25 MHz bandwidth segment of the 5 MHz available total BW in the exemplary embodiment, and the BW segments are non-overlapping. The radius of each (dotted, dot/dash, or dashed) line is indicative of the transmitter power associated with the carrier in the given sector. In FIG. 16, there is a frequency reuse factor of 1, i.e., the same set of frequencies is used in each sector and in each cell.

In each of the three cells (1602, 1604, 1606), the base stations sector A transmitter uses carrier frequency ($f_1$, $f_2$, $f_3$) at a (high, intermediate, low) power level, respectively, for communications, e.g., downlink traffic and control channel signals, from the base station (1608, 1610, 1612) to wireless terminals. In each cell (1602, 1604, 1606), the base station sector B transmitter uses carrier frequency ($f_2 f_3$, $f_1$) at a (high, intermediate, low) power level, respectively, communications, e.g., downlink traffic and control channel signals, from the base station (1008, 1010, 1012) to wireless terminals; the base station sector C transmitter uses carrier frequency ($f_3$, $f_1$, $f_2$) at a (high, intermediate, low) power level, respectively, for communications, e.g., downlink traffic and control channel signals, from the base station (1608, 1610, 1612) to wireless terminals. The following notation is used to describe the base station transmitter power levels in system 1600 with respect to the carrier frequencies: (cell, sector, high power carrier/intermediate power carrier/low power carrier): (cell reference number, sector reference number, arc line reference number for high power carrier/arc line reference number for intermediate power carrier/arc line reference number for low power carrier). System 1600 includes: (cell 1, sector A, $f_1/f_2/f_3$):(1602, 1614, 1638/1640/1642); (cell 1, sector B, $f_2/f_3/f_1$):(1602, 1616, 1644/1646/1648); (cell 1, sector C, $f_3/f_1/f_2$):(1602, 1618, 1650/1652/1654); (cell 2, sector A, $f_1/f_2/f_3$):(1604, 1620, 1656/1658/1660); (cell 2, sector B, $f_2/f_3/f_1$):(1604, 1622, 1662/1664/1666); (cell 2, sector C, $f_3/f_1/f_2$):(1604, 1624, 1668/1670/1672); (cell 3, sector A, $f_1/f_2/f_3$):(1606, 1626, 1674/1676/1678); (cell 3, sector B, $f_2/f_3/f_1$):(1606, 1628, 1680/1682/1684); (cell 3, sector C, $f_3/f_1/f_2$):(1606, 1630, 1686/1688/1690).

FIG. 16 represents the same level of frequency reuse throughout each sector of a system and may represent a system in an advanced level of deployment, e.g., where a deployment program has been completed and/or where the service provider has a larger customer base with high demands which can justify such a deployment level.

While the three carriers are transmitted at different power levels $P_1$, $P_2$ $P_3$, in each sector. In various embodiments there is a fixed relationship between the three power levels $P_1$, $P_2$ $P_3$, that is used in each sector. In one such embodiment $P_1 > P_2 > P_3$ in each sector and the ratio of $P_1$ to $P_2$ and $P_2$ to $P_3$ is the same regardless of the sector. Uplink carriers may be associated with each of the downlink carriers.

Inter-cell, inter-sector, and intra-sector inter-carrier handoffs, in accordance with the methods of the present invention may occur with the system of FIG. 16.

In implementations such as the one shown in FIG. 16, each carrier and sector has associated with it one or more modules that can be used as a network attachment point by a mobile node. Switching between carriers within a cell results in switching between network attachment points and thus a handoff between network attachment points within the cell. In the case of sectors which support multiple carriers this may involve a handoff from a network attachment point corresponding to a first carrier to a network attachment point corresponding to a second, different carrier, within the same sector.

Figure 17:
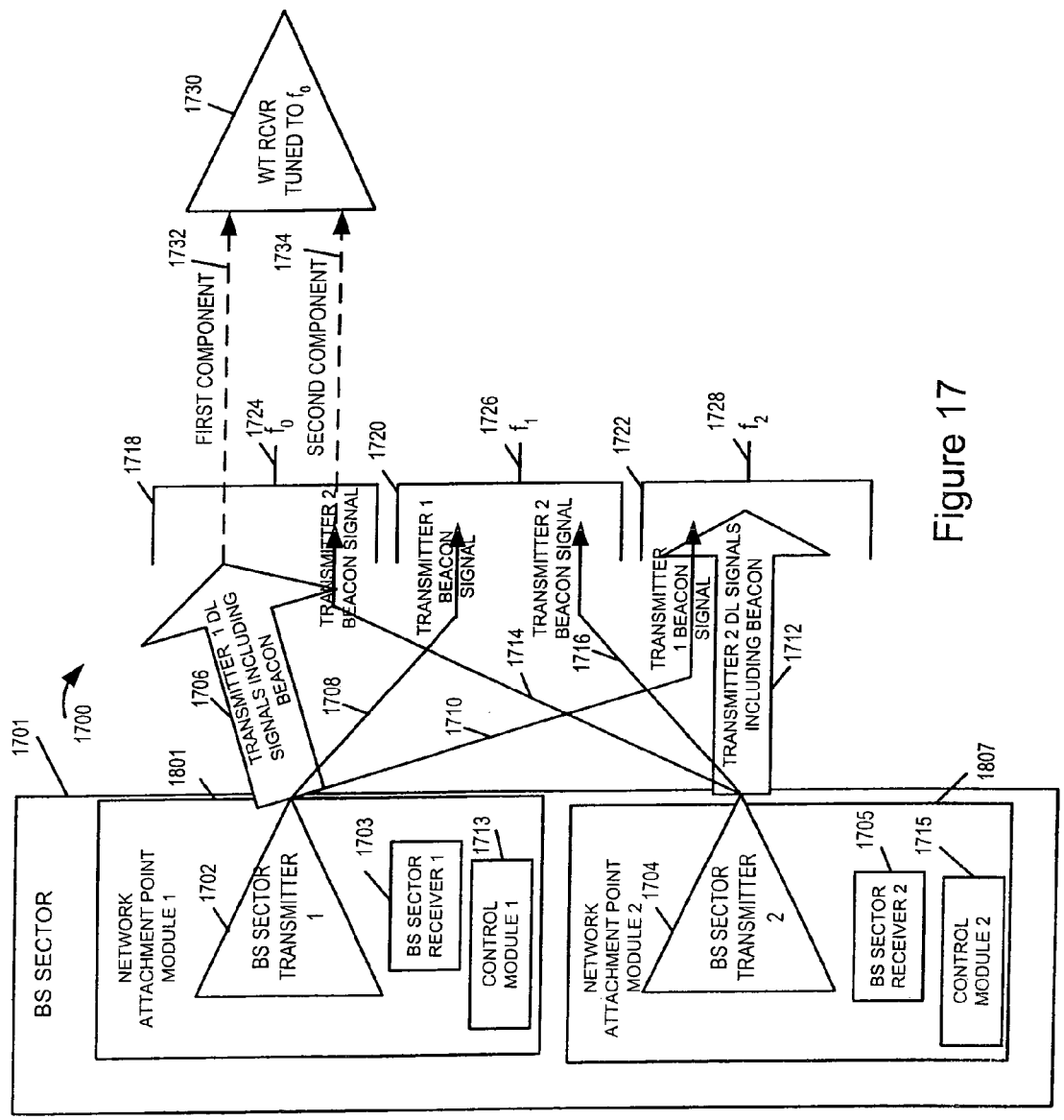
FIG. 17 illustrates the use of a sector which supports multiple carriers where beacon signals are transmitted into the frequency band of each of the carriers by each of the sector transmitters.

FIG. 17 illustrates a base station sector 1701 with two exemplary network attachment points 1801, 1807 which correspond to different carriers $f_0$ and $f_2$ respectively. In the case of some embodiments of the FIG. 16 example, each sector would include three network attachment point modules, e.g., the sector 1701 would include a third network attachment point corresponding to carrier $f_1$. Thus, there would be a third network attachment point module in addition to attachment point modules 1801, 1807 shown in FIG. 17.

Each network attachment point 1801, 1807 can serve as a wireless terminal's attachment point, via a wireless connection, to the network to which the base station including sector 1701 is coupled. While shown as being in a sector, it can be appreciated that network attachment points 1801, 1807 could be in different sectors of the same cell or in sectors of different cells rather than in the sector of the same cell. Each of the network attachment points 1801, 1807 uses a different frequency band 1718, 1722 for communicating user data. Network attachment point module 1 1801 includes a first BS transmitter 1702m, a first BS sector receiver 1703 and a first control module 1713 which are coupled together by a bus. The control module 1713 causes the first network attachment point to operate in accordance with the invention, e.g., in the manner described above, and interacts with other network attachment points to coordinate handoff's and assign air link resources. The second network attachment point module 1807 includes a second base station sector transmitter 1704, a corresponding BS sector receiver 1705 and a second control module 1715 which are coupled together by a bus. Control module 1715 causes the second network attachment point to operate in accordance with the invention, e.g., in the manner described above, and interacts with other network attachment points to coordinate handoff's and assign air link resources. The control modules of the different network access links are coupled to control modules of other sectors by links within the BS in which they are included and to network attachment point control modules of other cells by a back haul link implemented, e.g., with fiber optic or wire connections.

Use of first and second transmitters 1702, 1704, corresponding to different network attachment points, will now be described. Transmitters 1702, 1704 transmit downlink signals including, e.g., ordinary traffic channel signals, e.g., user data, optionally pilot signals, and beacon signals. The relative timing of the various signals may be as shown in FIG. 15. The transmitters 1702, 1704 may use different antennas directed towards different sectors or cells. Signaling from each sector transmitter includes ordinary signaling, e.g., assignment signals, optionally pilot signals, and/or optionally beacon signals, in its own designated carrier frequency band and beacon signals in one or more, e.g., the other two, carrier frequency bands used in a cell. The first transmitter 1702 transmits downlink signals 1706 including, e.g., Transmitter 1 downlink traffic signals, Transmitter 1 assignment signals, Transmitter 1 WT control signals, optionally Transmitter 1 pilot signals, and/or Transmitter 1 beacon signals into a frequency band 1718 corresponding to carrier frequency $f_0$ 1724, Transmitter 1 beacon signals 1708 into a frequency band 1720 corresponding to carrier frequency $f_1$ 1726, and Transmitter 1 beacon signals 1710 into a frequency band 1722 corresponding to carrier frequency $f_2$ 1728. Transmitter 2 1704 transmits downlink signals 1712 including, e.g., Transmitter 2 downlink traffic signals, Transmitter 2 assignment signals, optionally Transmitter 2 pilot signals, Transmitter 2 WT control signals and/or Transmitter 2 beacon signals into frequency band 1722 corresponding to carrier frequency $f_2$ 1728. Transmitter 2 1704 also transmits Transmitter 2 beacon signals into frequency band 1718 corresponding to carrier frequency $f_0$ 1724, and Transmitter 2 beacon signals 1716 into frequency band 1720 corresponding to carrier frequency $f_1$ 1726.

Assume that a WT 1730 is tuned to carrier frequency band 1718 with carrier frequency $f_0$ 1724. The receiver in the WT 1730 receives two signal components 1732, 1734, the first signal component 1732, including e.g., ordinary signaling, assignment signals, pilot signals, and/or beacon signals from the Transmitter 1 602 which are processed. At the same or a different time, second signal component 1734, which includes, e.g., the beacon signal from the second Transmitter 2 1704 is received and processed. Based on the energy in the beacon signals received from the transmitters (1702, 1704) corresponding to the different carriers $f_0$ and $f_2$, respectively, the WT may initiate a handoff from the first network attachment point 1801 to the second network attachment point 1807 using the existing communication link with network attachment point 1801. Thus, in accordance with the invention, the WT 1730 can request and receive dedicated air link resources form network attachment point 1807 via the existing communications link and then terminate the link and establish a new link with attachment point 1807, e.g., at a time determined from a beacon signal received from transmitter 1704 and assignment information communicated over the link with the first network attachment point 1801 prior to termination of the link.

While described in the context of an OFDM system, the methods and apparatus of the present invention are applicable to a wide range of communications systems including many non-OFDM and/or non-cellular systems.

In various embodiments nodes described herein are implemented using one or more modules to perform the steps corresponding to one or more methods of the present invention, for example, signal processing, beacon generation, beacon ID, beacon measuring, beacon comparison, handoff, message generation and/or transmission steps. In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of operating a second network point of attachment in a communications system including a first network point of attachment, the first network point of attachment using signals in a first frequency band to communicate with a mobile node having a communications link with said first network point of attachment over which data can be communicated, the method comprising:

transmitting beacon signals having a predetermined frequency into said first frequency band on a periodic basis, said first frequency band being a frequency band into which said second network attachment point does not transmit user data;

using a second frequency band which is different from said first frequency band for establishing and maintaining communications links with mobile nodes over which user data can be communicated, said step of using a second frequency band including assigning segments of an uplink communications channel to mobile nodes, the uplink communications channel having a structure that includes a periodic repeating pattern of access segments and traffic segments, access segments being segments into which mobile nodes that do not have an existing wireless communication link established with said second network attachment point can send at least one signal to said network attachment point over the air to establish a wireless communications link with the second network attachment point, each access segment occurring at a fixed time offset from the point at which one of said beacon signals is transmitted into said first frequency band by said second network attachment point, wherein each access segment includes a plurality of tones which can be used for uplink transmissions during at least one symbol transmission time period which occurs during the period of said access segment, said plurality of tones includes at least a first set of tones;

receiving a signal from said first network access point indicating that said mobile node is seeking to perform a handoff to said second network point of attachment from said first network point of attachment;

dedicating the first set of tones to a first mobile node which is coupled to said first network access point;

communicating information to the first mobile node via the first network access point indicating the dedication of said first set of tones to the first mobile node;

prior to receiving said access request signal, communicating information to said first mobile node, via the first network access point, indicating the time at which said access segment will occur relative to one of the beacon signals transmitted into said first frequency band;

monitoring the first set of tones in the first access segment for a registration signal from the mobile node to which said first access segment was assigned; and receiving a registration signal from the mobile node which was communicated using said dedicated first set of tones.

2. The method of claim 1, further comprising:
monitoring at least one additional set of tones in the first access segment for a registration signal from a mobile node to which said additional set of tones was not dedicated, said additional set of tones being used on a contention basis.

3. The method of claim 1, further comprising:
establishing a secure communications link with said first access node prior to communicating information to the first mobile node via the first network access point indicating the dedication of said first set of tones to said first mobile node.

4. The method of claim 3, further comprising:
receiving at least one Internet Protocol packet with an IP address corresponding to said first mobile node prior to the time of said first access segment;
storing said IP packet; and
forwarding said IP packet to said mobile node over a wireless communications link established using the set of tones dedicated to said first mobile node in said first access segment.

5. A method of operating a second base station to perform a mobile node handoff operation involving a handoff of a mobile node from a first base station having a first communications link with said mobile node, the method comprising:

allocating a dedicated resource to be used by said mobile node when establishing a second communications link with said second base station;

transmitting information about the dedicated resource to said first base station by a communications link between said first and second base stations;

receiving a timing control signal over the air from said mobile node in an uplink communications segment dedicated to said mobile node by said second base station;

transmitting to said mobile node, after receiving said timing control signal, a timing synchronization signal, prior to receiving user data from said mobile node, wherein said timing synchronization signal is a control signal that instructs the mobile node to perform one of the following operations: advance, retard or leave unaltered the transmission timing of symbols transmitted by said mobile node;

transmitting to said mobile node, after receiving said timing control signal, a transmission power control signal, prior to receiving user data from said mobile node;

establishing a secure communications link with said first base station prior to transmitting said information about the resource dedicated to said mobile node to said first base station;

transmitting high power narrowband signals on a periodic basis; and communicating to said first base station information indicating a point in time said mobile node should register over the air with said second base station, said point in time having a fixed relationship to the time at which said base station transmits at least one of said high power narrowband signals.

6. An apparatus for operating a second network point of attachment in a communications system including a first network point of attachment, the first network point of attachment using signals in a first frequency band to communicate with a mobile node having a communications link with said first network point of attachment over which data can be communicated, comprising:

means for transmitting beacon signals having a predetermined frequency into said first frequency band on a periodic basis, said first frequency band being a frequency band into which said second network attachment point does not transmit user data;

means for using a second frequency band which is different from said first frequency band for establishing and maintaining communications links with mobile nodes over which user data can be communicated, said step of using a second frequency band including assigning segments of an uplink communications channel to mobile nodes, the uplink communications channel having a structure that includes a periodic repeating pattern of access segments and traffic segments, access segments being segments into which mobile nodes that do not have an existing wireless communication link established with said second network attachment point can send at least one signal to said network attachment point over the air to establish a wireless communications link with the second network attachment point, each access segment occurring at a fixed time offset from the point at which one of said beacon signals is transmitted into said first frequency band by said second network attachment point, wherein each access segment includes a plurality of tones which can be used for uplink transmissions during at least one symbol transmission time period which occurs during the period of said access segment, said plurality of tones includes at least a first set of tones;

means for receiving a signal from said first network access point indicating that said mobile node is seeking to perform a handoff to said second network point of attachment from said first network point of attachment;

means for dedicating the first set of tones to a first mobile node which is coupled to said first network access point;

means for communicating information to the first mobile node via the first network access point indicating the dedication of said first set of tones to the first mobile node;

means for prior to receiving said access request signal, communicating information to said first mobile node, via the first network access point, indicating the time at which said access segment will occur relative to one of the beacon signals transmitted into said first frequency band;

means for monitoring the first set of tones in the first access segment for a registration signal from the mobile node to which said first access segment was assigned; and means for receiving a registration signal from the mobile node which was communicated using said dedicated first set of tones.

7. The apparatus of claim 6, further comprising:
means for monitoring at least one additional set of tones in the first access segment for a registration signal from a mobile node to which said additional set of tones was not dedicated, said additional set of tones being used on a contention basis.

8. The apparatus of claim 6, further comprising:
means for establishing a secure communications link with said first access node prior to
means for communicating information to the first mobile node via the first network access point indicating the dedication of said first set of tones to said first mobile node.

9. The apparatus of claim 8, further comprising:
means for receiving at least one Internet Protocol packet with an IP address corresponding to said first mobile node prior to the time of said first access segment;
means for storing said IP packet; and
means for forwarding said IP packet to said mobile node over a wireless communications link established using the set of tones dedicated to said first mobile node in said first access segment.

10. An apparatus for operating a second base station to perform a mobile node handoff operation involving a handoff of a mobile node from a first base station having a first communications link with said mobile node, the method comprising:
means for allocating a dedicated resource to be used by said mobile node when establishing a second communications link with said second base station;
means for transmitting information about the dedicated resource to said first base station by a communications link between said first and second base stations;
means for receiving a timing control signal over the air from said mobile node in an uplink communications segment dedicated to said mobile node by said second base station;
means for transmitting to said mobile node, after receiving said timing control signal, a timing synchronization signal, prior to receiving user data from said mobile node, wherein said timing synchronization signal is a control signal that instructs the mobile node to perform one of the following operations: advance, retard or leave unaltered the transmission timing of symbols transmitted by said mobile node;
means for transmitting to said mobile node, after receiving said timing control signal, a transmission power control signal, prior to receiving user data from said mobile node;
means for establishing a secure communications link with said first base station prior to transmitting said information about the resource dedicated to said mobile node to said first base station;
means for transmitting high power narrowband signals on a periodic basis; and
means for communicating to said first base station information indicating a point in time said mobile node should register over the air with said second base station, said point in time having a fixed relationship to the time at which said base station transmits at least one of said high power narrowband signals.

11. A second network point of attachment comprising:
a processor configured to control said second network point of attachment to implement a method in a communications system including a first network point of attachment, the first network point of attachment using signals in a first frequency band to communicate with a mobile node having a communications link with said first network point of attachment over which data can be communicated, the method comprising:
transmitting beacon signals having a predetermined frequency into said first frequency band on a periodic basis, said first frequency band being a frequency band into which said second network attachment point does not transmit user data;
using a second frequency band which is different from said first frequency band for establishing and maintaining communications links with mobile nodes over which user data can be communicated, said step of using a second frequency band including assigning segments of an uplink communications channel to mobile nodes, the uplink communications channel having a structure that includes a periodic repeating pattern of access segments and traffic segments, access segments being segments into which mobile nodes that do not have an existing wireless communication link established with said second network attachment point can send at least one signal to said network attachment point over the air to establish a wireless communications link with the second network attachment point, each access segment occurring at a fixed time offset from the point at which one of said beacon signals is transmitted into said first frequency band by said second network attachment point, wherein each access segment includes a plurality of tones which can be used for uplink transmissions during at least one symbol transmission time period which occurs during the period of said access segment, said plurality of tones includes at least a first set of tones;

receiving a signal from said first network access point indicating that said mobile node is seeking to perform a handoff to said second network point of attachment from said first network point of attachment;

dedicating the first set of tones to a first mobile node which is coupled to said first network access point;

communicating information to the first mobile node via the first network access point indicating the dedication of said first set of tones to the first mobile node;

prior to receiving said access request signal, communicating information to said first mobile node, via the first network access point, indicating the time at which said access segment will occur relative to one of the beacon signals transmitted into said first frequency band;

monitoring the first set of tones in the first access segment for a registration signal from the mobile node to which said first access segment was assigned; and receiving a registration signal from the mobile node which was communicated using said dedicated first set of tones.

12. A machine readable medium embodying machine executable instructions for controlling a second network point of attachment to implement a communications method in a communications system including a first network point of attachment, the first network point of attachment using signals in a first frequency band to communicate with a mobile node having a communications link with said first network point of attachment over which data can be communicated, the communications method comprising:

transmitting beacon signals having a predetermined frequency into said first frequency band on a periodic basis, said first frequency band being a frequency band into which said second network attachment point does not transmit user data;

using a second frequency band which is different from said first frequency band for establishing and maintaining communications links with mobile nodes over which user data can be communicated, said step of using a second frequency band including assigning segments of an uplink communications channel to mobile nodes, the uplink communications channel having a structure that includes a periodic repeating pattern of access segments and traffic segments, access segments being segments into which mobile nodes that do not have an existing wireless communication link established with said second network attachment point can send at least one signal to said network attachment point over the air to establish a wireless communications link with the second network attachment point, each access segment occurring at a fixed time offset from the point at which one of said beacon signals is transmitted into said first frequency band by said second network attachment point, wherein each access segment includes a plurality of tones which can be used for uplink transmissions during at least one symbol transmission time period which occurs during the period of said access segment, said plurality of tones includes at least a first set of tones;

receiving a signal from said first network access point indicating that said mobile node is seeking to perform a handoff to said second network point of attachment from said first network point of attachment;

dedicating the first set of tones to a first mobile node which is coupled to said first network access point;

communicating information to the first mobile node via the first network access point indicating the dedication of said first set of tones to the first mobile node;

prior to receiving said access request signal. communicating information to said first mobile node, via the first network access point, indicating the time at which said access segment will occur relative to one of the beacon signals transmitted into said first frequency band;

monitoring the first set of tones in the first access segment for a registration signal from the mobile node to which said first access segment was assigned; and receiving a registration signal from the mobile node which was communicated using said dedicated first set of tones.

13. A method of operating a second network point of attachment in a communications system including a first network point of attachment and a.first mobile node, the first network point of attachment having a communications link with the first mobile node over which data can be communicated, the first network point of attachment using a first frequency band, the method comprising:

transmitting beacon signals having a predetermined frequency on a recurring basis; and using a second frequency band which is different from said first frequency band for establishing and maintaining communications links with mobile nodes over which user data can be communicated, said step of using a second frequency band including assigning an access segment of an uplink communications channel to said first mobile node, the uplink communications channel having a structure that includes a repeating pattern of access segments and traffic segments, access segments being segments into whfth mobile nodes that do not have an existing wireless communication link established with said second network attachment point can send at least one signal to said network attachment point over the air to establish a wireless communications link with the second network attachment point, each access segment including a plurality of tones which can be used for uplink transmissions during at least one symbol transmission time period which, occurs during the period of the access segment, said plurality of tones including at least a first set of tones;

dedicating the first set of tones in a first access segment to said first mobile node;

monitoring the first set of tones in the first access segment for a registration signal from the first mobile node to which said first access segment was assigned; and receiving a registration signal from the mobile node which was communicated using said dedicated first set of tones in said first access segment.

14. The method of claim 13, further comprising:

prior to performing said dedicating step, receiving a signal from said first network access point indicating that said mobile node is seeking to perform a handoff to said second network point of attachment from said first network point of attachment.

15. The method of claim 14, further comprising:
communicating information to the first mobile node via the first network access point indicating the dedication of said first set of tones in the first access segment to the first mobile node.

16. The method of claim 15, further comprising:
prior to receiving said access request signal, communicating information to said first mobile node, via the first network access point, indicating the time at which said access segment will occur relative to one of the beacon signals transmitted into said first frequency band.

17. A computer readable medium embodying machine executable instructions for controlling a second network point of attachment to implement a communications method,
the second network point of attachment being in a communications system including a first network point of attachment and a first mobile node, the first network point of attachment having a communications link with the first mobile node over which data can be communicated, the first network point of attachment using a first frequency band, the communications method comprising:
transmitting beacon signals having a predetermined frequency on a recurring basis; and
using a second frequency band which is different from said first frequency band for establishing and maintaining communications links with mobile nodes over which user data ca.n be communicated, said step of using a second frequency band including assigning segments of an uplink communications channel to said first mobile node, the uplink communications channel having a structure that includes a repeating pattern of access segments and traffic segments, access segments being segments into which mobile nodes that do not have an existing wireless communication link established with said second network attachment point can send at least one signal to said network attachment point over the air to establish a wireless communications link with the second network attachment point, each access segment including a plurality of tones which can be used for uplink transmissions during at least one symbol transmission time period which occurs during the period of said access segment, said plurality of tones including at least a first set of tones;
dedicating the first set of tones in a first access segment to said first mobile node;
monitoring the first set of tones in the first access segment for a registration signal from the first mobile node to which said first access segment was assigned; and
receiving a registration signal from the mobile node which was communicated using said dedicated first set of tones.

18. A second network point of attachment comprising:
a processor configured to control said second network point of attachment to implement a method in a communications system including a first network point of attachment, the first network point of attachment using signals in a first frequency band to communicate with a first mobile node having a communications link with said first network point of attachment over which data can be communicated, the method comprising:
transmitting beacon signals having a predetermined frequency on a recurring basis; and
using a second frequency band which is different from said first frequency band for establishing and maintaining communications links with mobile nodes over which user data can be communicated, said step of using a second frequency band including assigning segments of an uplink communications channel to said first mobile node, the uplink communications channel having a structure that includes a repeating pattern of access segments and traffic segments, access segments being segments into which mobile nodes that do not have an existing wireless communication link established with said second network attachment point can send at least one signal to said network attachment point over the air to establish a wireless communications link with the second network attachment point, each access segment including a plurality of tones which can be used for uplink transmissions during at least one symbol transmission time period which occurs during the period of said access segment, said plurality of tones including at least a first set of tones;
dedicating the first set of tones in a first access segment to said first mobile node;
monitoring the first set of tones in the first access segment for a registration signal from the first mobile node to which said first access segment was assigned; and
receiving a registration signal from the mobile node which was communicated using said dedicated first set of tones.

19. A second network point of attachment for use in a communications system including a first network point of attachment and a first mobile node, the first network point of attachment having a communications link with the first mobile node over which data can be communicated, the first network point of attachment using a first frequency band, the second network attachment point comprising:
a transmitter for transmitting beacon signals having a predetermined frequency on a recurring basis; and
a control module for controlling the second network point of attachment to use a second frequency band which is different from said first frequency band for establishing and maintaining communications links with mobile nodes over which user data cai-i be communicated, said step of using a second frequency band including assigning an access segment of an uplink communications channel to said first mobile node, the uplink communications channel having a structure that includes a repeating pattern of access segments and traffic segments, access segments being segments into which mobile nodes that do not have an existing wireless communication link established with said second network attachment point can send at least one signal to said network attachment point over the air to establish a wireless communications link with the second network attachment point, each access segment including a plurality of tones which can be used for uplink transmissions during at least one symbol transmission time period which occurs during the period of the access segment, said plurality of tones including at least a first set of tones;
a dedicated resource allocation module for dedicating the first set of tones in a first access segment to said first mobile node;
a registration module for monitoring the first set of tones in the first access segment for a registration signal from the first mobile node to which said first access segment was assigned; and
a receiver for receiving a registration signal from the mobile node which was communicated using said dedicated first set of tones in said first access segment.

* * * * *